(12) United States Patent  (10) Patent No.: US 12,550,807 B2
Palla et al.  (45) Date of Patent: Feb. 17, 2026

(54) SYSTEMS AND METHODS FOR PREDICTIVE GROUND ENGAGING MACHINE CONTROL

(71) Applicant: Deere & Company, Moline, IL (US)

(72) Inventors: Bhanu Kiran Reddy Palla, Bettendorf, IA (US); Andrew J. Peterson, Ankeny, IA (US); Cary S. Hubner, Geneseo, IL (US); William D. Graham, East Moline, IL (US); Nathan R. Vandike, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 278 days.

(21) Appl. No.: 18/194,191

(22) Filed: Mar. 31, 2023

(65) Prior Publication Data
US 2023/0309437 A1  Oct. 5, 2023

Related U.S. Application Data

(60) Provisional application No. 63/411,928, filed on Sep. 30, 2022, provisional application No. 63/327,236,
(Continued)

(51) Int. Cl.
*A01B 79/00* (2006.01)
*A01D 41/127* (2006.01)
*G06V 20/10* (2022.01)

(52) U.S. Cl.
CPC .......... *A01B 79/005* (2013.01); *A01D 41/127* (2013.01); *G06V 20/188* (2022.01)

(58) Field of Classification Search
None
See application file for complete search history.

(56) References Cited

U.S. PATENT DOCUMENTS 5,995,895 A  11/1999  Watt et al.
9,008,918 B2*  4/2015  Missotten ............ A01D 41/127
                                                    701/50
(Continued)

FOREIGN PATENT DOCUMENTS

EP  3861843 A1  8/2021
EP  3932167 A1  1/2022
(Continued)

OTHER PUBLICATIONS

Extended European Search Report and Written Opinion issued in European Patent Application No. 23163496.5, dated Sep. 8, 2023, in 09 pages.
(Continued)

*Primary Examiner* — Jelani A Smith
*Assistant Examiner* — Jacob Daniel Underbakke
(74) *Attorney, Agent, or Firm* — Christopher J. Volkmann; KELLY, HOLT & CHRISTENSON PLLC

(57) ABSTRACT

One or more information maps are obtained by an agricultural system. The one or more information maps map one or more characteristic values at different geographic locations in a worksite. An in-situ sensor detects a soil property value as a ground engaging machine operates at the worksite. A predictive map generator generates a predictive map that predicts a predictive soil property value at different geographic locations in the worksite based on a relationship between the values in the one or more information maps and the soil property value detected by the in-situ sensor. The predictive map can be output and used in automated ground engaging machine control.

20 Claims, 19 Drawing Sheets

Related U.S. Application Data filed on Apr. 4, 2022, provisional application No. 63/327,245, filed on Apr. 4, 2022, provisional application No. 63/327,242, filed on Apr. 4, 2022, provisional application No. 63/327,237, filed on Apr. 4, 2022, provisional application No. 63/327,240, filed on Apr. 4, 2022, provisional application No. 63/327,241, filed on Apr. 4, 2022, provisional application No. 63/327,239, filed on Apr. 4, 2022.

(56) References Cited

U.S. PATENT DOCUMENTS

| | | |
|---|---|---|
| 11,079,725 B2 | 8/2021 | Palla et al. |
| 11,140,813 B1 | 10/2021 | Morrison et al. |
| 11,178,818 B2 | 11/2021 | Brammeier et al. |
| 11,234,366 B2 | 2/2022 | Darr et al. |
| 11,240,961 B2 | 2/2022 | Anderson et al. |
| 11,467,605 B2 | 10/2022 | Palla et al. |
| 11,474,523 B2 | 10/2022 | Vandike et al. |
| 11,477,940 B2 | 10/2022 | Palla et al. |
| 11,497,154 B1 * | 11/2022 | Lund .................. A01B 63/002 |
| 11,589,509 B2 | 2/2023 | Vandike et al. |
| 11,592,822 B2 | 2/2023 | Vandike et al. |
| 11,635,765 B2 | 4/2023 | Vandike et al. |
| 11,641,800 B2 | 5/2023 | Blank et al. |
| 11,650,553 B2 | 5/2023 | Palla et al. |
| 11,650,587 B2 | 5/2023 | Vandike et al. |
| 11,653,588 B2 | 5/2023 | Vandike et al. |
| 11,672,203 B2 | 6/2023 | Vandike et al. |
| 11,675,354 B2 | 6/2023 | Vandike et al. |
| 11,704,576 B1 * | 7/2023 | McEntire .................. G06F 16/29 706/12 |
| 11,711,995 B2 | 8/2023 | Vandike et al. |
| 11,727,680 B2 | 8/2023 | Vandike et al. |
| 11,785,878 B2 * | 10/2023 | Anderson, Jr. .......... G06N 3/08 172/1 |
| 2001/0016788 A1 * | 8/2001 | Hauwiller .............. A01B 79/005 700/283 |
| 2007/0068238 A1 * | 3/2007 | Wendte .................. B60C 23/002 73/146 |
| 2012/0101796 A1 * | 4/2012 | Lindores .............. A01B 79/005 703/9 |
| 2013/0184944 A1 * | 7/2013 | Missotten ............ A01D 41/127 701/50 |
| 2015/0094917 A1 * | 4/2015 | Blomme .................. A01C 5/062 701/50 |
| 2016/0247079 A1 * | 8/2016 | Mewes .................. G06N 5/048 |
| 2016/0302353 A1 * | 10/2016 | Wendte .................. A01C 21/005 |
| 2019/0057461 A1 * | 2/2019 | Ruff .................. G01N 33/24 |
| 2019/0059209 A1 * | 2/2019 | Brune .................. G01N 33/24 |
| 2020/0042890 A1 * | 2/2020 | Merrill .................. G06N 5/048 |
| 2020/0107490 A1 * | 4/2020 | Zemenchik ............ A01B 63/111 |
| 2020/0184214 A1 * | 6/2020 | Casas .................. A01B 79/005 |
| 2020/0236836 A1 * | 7/2020 | Barrick ................ A01B 79/005 |
| 2020/0323133 A1 | 10/2020 | Anderson et al. |
| 2020/0409353 A1 * | 12/2020 | Hanrieder ............ G05D 1/0016 |
| 2021/0059100 A1 * | 3/2021 | Strnad .................. A01B 79/005 |
| 2021/0140908 A1 * | 5/2021 | Van Houweling ... G01N 27/221 |
| 2021/0243936 A1 | 8/2021 | Vandike et al. |
| 2021/0243938 A1 | 8/2021 | Blank et al. |
| 2021/0243951 A1 | 8/2021 | Vandike et al. |
| 2021/0321566 A1 | 10/2021 | Darr et al. |
| 2022/0110236 A1 | 4/2022 | Vandike et al. |
| 2022/0110237 A1 | 4/2022 | Vandike et al. |
| 2022/0110238 A1 | 4/2022 | Vandike et al. |
| 2022/0110246 A1 | 4/2022 | Vandike et al. |
| 2022/0110247 A1 | 4/2022 | Vandike et al. |
| 2022/0110248 A1 | 4/2022 | Vandike et al. |
| 2022/0110249 A1 | 4/2022 | Vandike et al. |
| 2022/0110250 A1 | 4/2022 | Vandike et al. |
| 2022/0110251 A1 | 4/2022 | Vandike et al. |
| 2022/0110252 A1 | 4/2022 | Vandike et al. |
| 2022/0110253 A1 | 4/2022 | Anderson et al. |
| 2022/0110254 A1 | 4/2022 | Vandike et al. |
| 2022/0110255 A1 | 4/2022 | Vandike et al. |
| 2022/0110256 A1 | 4/2022 | Vandike et al. |
| 2022/0110257 A1 | 4/2022 | Vandike et al. |
| 2022/0110258 A1 | 4/2022 | Vandike et al. |
| 2022/0110259 A1 | 4/2022 | Vandike et al. |
| 2022/0110262 A1 | 4/2022 | Vandike et al. |
| 2022/0113141 A1 | 4/2022 | Vandike et al. |
| 2022/0113142 A1 | 4/2022 | Vandike et al. |
| 2022/0113161 A1 | 4/2022 | Vandike et al. |
| 2022/0113727 A1 | 4/2022 | Vandike et al. |
| 2022/0113729 A1 | 4/2022 | Vandike et al. |
| 2022/0113733 A1 | 4/2022 | Vandike et al. |
| 2022/0167547 A1 | 6/2022 | Vandike et al. |
| 2022/0217894 A1 * | 7/2022 | Guo .................. G06V 20/188 |
| 2022/0232763 A1 | 7/2022 | Palla et al. |
| 2022/0232816 A1 | 7/2022 | Vandike et al. |
| 2023/0148474 A1 | 5/2023 | Vandike et al. |
| 2023/0161347 A1 | 5/2023 | Vandike et al. |
| 2023/0189710 A1 | 6/2023 | Anderson et al. |
| 2023/0213900 A1 | 7/2023 | Palla et al. |
| 2023/0217850 A1 | 7/2023 | Vandike et al. |
| 2023/0217857 A1 | 7/2023 | Vandike et al. |
| 2023/0217858 A1 | 7/2023 | Vandike et al. |
| 2023/0225238 A1 | 7/2023 | Blank et al. |
| 2024/0192401 A1 * | 6/2024 | Good .................. G06V 10/774 |

FOREIGN PATENT DOCUMENTS

| | | | |
|---|---|---|---|
| WO | WO-2018061255 A1 * | 4/2018 | .......... A01B 79/005 |
| WO | WO 2019070617 A1 | 4/2019 | |
| WO | WO 2020161566 A1 | 8/2020 | |

OTHER PUBLICATIONS

AFS Soil Command, https://vx.caseih.com/northamerica/en-us/downloads/pdf/AFS-Soil-Command-Brochure-05-21-CIH21051201.pdf, 11 pages.

* cited by examiner

SYSTEMS AND METHODS FOR PREDICTIVE GROUND ENGAGING MACHINE CONTROL

CROSS-REFERENCE TO RELATED APPLICATIONS

The present application is based on and claims the benefit of U.S. provisional patent application Ser. No. 63/411,928, filed Sep. 30, 2022, Ser. No. 63/327,241, filed Apr. 4, 2022, Ser. No. 63/327,239, filed Apr. 4, 2022, Ser. No. 63/327,242, filed Apr. 4, 2022, Ser. No. 63/327,237, filed Apr. 4, 2022, Ser. No. 63/327,236, filed Apr. 4, 2022, Ser. No. 63/327,245, filed Apr. 4, 2022, and Ser. No. 63/327,240, filed Apr. 4, 2022, the content of which are hereby incorporated by reference in their entirety.

FIELD OF THE DESCRIPTION

The present description relates to mobile agricultural machines, particularly mobile agricultural planters configured to plant seeds at a field.

BACKGROUND

There are a wide variety of different types of agricultural machines, such as mobile agricultural ground engaging machines. Some such mobile agricultural ground engaging machines include agricultural planting machines, agricultural tillage machine, or the like. Agricultural ground engaging machines have ground engaging tools that engage, and in some cases, penetrate the soil. For example, a planting machine may have ground opening tools for the generation of a furrow or trench and ground closing tools for closing the opened furrow or trench after a seed has been deposited. Tillage machines may include a variety of tillage tools, such as disks, shanks, tines, baskets, as well as various other harrowing or finishing tools. In some examples, planting machines may also include tillage tools. In some examples, these agricultural machines comprise a towing vehicle, such as a tractor, that tows a ground engaging implement, such as a planting implement or a tillage implement.

As these machines operate at a field performing a respective operation, such as a planting operation or a tillage operation, parameters of the ground engaging tools, such as the positions (e.g., depth, angle, etc.) and downforce, are set and as the machine travels across the field, the ground engaging tools interact with the soil.

The discussion above is merely provided for general background information and is not intended to be used as an aid in determining the scope of the claimed subject matter.

SUMMARY

One or more information maps are obtained by an agricultural system. The one or more information maps map one or more characteristic values at different geographic locations in a worksite. An in-situ sensor detects a soil property value as a ground engaging machine operates at the worksite. A predictive map generator generates a predictive map that predicts a predictive soil property value at different geographic locations in the worksite based on a relationship between the values in the one or more information maps and the soil property value detected by the in-situ sensor. The predictive map can be output and used in automated ground engaging machine control.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
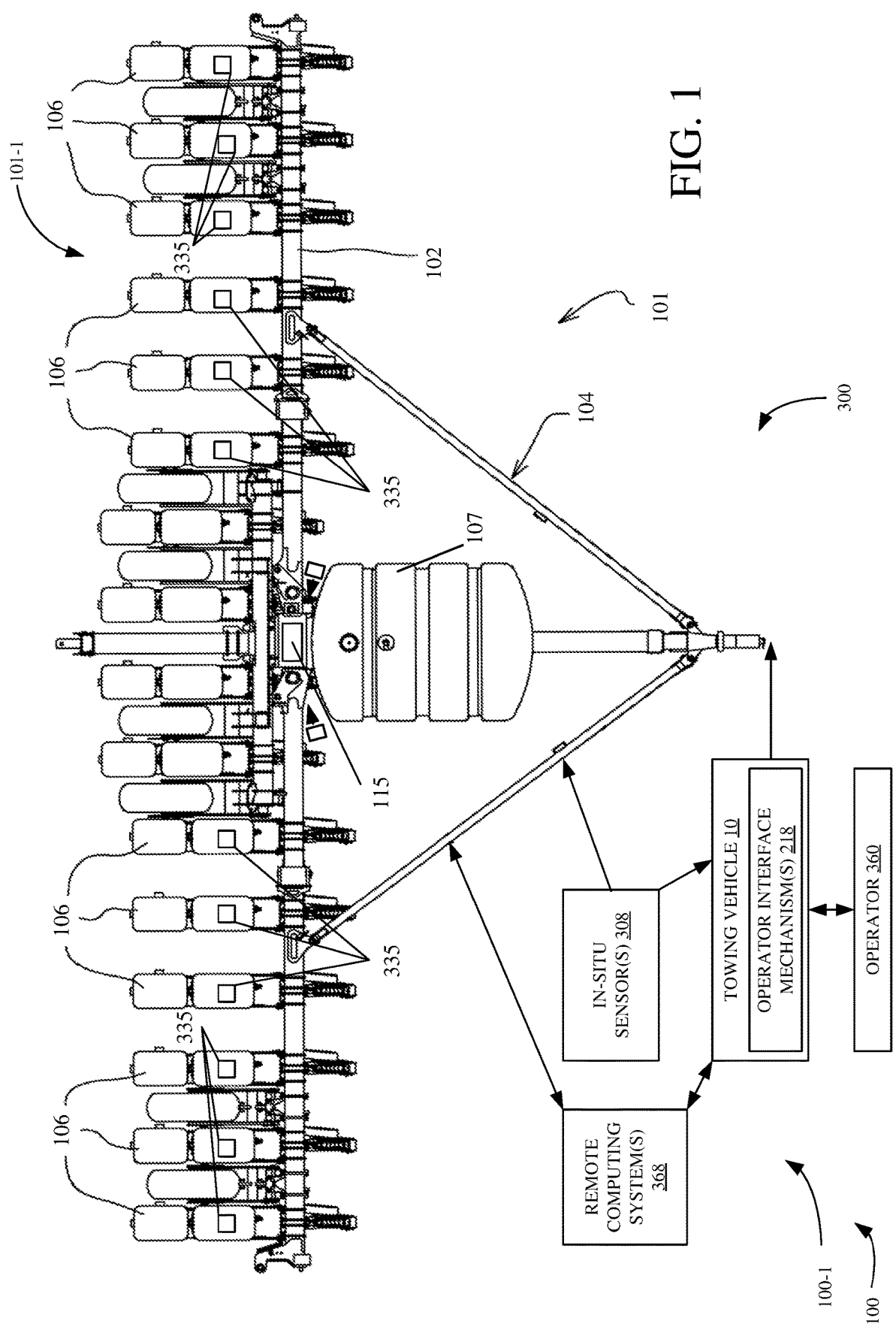
FIG. 1 is partial a top view and partial block diagram of one example of an agricultural ground engaging system that includes, as a mobile agricultural ground engaging machine, a mobile agricultural planting machine, including an agricultural planting implement and a towing vehicle, shown in partial pictorial and partial schematic form.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In one example, the present description relates to using in-situ data taken concurrently with an operation, in combination with prior or predicted data, such as prior or predicted data represented in a map, to generate a predictive model and a predictive map, such as a predictive soil property model and predictive soil property map. In some examples, the predictive soil property map can be used to control a mobile machine, such as a mobile ground engaging machine (e.g., a planting machine or a tillage machine, etc.).

As discussed above, agricultural ground engaging machine, such as agricultural planting machines (e.g., planters or seeders) or agricultural tillage machines, include ground engaging tools that engage and penetrate the soil at the field over which the machine travels. The parameters of the machine, such as the position of the ground engaging tools (e.g., depth, angle, etc.), the downforce exerted on the ground engaging tools, the travel speed, the application of material, as well as various other parameters can be controlled throughout the operation. Variance in characteristics of the field, such as soil properties, for instance soil moisture, soil temperature, soil nutrients, bulk density, as well as various other characteristics, can affect the performance of the agricultural ground engaging machine. Thus, it may be desirable to vary operation of the agricultural ground engaging machine with the variance in the characteristics. For example, changes in the soil properties can cause the row units to dig further into the ground which can cause the ground engaging tools to dig deeper into the ground than desired, which may result in various deleterious effects, for instance, it may cause poor tillage quality or it may cause a seed furrow to be deeper than desired and thus the resulting placement of seeds to be suboptimal. Changes in the soil properties can also cause the ground engaging tools to move away from the ground, which can cause the ground engaging tools to operate at a shallower than desired depths, which may result in various deleterious effects, for instance, it may cause poor tillage quality or it may cause the seed furrow to be shallower than desired and thus the resulting placement of seeds to be suboptimal. Thus, it may be desirable to vary a tool position actuator or to vary the downforce applied to the ground engaging tools, with variance in soil properties. In some examples, it may be desirable to vary the depth of the seeds with variance in soil temperature. In some examples, depending on the soil nutrient levels, it may be desirable to place more or less material, such as fertilizer in the furrow. In some examples, it may be desirable to vary the population of seeds planted depending on the characteristics of the field. These are just some examples.

In some cases, sensor technology can be employed to detect the soil properties at the field, and subsequent control can be undertaken based on the sensor readings. However, such control can suffer from latencies in sensor readings as well as machine latencies. Thus, it would be desirable to provide a system that allows for pro-active control that can maintain desired performance through variable conditions. Pro-active control reduces (or eliminates) the problems associated with latency.

In one example, the present description relates to obtaining a map such as a topographic map. The topographic map includes geolocated values of topographic characteristics (topographic characteristic values, sometimes referred to herein as topographic values) across different locations at a worksite. For example, the topographic map can include elevation values indicative of the elevation of the worksite at various locations, as well as slope values indicative of the slope of the worksite at various locations. The topographic map, and the values therein, can be based on historical data, such as topographic data detected during previous operations at the worksite by the same mobile machine or by a different mobile machine. The topographic map, and the values therein, can be based on fly-over or satellite-based sensor data, such as LIDAR data of the worksite, as well as scouting data provided by a user or operator such as from a scouting operation of the worksite. These are merely some examples. The topographic map can be generated in a variety of other ways.

In one example, the present description relates to obtaining a map, such as an optical map. An optical map illustratively includes geolocated electromagnetic radiation values (or optical characteristic values) across different geographic locations in a field of interest. Electromagnetic radiation values can be from across the electromagnetic spectrum. This disclosure uses electromagnetic radiation values from infrared, near-infrared (NIR), visible light and ultraviolet portions of the electromagnetic spectrum as examples only and other portions of the spectrum are also envisioned. An optical map may map datapoints by wavelength (e.g., a vegetative index). In other examples, an optical map identifies textures, patterns, color, shape, or other relations of data points. Textures, patterns, or other relations of data points can be indicative of presence or identification of vegetation (live or dead) on the field (e.g., crops, weeds, other plant matter, such as residue, etc.). Additionally, or alternatively, an optical map may identify the presence of standing water or wet spots on the field. The optical map can be derived using satellite images, optical sensors on flying vehicles such as UAVS, or optical sensors on a ground-based system, such as another machine operating in the field prior to the current ground engaging operation. In some examples, optical characteristic maps may map three-dimensional values as well such as vegetation height when a stereo camera or lidar system is used to generate the map. The optical map may be generated prior to the current operation, such as after the most recent previous operation (e.g., harvest or tillage) and prior to the current operation. In other examples, the optical map may be generated during a previous growing season, such as the most recent previous growing season or from an earlier season, such as post-harvest in an earlier year to indicate residue after the harvest in the earlier year. These are merely some examples. The optical characteristic map can be generated in a variety of other ways.

In one example, the present description relates to obtaining a map such as a soil moisture map. The soil moisture map includes geolocated values of soil moisture at the field. The soil moisture map, and the values therein, can be based on soil moisture values detected during prior operations at the worksite such as prior operations by the same mobile machine or a different mobile machine. The soil moisture map, and the values therein, can be a predictive soil moisture map with predictive soil moisture values. In one example, the predictive soil moisture values can be based on images generated during a survey of the field, such as an aerial survey of the field. In another example, the predictive soil moisture map is generated by obtaining a map of the field that maps a characteristic to different locations at the field, and a sensed in-situ soil moisture (such as soil moisture data obtained from a data signal from a soil moisture sensor) and determining a relationship between the obtained map, and the values therein, and the in-situ sensed soil moisture data. The determined relationship, in combination with the obtained map, is used to generate a predictive soil moisture map having predictive soil moisture values. The soil moisture map can be based on historical soil moisture values. The soil moisture map can be based on soil moisture modeling, which may take into account, among other things, weather characteristics and characteristics of the field, such as topography, soil type, remaining crop stubble/residue, etc. These are merely some examples. The soil moisture map can be generated in a variety of other ways.

In one example, the present description relates to obtaining a map such as a soil type map. The soil type map includes geolocated values of soil type at the field. Soil type can refer to taxonomic units in soil science, wherein each soil type includes defined sets of shared properties. Soil types can include, for example, sandy soil, clay soil, silt soil, peat soil, chalk soil, loam soil, and various other soil types. Thus, the soil type map provides geolocated values of soil type at different locations in the field of interest which indicate the type of soil at those locations. The soil type map can be generated on the basis of data collected during another operation on the field of interests, for example, previous operations in the same season or in another season. The machines performing the previous operations can have on board sensors that detect characteristics indicative of soil type. Additionally, operating characteristics, machine settings, or machine performance characteristics during previous operations can be indicative of soil type. In other examples, surveys of the field of interest can be performed, either by various machines with sensors such as imaging systems (e.g., an aerial survey) or by humans. For example, samples of the soil at the field of interest can be taken at one or more locations and observed or lab tested to identify the soil type at the different location(s). In some examples, third-party service providers or government agencies, for instance, the USDA Natural Resources Conservation Services (NRCS), the United States Geological Survey (USGS), as well as various other parties may provide data indicative of soil type at the field of interest. The soil type map can be generated in a variety of other ways.

In one example, the present description relates to obtaining a map such as a prior operation map. The prior operation map illustratively maps georeferenced prior operation characteristic values across different geographic location in a field of interest. Prior operation characteristics can include characteristics detected by sensors during prior operations at the field, such as characteristics of the field, characteristics of vegetation on the field, characteristics of the environment, as well as operating parameters of the machines performing the prior operations. In other examples, the prior operation map can be based on data provided by an operator or user. These are merely some examples. The prior operation map can be generated in a variety of other ways.

One example of a prior operation map is a prior tillage map. The prior tillage operation map illustratively maps, as georeferenced prior operation characteristics, georeferenced prior tillage operation characteristic values across different geographic locations in a field of interest, such as characteristics detected by sensors during a prior tillage operation. For example, characteristics of the field, characteristics of the vegetation at the field, characteristics of the environment, as well as operating parameters of the agricultural tillage machine. The prior tillage operation characteristics can include location information indicative of locations on the field of interest where tilling occurred and/or where tilling did not occur, operating parameters of the tillage machine (such as operating depth, aggressiveness, gang angle, speed, etc.), and the timing of the tillage operation. The prior tillage operation map may be derived from sensor readings during one or more prior tillage operations at the field of interest. For example, the tillage machine may include one or more sensors, such as operating characteristic sensors (e.g., speed sensors, position sensors, etc.), geographic position sensors, timing circuitry (e.g., a clock), as well as various other sensors, that may provide data indicative of tillage characteristics. In other examples, the prior tillage operation map may be based on data provided by an operator or user. These are merely some examples. In other examples, the prior tillage operation map may be derived in other ways.

Another example of a prior operation map is a prior harvesting operation map. The prior harvesting operation map includes geolocated values of prior harvesting operation characteristics across different geographic locations in a field of interest, such as characteristics detected by sensors during a prior harvesting operation. For example, characteristics of the field, characteristics of the vegetation at the field, characteristics of the environment, as well as operating parameters of the agricultural harvesting machine. For example, sensors may detect characteristics that indicate the harvested yield, biomass amounts at the field, harvesting operating parameters that indicate the amount of residue left on the field from a harvesting operation, such as header height, separating system parameters, cleaning system parameters, residue handling system parameters (e.g., residue chopper parameters), as well as various other characteristics. Thus, a prior operation map in the form of a prior harvesting operation map may be used to indicate or derive characteristics at the field of interest. In other example, the prior harvesting operation map may be based on data provided by an operator or user. These are merely some examples. The prior harvesting operation map can be generated in a variety of other ways.

Another example of a prior operation map is a prior tiling operation map. The prior tiling operation map includes geolocated values of prior tiling operation characteristics across different geographic locations in a filed of interest, such as characteristic detected by sensor during a prior tiling operation. For example, sensors may detect characteristics that indicate the locations, depths, and other characteristics (e.g., size) of drain tiles placed at the field of interest. In other examples, the prior tiling operation map may be based on data provided by an operator or user. These are merely some examples. The prior tiling operation map can be generated in a variety of other ways.

It will thus be understood that prior operation map as used herein can include a prior tillage operation map, a prior harvesting operation map, or a prior tiling operation map.

In one example, the present description relates to obtaining a map such as a vegetation characteristic map. The vegetation characteristic map illustratively maps georeferenced vegetation characteristic values (e.g., yield values, biomass values, vegetative index values, etc.) to different geographic locations in the field. The vegetation characteristic map may be derived from sensor readings at the field of interest, such as sensor readings of one or more bands of electromagnetic radiation. The sensor readings may be taken during aerial surveys of the field or during prior operations on the field. In some examples, machines performing prior operation at the field may be equipped with one or more sensors that detect vegetation characteristics. For example, a harvesting machine performing at the field of interest prior to the current operation may be outfitted with sensors that detect yield, biomass, and vegetative index values at the field. These are merely examples. In some examples, yield values and biomass values may be derived (e.g., predictively derived) from a vegetative index map. A vegetative index map illustratively maps georeferenced vegetative index values across different geographic locations in a field of interest. Vegetative index values may be indicative of vegetative growth or vegetative health, or both. One example of a vegetative index includes a normalized difference vegetation index (NDVI). There are many other vegetative indices that are within the scope of the present disclosure. In some examples, a vegetative index may be derived from sensor readings of one or more bands of electromagnetic radiation reflected by the plants. Without limitations, these bands may be in the microwave, infrared, visible or ultraviolet portions of the electromagnetic spectrum. Sensors can be placed on aerial or ground vehicles that generate sensor readings of the field of interest from which the vegetative index map can be derived. In other examples, a vegetation characteristic map may be derived in other ways.

In one example, the present description relates to obtaining in-situ data from in-situ sensors on the mobile agricultural machine taken concurrently with an operation. The in-situ sensor data can include soil property data generated by soil property sensors. The soil property data and corresponding soil property sensors can include one or more of: in-situ soil moisture data generated by in-situ soil moisture sensors; in-situ soil temperature data generated by in-situ soil temperature sensors; in-situ soil nutrients data generated by in-situ soil nutrient sensors; in-situ bulk density data generated by in-situ bulk density sensors; and various other in-situ soil property sensor data generated by a variety of other soil property sensors. The various in-situ data is derived from various in-situ sensors as the mobile machine works at the field, as will be described in further detail herein. These are merely some examples of the in-situ data and in-situ sensors contemplated herein.

The present discussion proceeds, in some examples, with respect to systems that obtain one or more maps of a field, such as one or more of a topographic map, an optical map, a soil moisture map, a soil type map, a prior operation map, a vegetation characteristic map, as well as various other types of maps and also use one or more in-situ sensor(s) to detect one or more variable(s) indicative of one or more values of one or more soil property values, such as one or more of a soil moisture values, soil temperature values, soil nutrients values, and bulk density values. The systems generate one or more models that model a relationship between the values on the obtained map(s) and the output values from the in-situ sensor(s). The model(s) are used to generate one or more predictive maps that predict one or more soil property values, such as one or more of soil moisture values, soil temperature values, soil nutrients values, and bulk density values. The predictive map(s), generated during an operation, can be presented to an operator or other user or used in automatically controlling a mobile agricultural machine during an operation or both. In some examples, the predictive map can be used to control one or more of a travel speed, downforce, tool position (e.g., depth, angle, etc.), closing/packing wheel force, seed delivery settings, material application, as well as various other parameters.

While the various examples described herein proceed with respect to certain example mobile agricultural ground engaging machines, it will be appreciated that the systems and methods described herein are applicable to various other types of mobile agricultural ground engaging machines including, but not limited to, seeders, such as air seeders, and drills.

FIG. 1 is a partial pictorial, partial schematic top view of one example of an agricultural ground engaging system architecture 300 that includes, as mobile agricultural ground engaging machine 100, a mobile agricultural planting machine 100-1 that includes, as a ground engaging implement 101, a planting implement 101-1 103 and towing vehicle 10 that can be operated by an operator 360. In the illustrated example, agricultural ground engaging system architecture 300 also includes a remote computing system 368. FIG. 1 also illustrates that mobile agricultural ground engaging machine 100 can include one or more in-situ sensors 308, such as one or more soil property sensors 180 (shown in FIG. 10) which sense soil property values, such as soil moisture values, soil temperature values, soil nutrients values, bulk density values, as well as various other values of various other soil properties. Soil property sensors 180 are described in greater detail below. Various components of agricultural system architecture 300 (shown in more detail in FIG. 10) can be on individual parts of agricultural ground engaging machine 100, such as on implement 101, towing vehicle 10, or remote computing systems 368, or can be distributed in various ways across two or more of implement 101, towing vehicle 10, and remote computing systems 368. An operator 360 can illustratively interact with operator interface mechanisms 218 to manipulate and control towing vehicle 10, remote computing systems 368, and at least some portions of implement 101.

As shown, planting implement 101-1 is a row crop planter that illustratively includes a toolbar 102 that is part of a frame 104. FIG. 1 also shows that a plurality of planting row units 106 are mounted to the toolbar 102. Planting implement 101-1 can be towed behind towing vehicle 10, such as a tractor. FIG. 1 shows that material, such as seed, fertilizer, etc. can be stored in a tank 107 and pumped, using one or more pumps 115, through supply lines to the row units. The seed, fertilizer, etc., can also be stored on the row units themselves. As shown in the illustrated example of FIG. 1, each row unit can include a respective row unit controller 335 which can be used to control operating parameters of each row unit, such as the downforce, operating depth, seed delivery, seed metering, material application, as well as various other parameters.

Figure 2:
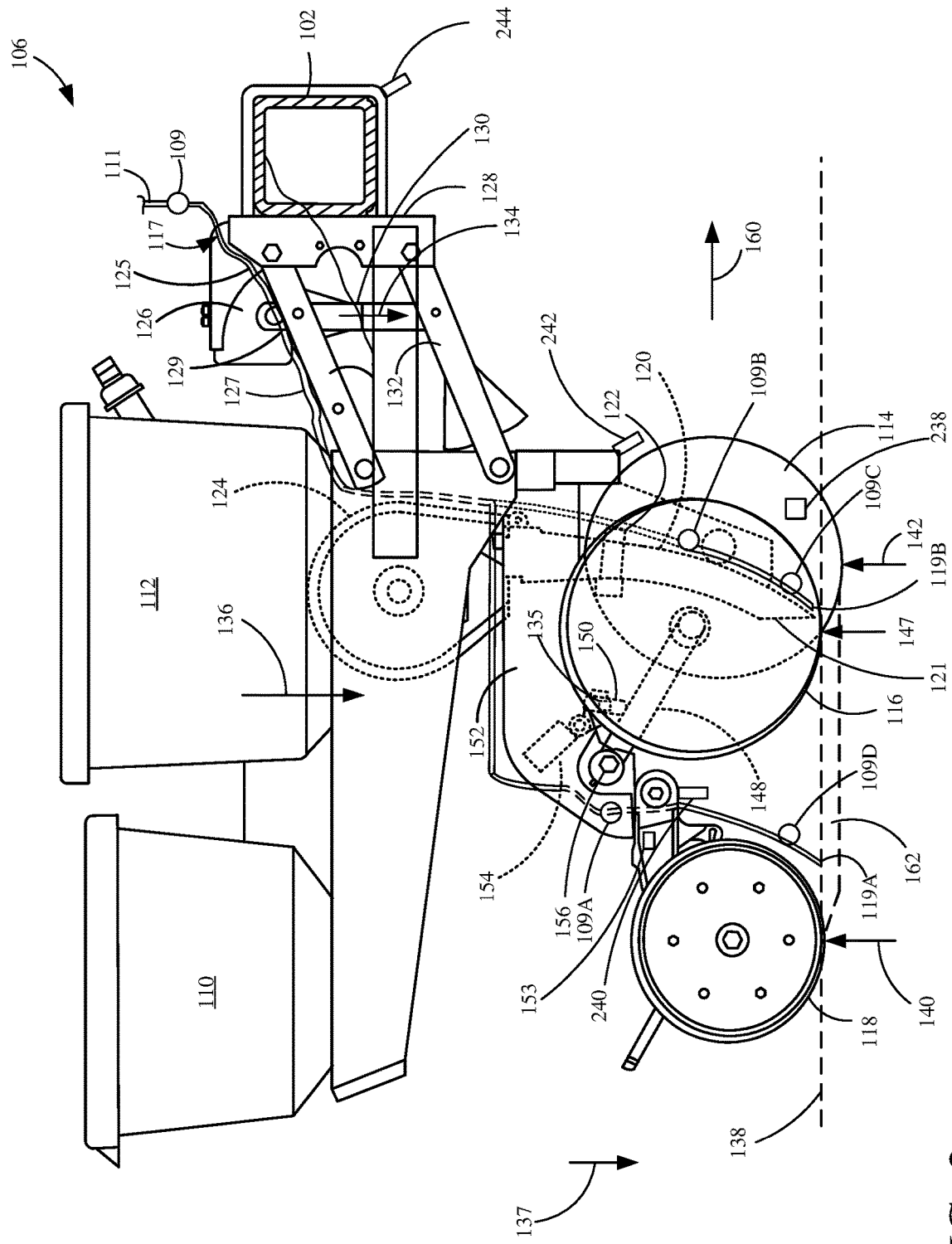
FIG. 2 is a side view showing one example of a row unit of the agricultural planting implement illustrated in FIG. 1.

FIG. 2 is a side view showing one example of a row unit 106. In the example shown in FIG. 2, row unit 106 illustratively includes a chemical tank 110 and a seed storage tank 112. It also illustratively includes a furrow opener 114 (e.g., double disk opener) that opens a furrow 162, a set of gauge wheels 116, and a furrow closer 118 (e.g., a set of closing wheels) that close furrow 162. Seeds from tank 112 are fed by gravity into a seed meter 124. The seed meter 124 controls the rate which seeds are dropped into a seed tube 120 or other seed delivery system, such as a brush belt or flighted brush belt (both shown below) from seed storage tank 112. The seeds can be sensed by a seed sensor 119 or 122, or both.

Some parts of the row unit 106 will now be discussed in more detail. First, it will be noted that there are different types of seed meters 124, and the one that is shown is shown for the sake of example only and is described in greater detail below. For instance, in one example, each row unit 106 need not have its own seed meter. Instead, metering or other singulation or seed dividing techniques can be performed at a central location, for groups of row units 106. The metering systems can include rotatable disks, rotatable concave or bowl-shaped devices, among others. The seed delivery system can be a gravity drop system (such as seed tube 120 shown in FIG. 2) in which seeds are dropped through the seed tube 120 and fall (via gravitational force) through the seed tube and out the outlet end 121 into the furrow (or seed trench) 162. Other types of seed delivery systems are assistive systems, in that they do not simply rely on gravity to move the seed from the metering system into the ground. Instead, such systems actively capture the seeds from the seed meter and physically move the seeds from the meter to a lower opening where the exit into the ground or trench. Some examples of these assistive systems are described in greater detail below.

FIG. 2 also shows an actuator 109 in a plurality of possible locations (109, 109A, 109B, 109C, and 109D). Actuator 109 (e.g., pump) pumps material (such as fertilizer) from tank 107 through supply line 111 so the material can be dispensed in or near the furrows. In such an example, the row unit controller 235 generates a control signal to control the actuation of pump 109. In other examples, actuators 109 are controllable valves and one or more pumps 115 pump the material from tank 107 to actuators 109 through supply line 111. In such an example, row unit controller 335 controls the actuator by generating valve or actuator control signals. The control signal for each valve or actuator 109 can, in one example, be a pulse width modulated control signal. The flow rate through the corresponding actuator 109 can be based on the duty cycle of the control signal (which controls the amount of time the valve is open and closed). It can be based on multiple duty cycles of multiple valves or based on other criteria. Further, the material can be applied in varying rates on a per-seed or per-plant basis. For example, fertilizer may be applied at one rate when it is being applied at a location spaced from a seed location and at a second, higher, rate when it is being applied closer to the seed location. These are examples only.

In the example of shown in FIG. 2, material is passed, e.g., pumped or otherwise forced, through supply line 111 to an inlet end of actuator 109. Actuator 109 is controlled by row unit controller 335 to allow the liquid to pass from the inlet end of actuator 109 to an outlet end. As material passes through actuator 109, it travels through an application assembly 117 from a proximal end (which is attached to an outlet end of actuator 109) to a distal tip (or application tip) (shown in a plurality of possible locations 119A, 119B, 119C, and 119D in FIGS. 4-5), where the liquid is discharged into a trench, or proximate a trench or furrow 162, opened by furrow opener 114.

A downforce generator or actuator 126 is mounted on a coupling assembly 128 that couples row unit 106 to toolbar 102. Downforce actuator 126 can be a hydraulic actuator, a pneumatic actuator, a spring-based mechanical actuator or a wide variety of other actuators. In the example shown in FIG. 2, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on the row unit 106, and indicated by arrow 136) is offset by upwardly directed forces acting on furrow closer 118 (from ground 138 and indicated by arrow 140) and furrow opener 114 (again from ground 138 and indicated by arrow 142). The remaining force (the sum of the force vectors indicated by arrows 134 and 136, minus the force indicated by arrows 140 and 142) and the force on any other ground engaging component on the row unit (not shown), is the differential force indicated by arrow 147. The differential force may also be referred to herein as downforce margin. The force indicated by arrow 147 acts on the gauge wheels 116. This load can be sensed by a gauge wheel load sensor 135 which may located anywhere on row unit 106 where it can sense that load. It can also be placed where may not sense the load directly, but a characteristic indicative of that load. For example, it can be disposed near a set of gauge wheel control arms (or gauge wheel arm) 148 that movably mount gauge wheels to shank 152 and control an offset between gauge wheels 116 and the furrow opener 114 to control planting depth. Percent ground contact is a measure of a percentage of time that the load (downforce margin) on the gauge wheels 116 is zero (indicating that the gauge wheels are out of contact with the ground). The percent ground contact is calculated on the basis of sensor data provided by the gauge wheel load sensor 135. In one example, the gauge wheel load sensor 135 is incorporated in mechanical stop (or arm contact member or wedge) 150.

In addition, there may be other separate and controllable downforce actuators, such as one or more of a closing wheel downforce actuator 153 that controls the downforce exerted on furrow closer 118. Closing wheel downforce actuator 153 can be a hydraulic actuator, a pneumatic actuator, a spring-based mechanical actuator or a wide variety of other actuators. The downforce exerted by closing wheel downforce actuator 153 is represented by arrow 137. It will be understood that each row unit 106 can include the various components described with reference to FIGS. 2-8.

In the illustrated example, arms (or gauge wheel arms) 148 illustratively abut a mechanical stop (or arm contact member or wedge) 150. The position of mechanical stop 150 relative to shank 152 can be set by a planting depth actuator assembly 154. Control arms 148 illustratively pivot around pivot point 156 so that, as planting depth actuator assembly 154 actuates to change the position of mechanical stop 150, the relative position of gauge wheels 116, relative to the furrow opener 114, changes, to change the depth at which seeds are planted.

In operation, row unit 106 travels generally in the direction indicated by arrow 160. The furrow opener 114 opens the furrow 162 in the soil 138, and the depth of the furrow 162 is set by planting depth actuator assembly 154, which, itself, controls the offset between the lowest parts of gauge wheels 116 and furrow opener 114. Seeds are dropped through seed tube 120 into the furrow 162 and furrow closer 118 close the soil.

As the seeds are dropped through seed tube 120, they can be sensed by seed sensor 122. Some examples of seed sensor 122 are an optical sensor or a reflective sensor, and can include a radiation transmitter and a receiver. The transmitter emits electromagnetic radiation and the receiver the detects the radiation and generates a signal indicative of the presences or absences of a seed adjacent to the sensor. These are just some examples of seed sensors. Row unit controller 335 may control the actuators 109 and/or pumps 115 based on the seed sensor signal to controllably apply material relative to the seed locations in the furrow 162.

Also, as shown in FIG. 2, row unit 106 can include an observation sensor system 240 disposed between furrow opener 114 and furrow closer 118. Observation sensor system 240 may include one or more sensors that detect one or more soil properties, such as soil moisture, soil temperature, soil nutrients, bulk density, as well as various other soil properties. Observation sensor system 240 may observe the field, as well as the furrow 162 opened by the row unit 106. Observation sensor system 240 may include one or more of an imaging system (e.g., stereo or mono camera), optical sensors, radar (e.g., ground penetrating radar), lidar, ultrasonic sensors, infrared sensors, electromagnetic induction sensors, as well as a variety of other sensors. In some examples, observation sensor system 240 may detects seeds in furrow 162. Row unit 106 can also include an observation sensor system 242 disposed in front of furrow opener 114. Observation sensor system 242 may include one or more sensors that detect one or more soil properties, such as soil moisture, soil temperature, soil nutrients, bulk density, as well as various other soil properties. Observation sensor system 242 may observe the field. Observation sensor system 242 may include one or more of an imaging system (e.g., stereo or mono camera), optical sensors, radar (e.g., ground penetrating radar), lidar, ultrasonic sensors, infrared sensors, electromagnetic induction sensors, as well as variety of other sensors. Also, as illustrated in FIG. 2, row unit 106 can include a soil property sensor system 238 disposed one or more of the furrow opener 114. Soil property sensor system 238 can include one or more sensors that detect one or more soil properties, such as soil moisture, soil temperature, soil nutrients, bulk density, as well as various other soil properties. The sensor(s) of soil property sensor system 238 may contact the soil engaged by furrow opener 114. Soil property sensor system 238 may include one or more of a temperature probe, a thermocouple, a thermistor, a thermopile, a moisture probe, a capacitance moisture sensor, an inductive moisture sensor, a piezoelectric sensor, as well as various other sensors.

Figure 3:
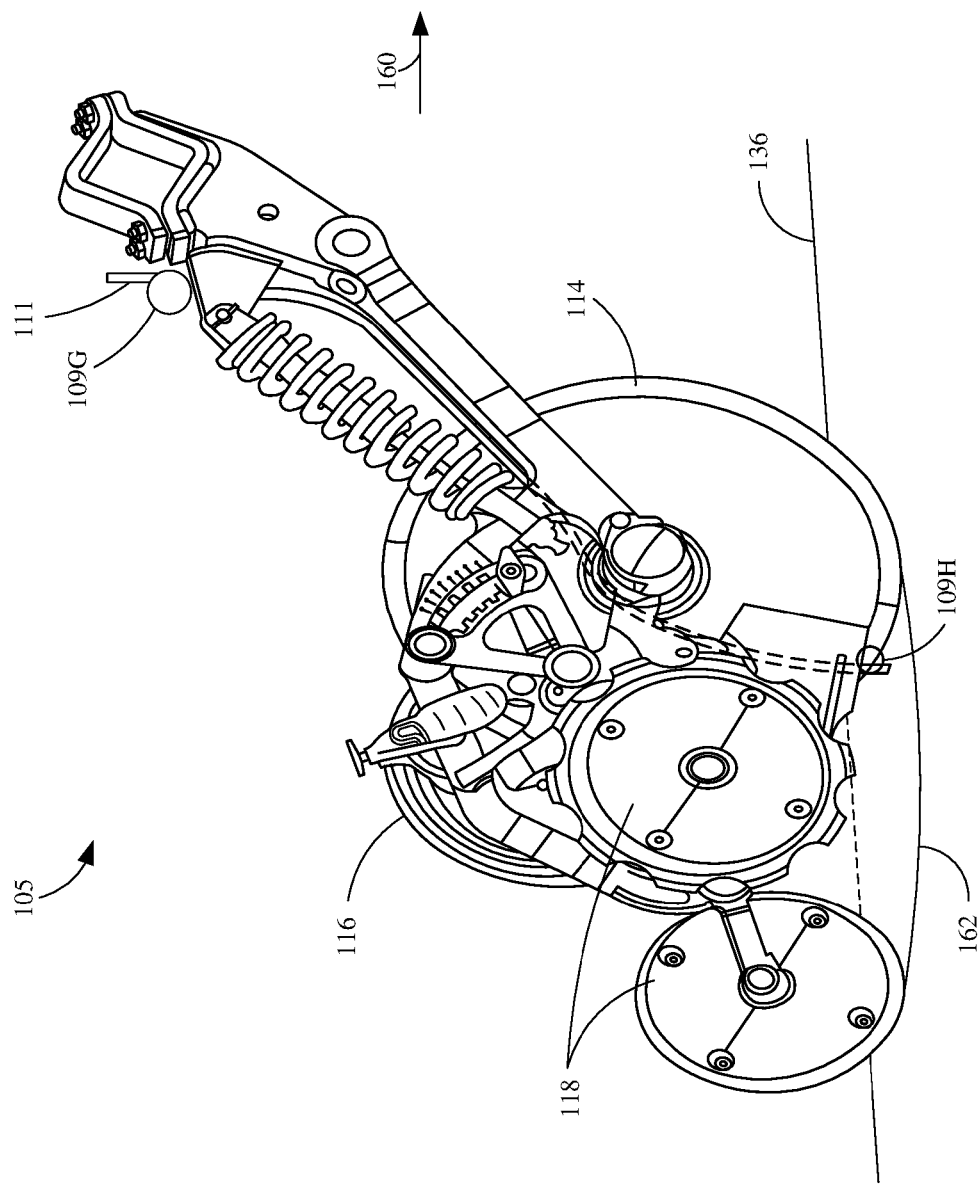
FIG. 3 is a view of a material application unit.

FIG. 3 is a side perspective view of an applicator unit 105. Some items are similar to those shown in FIG. 2 and they are similarly numbered. Briefly, in operation, applicator unit 105 attaches to a side-dress bare that is towed behind a towing vehicle 10 so unit 105 travels between rows (if the rows are already planted). However, instead of planting seeds, it simply applies material, such as fertilizer, at a location between rows of seeds (or, if the seeds are not yet planted, between locations where the rows will be, after planting). When traveling in the direction indicated by arrow 160, furrow opener 114 (in this example, it is a single disk opener) opens furrow 162 in the ground 136, at a depth set by gauge wheel 116. When actuator 109 (shown at multiple possible locations 109G and 109H) is actuated, material is applied in the furrow 162 and the furrow closer 118 then closes the furrow 162.

As unit 105 moves, row unit controller 335 controls actuator 109 to dispense material. This can be done relative to seed or plant locations, if they are sensed or are already known or have been estimated. It can also be done before the seed or plant locations are known. In this latter scenario, the locations where the material is applied can be stored so that seeds can be planted later, relative to the locations of the material that has been already dispensed.

FIG. 3 shows that actuator 109 can be mounted to one of a plurality of different positions on unit 105. Two of the positions are shown at 109G and 109H. These are examples and the actuator 109 can be located elsewhere as well. Similarly, multiple actuators can be disposed on unit 105 to dispense multiple different materials or to dispense it in a more rapid or more voluminous way than is done with only one actuator 109.

Figure 4:
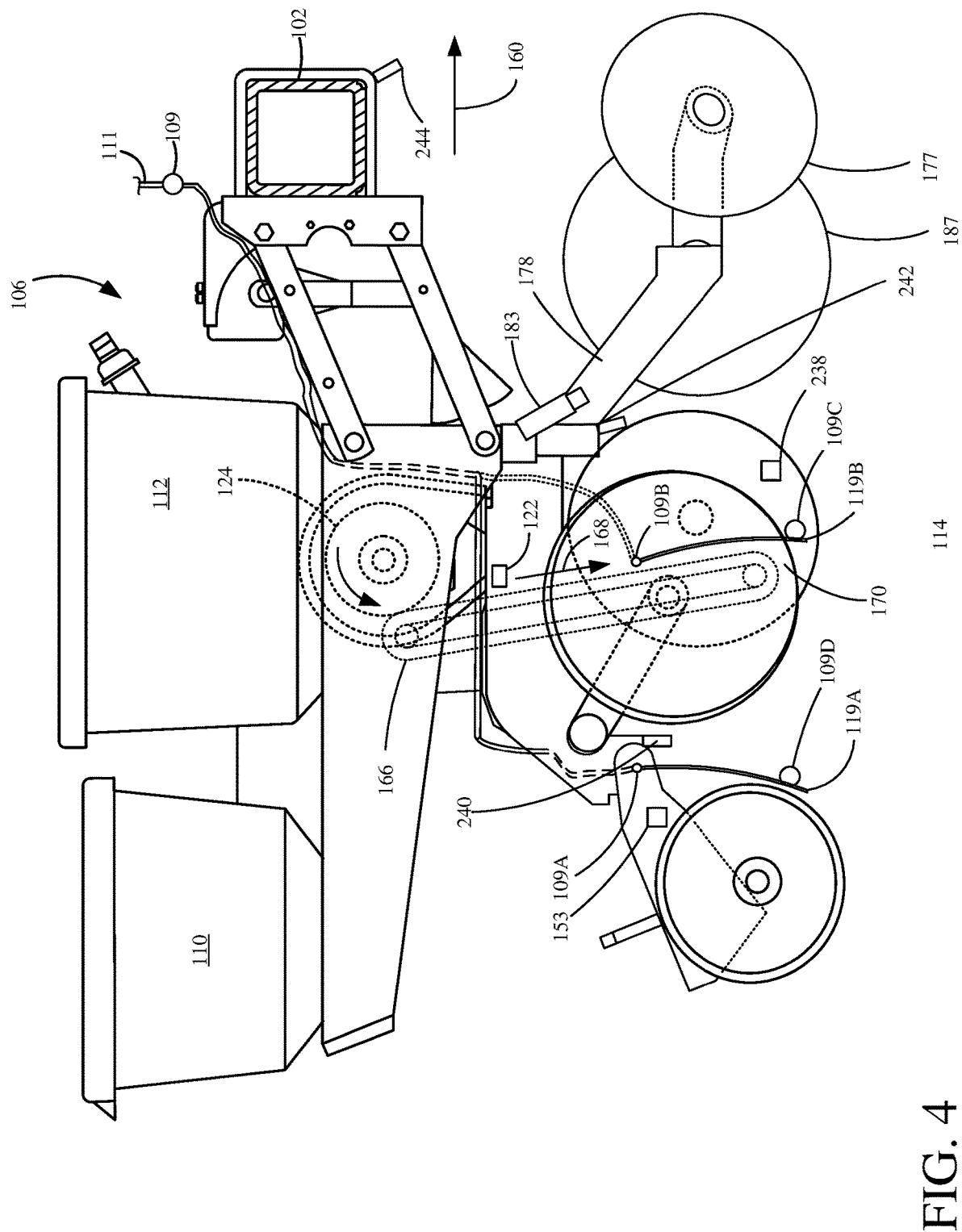
FIG. 4 is a side view showing another example of a row unit of the agricultural planting implement illustrated in FIG. 1.

FIG. 4 is similar to FIG. 2, and similar items are similarly numbered. However, instead of the seed delivery system being a seed tube 120 which relies on gravity to move the seed to the furrow 162, the seed delivery system shown in FIG. 4 is an assistive seed delivery system 166. Assistive seed delivery system 166 also illustratively has a seed sensor 122 disposed therein. Assistive seed delivery system 166 captures the seeds as they leave seed meter 124 and moves them in a direction indicated by arrow 168 toward furrow 162. System 166 has an outlet end 170 where the seeds exit system 166 into furrow 162 where the again reach their final seed position. System 166 may driven at variable speeds by an actuator, such as a variable motor, which can be controlled by row unit controller 335. Row unit controller 335 may control the actuator 109 to dispense material based on the seed sensor signal from seed sensor 122 as well as the speed at which system 166 is driven.

Additionally, as illustrated in FIG. 4, row unit 106 can include a row cleaner 177. Row cleaner 177 disposed in front of furrow opener 114, can include a pair of opposed rotatable elements that engage the soil to clean debris and other obstacles, such as crop residue, stalks, root balls, rocks, etc. from the path of furrow opener 114. Row cleaner 177 is pivotably coupled to row unit 106 (e.g., shank 152) by a control arm 178. As illustrated in FIG. 4, row unit 106 can include a row cleaner actuator 183, such as a hydraulic, pneumatic, electromechanical, or mechanical actuator, that is controllable to control the engagement of row cleaner 177 with the ground as well as to apply a downforce to row cleaner 177. Additionally, FIG. 3 shows that row unit 106 can include a coulter 187 (e.g., coulter disk) that is removably coupled to the row unit 106 (e.g., shank 152) by an attachment mechanism (not shown). Coulter 186 travels in the path of furrow opener to break open the soil while furrow opener 114 provides the final depth of the furrow. Coulters are often used in planting machines that operate at fields where no or minimal tilling was performed prior to the planting operation. The coulter 187 operates to break open the soil such that the furrow opener 114 can properly engage and penetrate the soil to open a quality furrow.

Further, as illustrated in FIG. 4, row unit 106 can include an observation sensor system 244. Observation sensor system 244 may include one or more sensors that detect one or more soil properties, such as soil moisture, soil temperature, soil nutrients, bulk density, as well as various other soil properties. Observation sensor system 244 may observe the field, such as the field ahead of row cleaner 256. Observation sensor system 244 may include one or more of an imaging system (e.g., stereo or mono camera), optical sensors, radar (e.g., ground penetrating radar), lidar, ultrasonic sensors, infrared sensors, electromagnetic induction sensors, as well as variety of other sensors.

Figure 5:
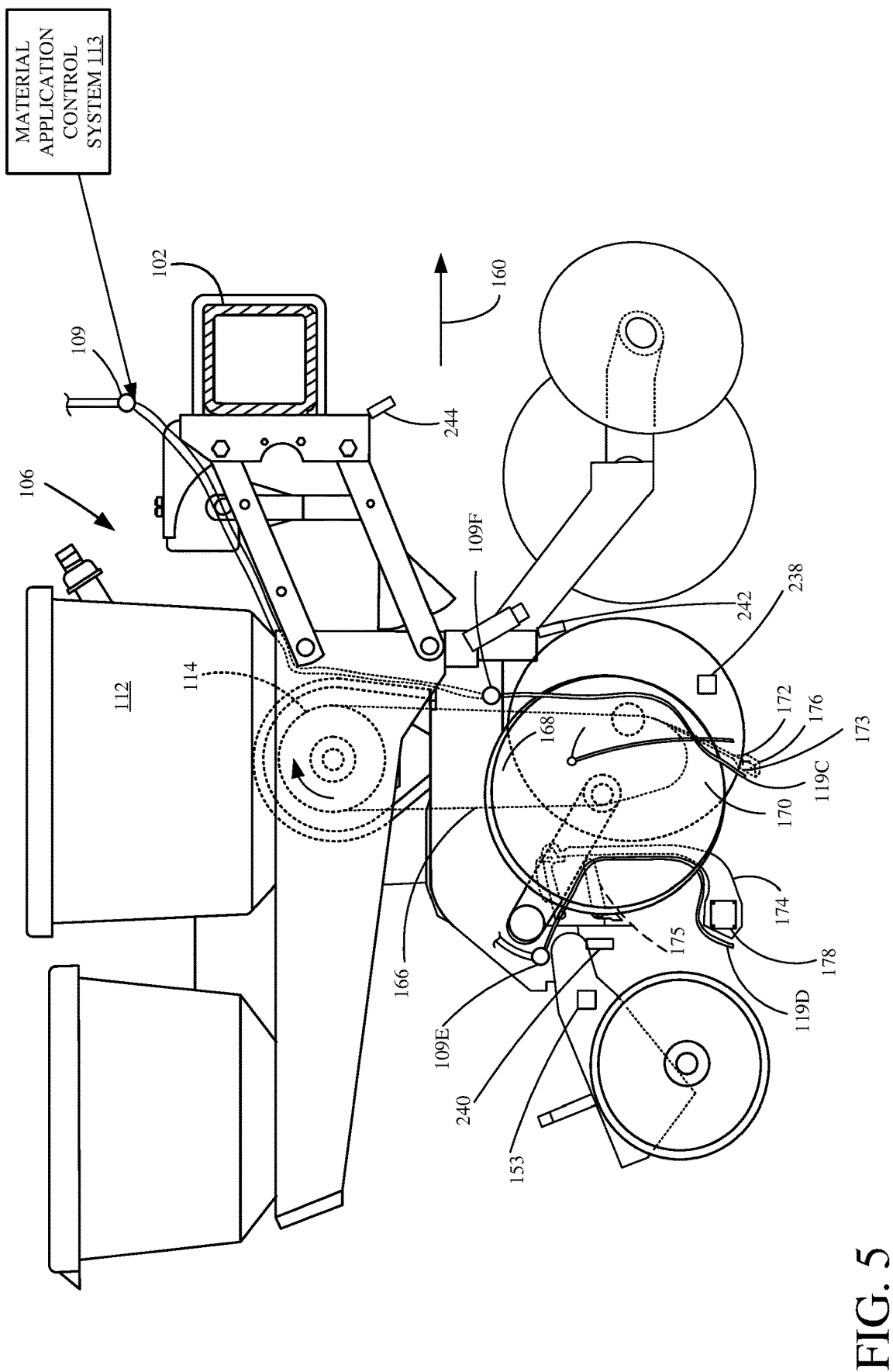
FIG. 5 is a side view showing another example of a row unit of the agricultural planting implement illustrated in FIG. 1.

FIG. 5 is similar to previous FIGS. 2 and 4 and similar items are similarly numbered. However, in FIG. 5, row unit 106 is also provided with members 172 and/or 174. Members 172 and/or 174 can be biased into engagement with the soil, such as by a respective controllable actuator 173 and controllable actuator 175 (e.g., hydraulic, pneumatic, electromechanical, mechanical, etc.), a spring, or can be rigidly attached to the frame of row unit 106. In one example, member 172 can be a furrow shaper, which contacts the soil in the area within or closely proximate the furrow, and immediately after the furrow is opened, but before the seed is placed therein. Member 172 can thus contact the side(s) of the furrow, the bottom of the furrow, an area adjacent the furrow, or other areas. It can be fitted with a sensor system 176, as well. Sensor system 176 can include one or more sensors that detect one or more soil properties such as soil moisture, soil temperature, soil nutrients, bulk density, as well as a variety of other soil properties. Sensor system 176 can be similar to sensor system 238 or observation sensor systems 240, 242, and 244.

It may be that actuator 109 is placed at the location of actuator 109E, shown in FIG. 5, and the outlet end of the application assembly is shown at 119C. In the example shown in FIG. 5, outlet end 119C is shown closely behind member 172 relative to the direction indicated by arrow 160. It can be disposed on the opposite side of member 172 as well (such as forward of member 172 in the direction indicated by arrow 160).

Also, in the example shown in FIG. 5, row unit 106 can have member 174 in addition to, or instead of, member 172. Member 174 can also be configured to engage the soil within, or closely proximate, the trench or furrow. It can have a sensor system 178 similar to sensor system 176. Sensor system 176 can be placed so that it closely follows the exit end 121 of the seed tube 120, or the exit end 170 of the assistive delivery system 166. Also, actuator 109 can be placed at the position illustrated at 109F. In the example, shown in FIG. 5, outlet end 119D is shown closely behind member 174 relative to the direction indicated by arrow 160.

Figure 6:
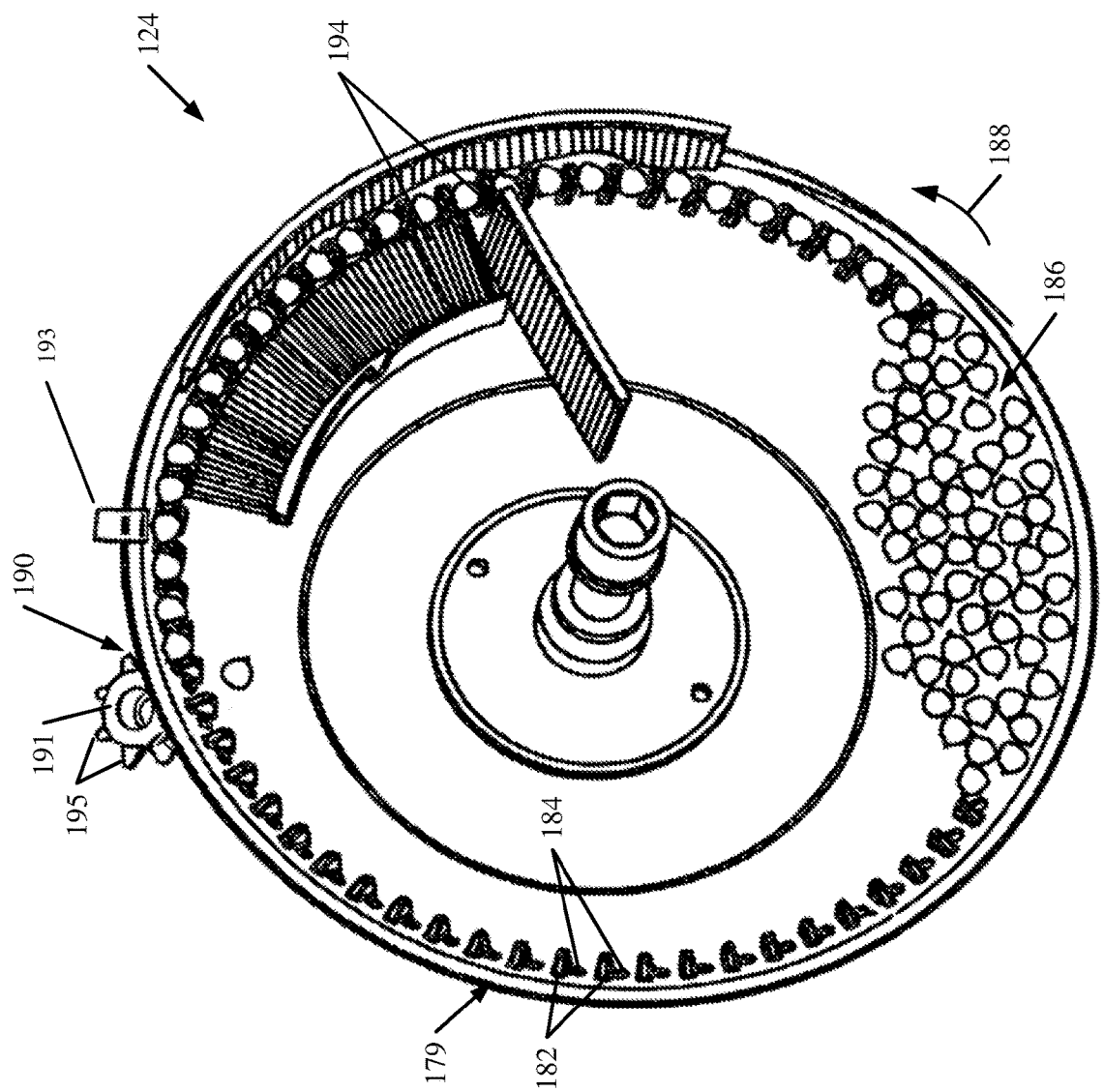
FIG. 6 is a perspective view of a portion of a seed metering system.

FIG. 6 shows one example of a rotatable mechanism 179 that can be used as part of the seed metering system (or seed meter) 124. The rotatable mechanism 179 includes a rotatable disc, or concave element, 179. Concave element 179 has a cover (not shown) and is rotatably mounted relative to the frame of row unit 106. Rotatable concave element 179 is driven by a motor (not shown) and has a plurality of projections or tabs 182 that are closely proximate corresponding apertures 184. A seed pool 186 is disposed generally in a lower portions of an enclosure formed by rotating concave element 179 and its corresponding cover. Rotatable concave element 179 is rotatably driven by its motor (such as an electric motor, a pneumatic motor, a hydraulic motor, etc.) for rotation generally in the direction indicated by arrow 188, about a hub. A pressure differential is introduced into the interior of the metering mechanism so that the pressure differential influences seeds from seed pool 186 to be drawn to apertures 184. For instance, a vacuum can be applied to draw the seeds from seed pool 186 so that they come to rest in apertures 184, where the vacuum holds them in place. Alternatively, a positive pressure can be introduced into the interior of the metering mechanism to create a pressure differential across apertures 184 to perform the same function.

Once a seed comes to rest in (or proximate) an aperture 184, the vacuum or positive pressure differential acts to hold the seed within the aperture 184 such that the seed is carried upwardly generally in the direction indicated by arrow 188, from seed pool 186, to a seed discharge area 190. It may happen that multiple seeds are residing in an individual seed cell. In that case, a set of brushes or other members 194 that are located closely adjacent the rotating seed cells tend to remove the multiple seeds so that only a single seed is carried by each individual cell. Additionally, a seed sensor 193 can also illustratively be mounted adjacent to rotating element 181. Seed sensor 193 detects and generates a signal indicative of seed presence.

Once the seeds reach the seed discharge area 190, the vacuum or other pressure differential is illustratively removed, and a positive seed removal wheel or knock-out wheel 191, can act to remove the seed from the seed cell. Wheel 191 illustratively has a set of projections 195 that protrude at least partially into apertures 184 to actively dislodge the seed from those apertures. When the seed is dislodged (such as seed 171), it is illustratively moved by the seed tube 120, seed delivery system 166 (some examples of which are shown above and below) to the furrow 162 in the ground.

Figure 7:
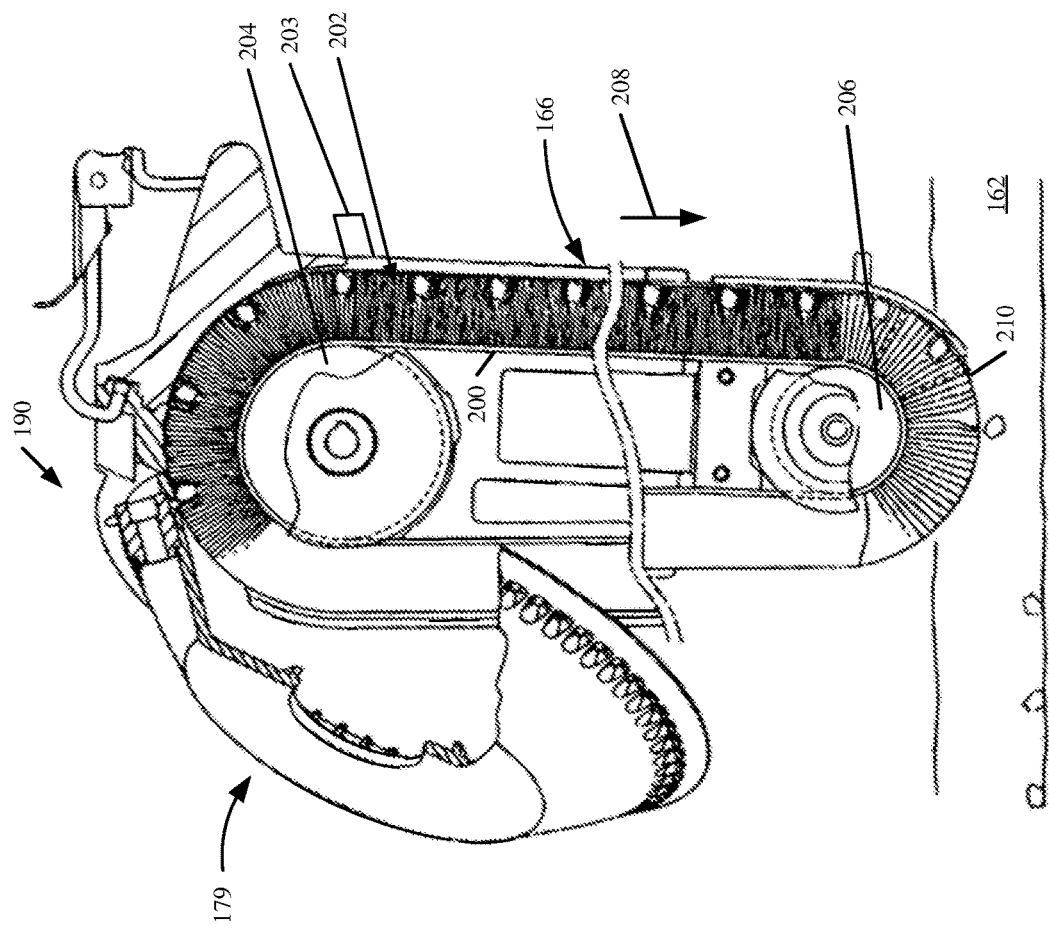
FIG. 7 shows an example of a seed delivery system that can be used with a seed metering system.

FIG. 7 shows an example where the rotating element 181 is positioned so that its seed discharge area 190 is above, and closely proximate, assistive seed delivery system 166. In the example shown in FIG. 7, assistive seed delivery system 166 includes a transport mechanism such as a belt 200 with a brush that is formed of distally extending bristles 202 attached to belt 200 that act as a receiver for the seeds. Belt 200 is mounted about pulleys 204 and 206. One of pulleys 204 and 206 is illustratively a drive pulley while the other is illustratively an idler pulley. The drive pulley is illustratively rotatably driven by a conveyance motor (not shown), which can be an electric motor, a pneumatic motor, a hydraulic motor, etc. Belt 200 is driven generally in the direction indicated by arrow 208

Therefore, when seeds are moved by rotating element 181 to the seed discharge area 190, where they are discharged from the seed cells in rotating element 181, they are illustratively positioned within the bristles 202 by the projections 182 that push the seed into the bristles. Assistive seed delivery system 166 illustratively includes walls that form an enclosure around the bristles, so that, as the bristles move in the direction indicated by arrow 208, the seeds are carried along with them from the seed discharge area 190 of the metering mechanism, to a discharge area 210 either at ground level, or below ground level within a trench or furrow 162 that is generated by the furrow opener 114 on the row unit 106.

Additionally, a seed sensor 203 is also illustratively coupled to assistive seed delivery system 166. As the seeds are moved in bristles 202 past sensor 203, sensor 203 can detect the presence or absence of a seed. Some examples of seed sensor 203 includes an optical sensor or reflective sensor.

Figure 8:
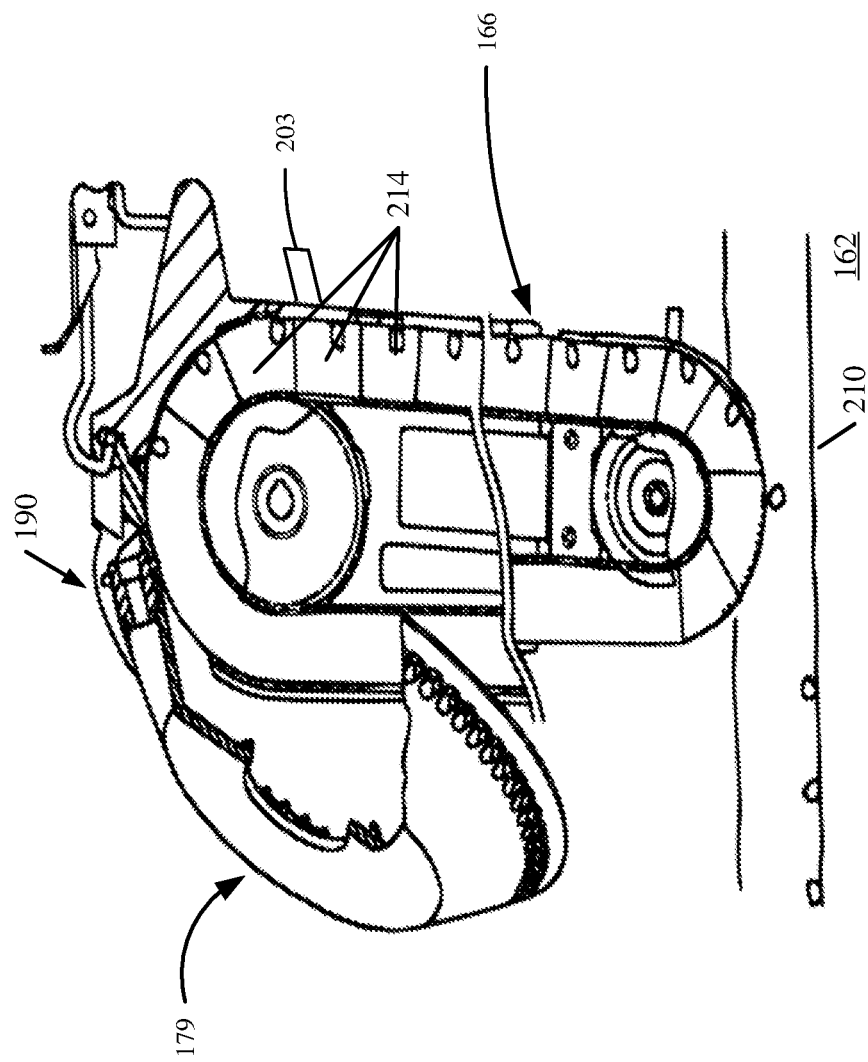
FIG. 8 shows an example of a seed delivery system that can be used with a seed metering system.

FIG. 8 is similar to FIG. 7, except that seed delivery system 166 is not formed by a belt with distally extending bristles. Instead, it is formed by a flighted belt (transport mechanism) in which a set of paddles 214 form individual chambers (or receivers), into which the seeds are dropped, from the seed discharge area 190 of the metering mechanism. The flighted belt moves the seeds from the seed discharge area 190 to the exit end 210 of the flighted belt, within the trench or furrow 162.

There are a wide variety of other types of seed delivery systems as well, that include a transport mechanism and a receiver that receives a seed. For instance, they include dual belt delivery systems in which opposing belts receive, hold and move seeds to the furrow, a rotatable wheel that has sprockets which catch seeds from the metering system and move them to the furrow, multiple transport wheels that operate to transport the seed to the furrow, an auger, among others.

Figure 9:
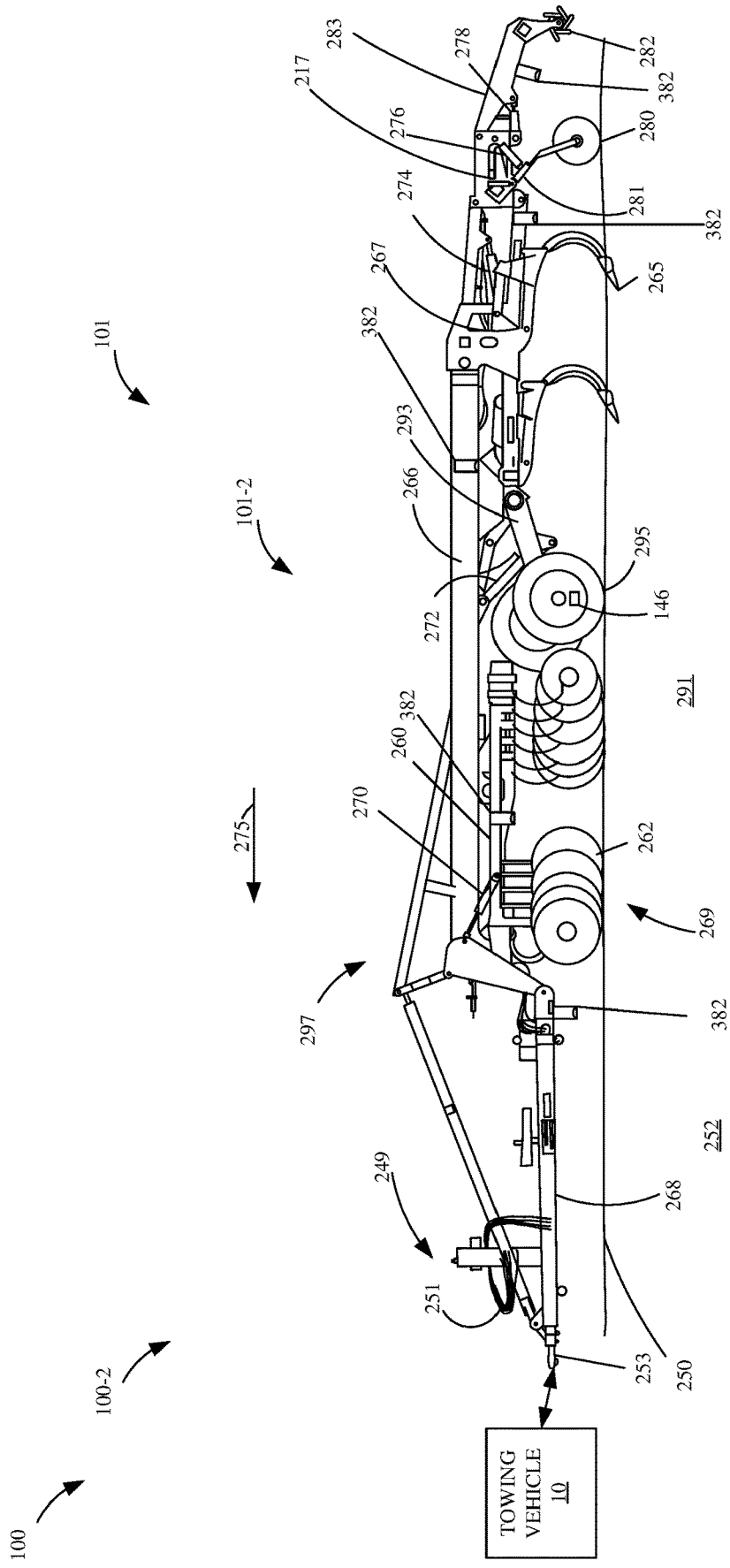
FIG. 9 is a partial side view and partial block diagram showing one example of a mobile agricultural ground engaging machine as a mobile agricultural tillage machine that can be used with the agricultural ground engaging system architecture shown in FIG. 1 and FIG. 10.

FIG. 9 is a partial side view, partial block diagram showing one example of a mobile agricultural ground engaging machine 100, in the form of a mobile agricultural tillage machine 100-2, that includes a ground engaging implement 101 in the form of a tillage implement 101-2 and a towing vehicle 10. As shown tillage implement 101-2 is towed by towing vehicle 10 in the direction indicated by arrow 275 and operates at a field 291. Tillage implement 101-2 includes a plurality of tools that can engage the surface 250 of the ground 291 or penetrate the sub-surface 252 of the ground 292. As illustrated, tillage implement 101-3 may include, as tools, forward disks 262 (which form a disk gang 269), shanks 265, rearward disks 280, and roller basket 282. In other examples, tillage implement 101-2 can include various other kinds of tools, such as tines. As illustrated, implement 101-2 may include a connection assembly 249 for coupling to the towing vehicle 10. Connection assembly that includes a mechanical connection mechanism 253 (shown as a hitch) as well as a connection harness 251 which may include a plurality of different connection lines, which may provide, among other things, power, fluid (e.g., hydraulics or air, or both), as well as communication. In some examples, implement 101-2 may include its own power and fluid sources. The connection lines of connection harness 251 may form a conduit for delivering power and/or fluid to the various actuators on implement 101-2.

As illustrated in FIG. 9, implement 101-2 can include a plurality of actuators. Actuators 270 are coupled between subframe 260 and main frame 266 and are controllably actuatable to change a position of the subframe 260 relative to the main frame 266 in order to change a position of the disks 262 relative to the main frame 266 as well as to apply a downforce to the disks 262.

Actuators 272 are coupled between a wheel frame 293 and main frame 266 and are controllably actuatable to change a position of the wheels 295 relative to the main frame 266 and thus change a distance between main frame 266 and the surface 250 of the field 291 as well as to apply a downforce to the wheels 295. Thus, actuators 272 can be used to control the depth of the various tools of implement 101-3. Additionally, each wheel 295 can include a respective actuator 272 that is separately controllable such that the implement 101-3 can be leveled across its width. For instance, where the ground near a left wheel 295 is lower than the ground by a right wheel, the left wheel can be extended farther, by controllably actuating a respective actuator 272, than the right wheel 295 to level the implement 101-3 across its width. Additionally, a tillage implement 101-2 may include a plurality of wheels 295 across both its width and across its fore-to-aft length such that both side-to-side leveling and fore-to-aft (e.g., front-to-back, or vice versa) leveling can be achieved by variably controlling the separate wheels. These additional wheels can be coupled to the main frame or to subframes such that wing leveling can also occur.

As shown, hinge or pivot assembly 297 allows for movement of main frame 266 relative to hitch frame 268.

Actuators 274 are coupled between tool frame 267 and main frame 266 and are controllably actuatable to change a position of tools 265 as well as to apply a downforce to tools 265. While tools 265 are shown as ripper shanks, in other examples a tillage implement 101 may include other tools, alternatively or in addition to ripper shanks 265, such as tines.

Actuators 276 are coupled between tool frame 281 and main frame 266 and are controllably actuatable to change a position of tools 280 as well as to apply a downforce to tools 280. While tools 280 are shown as disks, in other examples a tillage implement 101-2 may include other tools, alternatively or in addition to disks 280, such as tines.

Actuators 278 are coupled between tool frame 283 and main frame 266 and are actuatable to change a position of tools 282 as well as apply a downforce to tools 282. Tools 282 are illustratively roller baskets.

It will be noted that mobile tillage machine 100-2 can include a variety of in-situ sensors 308, some of which are shown in FIG. 9. For example, mobile tillage machine 100-2 can include one or more sensors 146, which can detect the movement of traction elements (e.g., wheels 295 or wheels or tracks of towing vehicle 10, or both) to detect a speed or heading, or both, of mobile tillage machine 100-2. For example, tillage machine 100-2 can include one or more observation sensor systems 382 that detect a height of a frame (e.g., main frame 266 or a tool frame, such as tool frame 260 or another tool frame) above the surface 250 of the field 291, which can indicate the depth of tool(s). In other examples, mobile tillage machine 100-2 can include sensors that detect the displacement of tool(s) or actuators, such as linear transducers, linear encoders, potentiometers, hall effect sensors, as well as various other types of sensors, which can be indicative of the depth of tool(s). Additionally, observation sensor systems 382 may include one or more sensors that detect one or more soil properties, such as soil moisture, soil temperature, soil nutrients, bulk density, as well as various other soil properties. Observation sensor systems 382 may observe the field. Observation sensor systems 382 may include on or more of an imaging system (e.g., stereo or mono camera), optical sensors, radar (e.g., ground penetrating radar), lidar, ultrasonic sensors, infrared sensors, electromagnetic induction sensors, as well as a variety of other sensors. Observation sensor systems 382 can be disposed on implement 101-2 or towing vehicle 10, or both. While not shown in FIG. 9, it will be noted that tillage machine 100-2 can include a variety of other types of sensors, including a variety of other types of soil property sensors, some of which will be discussed in further detail below.

Figure 10:
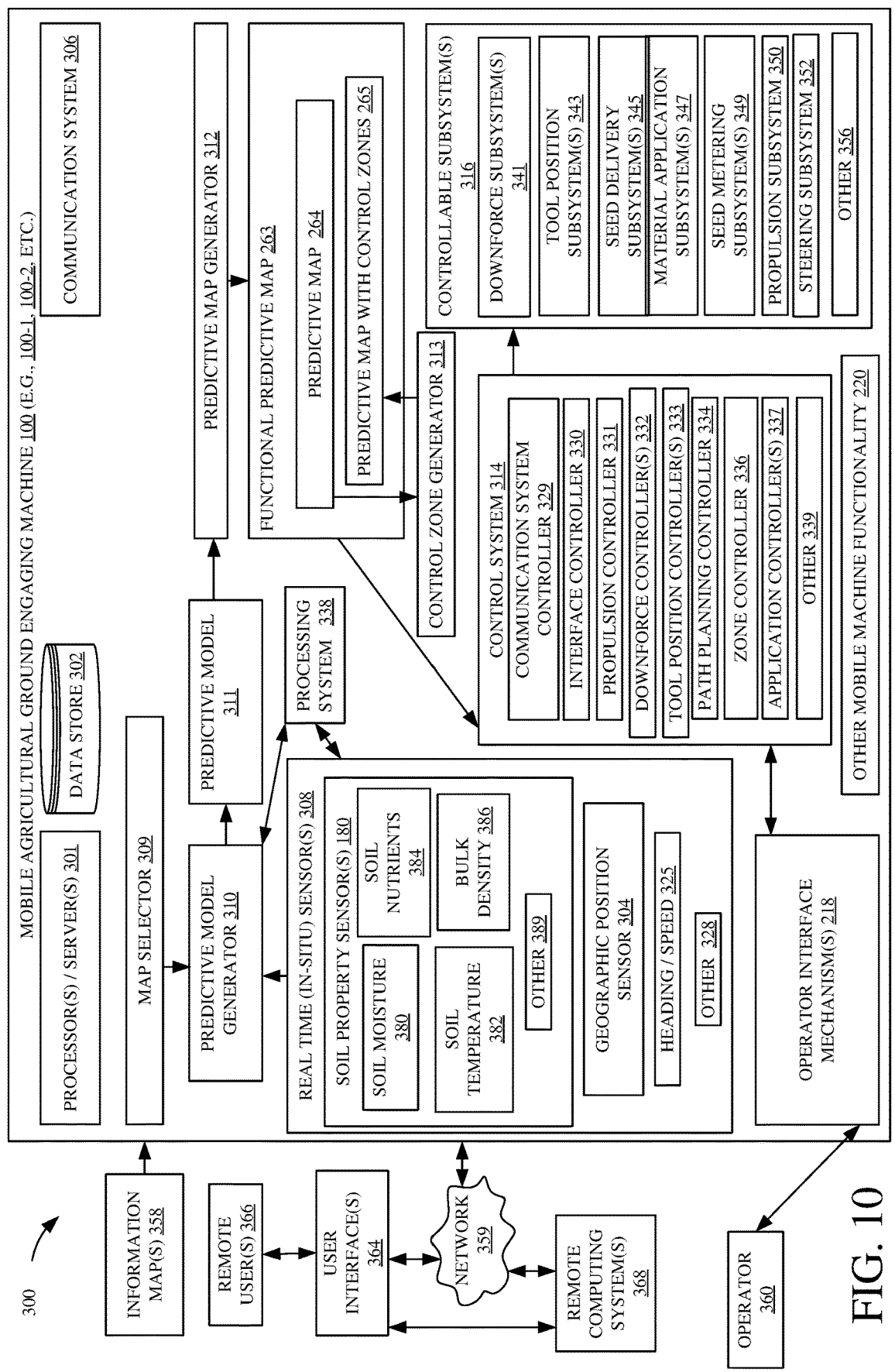
FIG. 10 is a block diagram showing some portions of an agricultural ground engaging system, including a mobile machine, in more detail, according to some examples of the present disclosure.

FIG. 10 is a block diagram showing some portions of an agricultural ground engaging system architecture 300. FIG. 10 shows that agricultural ground engaging system architecture 300 includes mobile agricultural ground engaging machine 100 (e.g., planting machine 100-1, or tillage machine 100-2, etc.), one or more remote computing systems 368, one or more remote user interfaces 364, network 359, and one or more information maps 358. Mobile ground engaging machine 100, itself, illustratively includes one or more processors or servers 301, data store 302, communication system 306, one or more in-situ sensors 308 that sense one or more characteristics at a worksite concurrent with an operation, and a processing system 338 that processes the sensors data (e.g., sensor signals, images, etc.) generated by in-situ sensors 308 to generate processed sensor data. The in-situ sensors 308 generate values corresponding to the sensed characteristics. Mobile machine 100 also includes a predictive model or relationship generator (collectively referred to hereinafter as "predictive model generator 310"), predictive model or relationship (collectively referred to hereinafter as "predictive model 311"), predictive map generator 312, control zone generator 313, control system 314, one or more controllable subsystems 316, and an operator interface mechanism 318. The mobile machine 100 can also include a wide variety of other machine functionality 320.

The in-situ sensors 308 can be on-board mobile machine 100, remote from mobile machine, such as deployed at fixed locations on the worksite or on another machine operating in concert with mobile machine 100, such as an aerial vehicle or a ground-based vehicle, and other types of sensors, or a combination thereof. In-situ sensors 308 sense characteristics of a worksite during the course of an operation. In-situ sensors 308 illustratively include soil property sensors 180, heading/speed sensors 325, and can include various other sensors 328, such as the various other sensors described in FIGS. 1-8. Soil property sensors 180 illustratively include one or more soil moisture sensors 380, one or more soil temperature sensors 382, one or more soil nutrients sensors 384, one or more bulk density sensors 386, and can include other types of soil property sensors 389. Soil property sensors 180 provide sensor data (e.g., signals, images, etc.) indicative of soil properties. While previous FIGS. show various soil property sensors 180 (e.g., 176, 178, 240, 242, 244, and 382) disposed on implement 101, in some examples, one or more soil property sensors 180 may be deposed on towing vehicle 10 or at other locations on implement 101.

Soil moisture sensors 380 detect a moisture of soil at the field. The soil moisture sensors 380 may be disposed to observe the field ahead of and around mobile machine 100, or ahead and around various components (e.g., ground engaging tools) of mobile machine 100. In one example, soil moisture sensors may detect a furrow. Soil moisture sensors 380 can include contact or non-contact sensors, or both. For example, soil moisture sensors 380 may include one or more of imaging systems (e.g., stereo or mono cameras), optical sensors, ultrasonic sensors, infrared sensors, moisture probes, capacitance sensors, inductive moisture sensors, as well as a variety of other sensors. In some examples, soil moisture sensors 380 may detect or otherwise indicate a soil moisture gradient. For example, when detecting the furrow 162 (e.g., side walls of the furrow), a soil moisture gradient may be detected. That is, the soil moisture may vary along the depth of the furrow 162. This variance can be detected.

Soil temperature sensors 382 detect a temperature of soil at the field. The soil moisture sensors 382 may be disposed to observe the field ahead of and around mobile machine 100, or ahead and around various components (e.g., ground engaging tools) of mobile machine 100. In one example, soil temperature sensors 382 may detect a furrow. Soil temperature sensors 382 can include contact or non-contact sensors, or both. For example, soil temperature sensors 382 may include one or more of imaging systems (e.g., stereo or mono cameras), optical sensors, ultrasonic sensors, infrared sensors, temperature probes, capacitance sensors, thermocouples, thermistors, thermopiles, as well as a variety of other sensors. In some examples, soil temperature sensors 382 may detect or otherwise indicate a soil temperature gradient. For example, when detecting the furrow 162 (e.g., side walls of the furrow), a soil temperature gradient may be detected. That is, the soil temperature may vary along the depth of the furrow 162. This variance can be detected.

Soil nutrient sensors 384 detect nutrient levels of soil at the field. The soil nutrient sensors 384 may be disposed to observe the field ahead of and around mobile machine 100, or ahead and around various components (e.g., ground engaging tools) of mobile machine 100. In one example, soil nutrient sensors 384 may detect a furrow. Soil nutrient sensors 384 can include contact or non-contact sensors, or both. For example, soil nutrient sensors 384 may include one or more of imaging systems (e.g., stereo or mono cameras), optical sensors, infrared sensors, as well as a variety of other sensors. In one example, soil nutrient sensors 384 utilize spectroscopy (e.g., infrared or near-infrared spectroscopy) which emits and detects electromagnetic radiation absorbed or reflected from, or both, soil nutrients in the soil. In other examples, soil nutrient sensor may include a capacitive or resistive sensor. These are merely some examples.

Bulk density sensors 386 detect bulk density of the soil at the field. Bulk density is the density of soil. Bulk density is generally an indicator of soil compaction or soil resistance. The bulk density sensor 386 may be disposed to observe the field ahead of and around mobile machine 100, or ahead and around various components (e.g., ground engaging tools) of mobile machine 100. In one example, soil temperature sensors 382 may detect a furrow. Bulk density sensors 386 can include contact or non-contact sensors, or both. For example, bulk density sensors may include one or more of imaging systems (e.g., stereo or mono cameras), optical sensors, radar (e.g., ground penetrating radar), lidar, soil probes, such as a penetrometer, electromagnetic induction sensors, as well as a variety of other sensors. These are merely some examples.

Geographic position sensors 304 illustratively sense or detect the geographic position or location of mobile machine 100. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors. Geographic positions sensors 304 can be on towing vehicle 10 or implement 101, or both.

Heading/speed sensors 325 detect a heading and speed at which mobile machine 100 is traversing the worksite during the operation. This can include sensors that sense the movement of ground-engaging elements (e.g., wheels or tracks of towing vehicle 10 or implement 101, or both), such as sensors 146, or can utilize signals received from other sources, such as geographic position sensor 304, thus, while heading/speed sensors 325 as described herein are shown as separate from geographic position sensor 304, in some examples, machine heading/speed is derived from signals received from geographic positions sensor 304 and subsequent processing. In other examples, heading/speed sensors 325 are separate sensors and do not utilize signals received from other sources.

Other in-situ sensors 328 may be any of the sensors described above with respect to FIGS. 1-9. Other in-situ sensors 328 can be on-board mobile machine 100 or can be remote from mobile machine 100, such as other in-situ sensors 328 on-board another mobile machine that capture in-situ data of the worksite or sensors at fixed locations throughout the worksite. The remote data from remote sensors can be obtained by mobile machine 100 via communication system 306 over network 359.

In-situ data includes data taken from a sensor on-board the mobile machine 100 or taken by any sensor where the data are detected during the operation of mobile machine 100 at a worksite.

Processing system 338 processes the sensor signals generated by in-situ sensors 308 to generate processed sensor data indicative of one or more characteristics. For example, processing system generates processed sensor data indicative of characteristic values based on the sensor data generated by in-situ sensors 308, such as soil property values based on sensor data generated by soil property sensors 180, for instance soil moisture values based on sensor data generated by soil moisture sensors 380, soil temperature values based on sensor data generated by soil temperature sensors 382, soil nutrient values based on sensor data generated by soil nutrients sensors 384, and bulk density values based on sensor data generated by bulk density sensors 386, as well as various other soil property values based on sensor data generated by various other soil property sensors 389. Processing system 338 also processes sensor signals generated by other in-situ sensors 308 to generate processed sensor data indicative of other characteristic values, for instance machine speed (travel speed, acceleration, deceleration, etc.) values based on sensor data generated by heading/speed sensors 325, machine heading values based on sensor data generated by heading/speed sensors 325, as well as various other values based on sensors signals generated by various other in-situ sensors 328.

It will be understood that processing system 338 can be implemented by one or more processers or servers, such as processors or servers 301. Additionally, processing system 338 can utilize various sensor signal filtering techniques, noise filtering techniques, sensor signal categorization, aggregation, normalization, as well as various other processing functionality. Similarly, processing system 338 can utilize various image processing techniques such as, sequential image comparison, RGB, edge detection, black/white analysis, machine learning, neural networks, pixel testing, pixel clustering, shape detection, as well any number of other suitable image processing and data extraction functionality.

Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, mobile machine 100 can be controlled remotely by remote computing systems 368 or by remote users 366, or both. As will be described below, in some examples, one or more of the components shown being disposed on mobile machine 100 in FIG. 10 can be located elsewhere, such as at remote computing systems 368.

FIG. 10 also shows that an operator 360 may operate mobile machine 100. The operator 360 interacts with operator interface mechanisms 218. In some examples, operator interface mechanisms 218 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 360 may interact with operator interface mechanisms 218 using touch gestures. These examples described above are provided as illustrative examples and are not intended to limit the scope of the present disclosure. Consequently, other types of operator interface mechanisms 218 may be used and are within the scope of the present disclosure.

FIG. 10 also shows remote users 366 interacting with mobile machine 100 or remote computing systems 368, or both, through user interfaces mechanisms 364 over network 359. In some examples, user interface mechanisms 364 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, users 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

FIG. 10 also shows that mobile machine 100 can obtain one or more information maps 358. As described herein, the information maps 358 include, for example, a topographic map, an optical map, a soil moisture map, a soil type map, a prior operation map, a vegetation characteristic map, as well as various other maps. However, information maps 358 may also encompass other types of data, such as other types of data that were obtained prior to a ground engaging operation or a map from a prior operation. In other examples, information maps 358 can be generated during a current operation, such a map generated by predictive map generator 312 based on a predictive model 311 generated by predictive model generator 310.

Information maps 358 may be downloaded onto mobile machine 100 over network 359 and stored in data store 302, using communication system 306 or in other ways. In some examples, communication system 306 may be a cellular communication system, a system for communicating over a wide area network or a local area network, a system for communicating over a near field communication network, or a communication system configured to communicate over any of a variety of other networks or combinations of networks. Network 264 illustratively represents any or a combination of any of the variety of networks. Communication system 306 may also include a system that facilitates downloads or transfers of information to and from a secure digital (SD) card or a universal serial bus (USB) card or both.

Predictive model generator 310 generates a model that is indicative of a relationship between the values sensed by the in-situ sensors 308 and values mapped to the field by the information maps 358. For example, if the information map 358 maps topographic values to different locations in the worksite, and the in-situ sensor 308 are sensing values indicative of one or more soil properties, then model generator 310 generates a predictive soil property model that models the relationship between the topographic values and the soil property values. This merely an example. In other examples, the information maps 358 can map various other values, such as optical characteristic values, soil moisture values, soil type values, prior operation characteristic values, vegetation characteristic values, as well as a variety of other characteristic values to different locations in the worksite, the in-situ sensor 308 can sense values indicative of one or more soil properties, and the model generator 310 generates predictive soil property model(s) that respectively model the relationship between the mapped values (e.g., topographic values, optical characteristic values, soil moisture values, soil type values, prior operation characteristic values, vegetation characteristic values, and other characteristic values) and the values of the one or more soil properties.

In another example, predictive model generator generates a predictive soil property model that models a relationship between one or more mapped values, such as one or more of mapped topographic values, mapped optical characteristic values, mapped soil moisture values, mapped soil type values, mapped prior operation characteristic values, mapped vegetation characteristic value, and other mapped characteristic values and values of one or more soil properties, such as one or more of soil moisture values, soil temperature values, soil nutrient values, and bulk density values.

In some examples, the predictive map generator 312 uses the predictive models generated by predictive model generator 310 to generate functional predictive map(s) that predict the value of a characteristic, such as a soil property, sensed by the in-situ sensors 308 at different locations in the worksite based upon one or more of the information maps 358. For example, where the predictive model is a predictive soil property model that models a relationship between one or more soil properties (e.g., soil moisture, soil temperature, soil nutrients, bulk density, etc.) sensed by in-situ sensors 308 and one or more of topographic values from a topographic map, optical characteristic values from an optical map, soil moisture values from a soil moisture map, soil type values from a soil type map, prior operation characteristic values from a prior operation map, and vegetation characteristic values from a vegetation characteristic map, then predictive map generator 312 generates a functional predictive soil property map that predicts values of one or more soil properties at different locations at the worksite based on one or more of the mapped values at those locations and the predictive soil property model.

In some examples, the type of values in the functional predictive map 263 may be the same as the in-situ data type sensed by the in-situ sensors 308. In some instances, the type of values in the functional predictive map 263 may have different units from the data sensed by the in-situ sensors 308. In some examples, the type of values in the functional predictive map 263 may be different from the data type sensed by the in-situ sensors 308 but have a relationship to the type of data type sensed by the in-situ sensors 308. For example, in some examples, the data type sensed by the in-situ sensors 308 may be indicative of the type of values in the functional predictive map 363. In some examples, the type of data in the functional predictive map 363 may be different than the data type in the information maps 358. In some instances, the type of data in the functional predictive map 263 may have different units from the data in the information maps 358. In some examples, the type of data in the functional predictive map 263 may be different from the data type in the information map 358 but has a relationship to the data type in the information map 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 308 and the data type in the information maps 358. In some examples, the type of data in the functional predictive map 263 is the same as one of, or both of, of the in-situ data type sensed by the in-situ sensors 308 and the data type in information maps 358. In some examples, the type of data in the functional predictive map 263 is the same as one of the in-situ data type sensed by the in-situ sensors 308 or the data type in the information maps 358, and different than the other.

As shown in FIG. 10, predictive map 264 predicts the value of a sensed characteristic (sensed by in-situ sensors 308), or a characteristic related to the sensed characteristic, at various locations across the worksite based upon one or more information values in one or more information maps 358 at those locations and using the predictive model 311. For example, if predictive model generator 310 has generated a predictive model indicative of a relationship between topographic values and values of a soil property (e.g., soil moisture values), then, given the topographic value at different locations across the worksite, predictive map generator 312 generates a predictive map 264 that predicts values of the soil property (e.g., soil moisture values) at different locations across the worksite. The topographic value, obtained from the topographic map, at those locations and the relationship between topographic values and the values of the soil property, obtained from the predictive model 311, are used to generate the predictive map 264. This is merely one example.

Some variations in the data types that are mapped in the information maps 358, the data types sensed by in-situ sensors 308, and the data types predicted on the predictive map 264 will now be described.

In some examples, the data type in one or more information maps 358 is different from the data type sensed by in-situ sensors 308, yet the data type in the predictive map 264 is the same as the data type sensed by the in-situ sensors 308. For instance, the information map 358 may be a vegetation characteristic map, and the variable sensed by the in-situ sensors 308 may be a soil property. The predictive map 264 may then be a predictive soil property map that maps predictive values of the soil property to different geographic locations in the in the worksite.

Also, in some examples, the data type in the information map 358 is different from the data type sensed by in-situ sensors 308, and the data type in the predictive map 264 is different from both the data type in the information map 358 and the data type sensed by the in-situ sensors 208.

In some examples, the information map 358 is from a prior pass through the field during a prior operation and the data type is different from the data type sensed by in-situ sensors 308, yet the data type in the predictive map 264 is the same as the data type sensed by the in-situ sensors 308. For instance, the information map 358 may be a prior operation map generated during a previous operation on the field, and the variable sensed by the in-situ sensors 308 may be a soil property. The predictive map 264 may then be a predictive soil property map that maps predictive values of the soil property to different geographic locations in the worksite.

In some examples, the information map 358 is from a prior pass through the field during a prior operation (in the same year or a prior year) and the data type is the same as the data type sensed by in-situ sensors 308, and the data type in the predictive map 264 is also the same as the data type sensed by the in-situ sensors 308. For instance, the information map 358 may be a soil moisture map generated during a previous operation in the same year or a previous year, and the variable sensed by the in-situ sensors 308 may be soil moisture. The predictive map 264 may then be a predictive soil moisture map that maps predictive values of soil moisture to different geographic locations in the field. In such an example, the relative soil moisture differences in the georeferenced information map 358 from earlier in the same year or from a previous year can be used by predictive model generator 310 to generate a predictive model that models a relationship between the relative soil moisture differences on the information map 358 and the ground soil moisture values sensed by in-situ sensors 308 during the current operation. The predictive model is then used by predictive map generator 310 to generate a predictive soil property map. This is merely one example.

In another example, the information map 358 may be a topographic map generated during a prior operation in the same year, and the variable sensed by the in-situ sensors 308 during the current planting operation may be a soil property. The predictive map 264 may then be a predictive soil property map that maps predictive soil property values to different geographic locations in the worksite. In such an example, a map of the topographic values at time of the prior operation is geo-referenced, recorded, and provided to mobile machine 100 as an information map 358 of topographic values. In-situ sensors 308 during a current operation can detect a soil property at geographic locations in the field and predictive model generator 310 may then build a predictive model that models a relationship between the soil property at time of the current operation and topographic values at the time of the prior operation. This is because the topographic values at the time of the prior operation are likely to be the same as at the time of the current operation or may be more accurate or otherwise may be more reliable than topographic values obtained in other ways.

In another example, the information map 358 may be a vegetation characteristic index map generated during the previous year, or earlier in the same year such as when a cover crop was present, and the variable sensed by the in-situ sensors 308 during the current planting operation may be a soil property. The predictive map 264 may then be a predictive soil property map that maps predictive soil property values to different geographic locations in the worksite. In such an example, a map of the vegetation characteristic values earlier in the same year or from the previous year is geo-referenced, recorded, and provided to mobile machine 100 as an information map 358 of vegetative index values. In-situ sensors 308 during a current operation can detect a soil property at geographic locations in the field and predictive model generator 310 may then build a predictive model that models a relationship between the soil property at the time of the current operation and the vegetation characteristic values from earlier in the same year or in the previous year. It may be that the vegetation characteristic values from the previous year or earlier in the same year, such as when a cover crop was present, may be more useful than vegetation characteristic values closer in time to the current planting operation. For example, the amount of biomass previously on the field may be a better indicator of moisture retention.

In some examples, predictive map 264 can be provided to the control zone generator 313. Control zone generator 313 groups adjacent portions of an area into one or more control zones based on data values of predictive map 264 that are associated with those adjacent portions. A control zone may include two or more contiguous portions of a worksite, such as a field, for which a control parameter corresponding to the control zone for controlling a controllable subsystem is constant. For example, a response time to alter a setting of controllable subsystems 316 may be inadequate to satisfactorily respond to changes in values contained in a map, such as predictive map 264. In that case, control zone generator 313 parses the map and identifies control zones that are of a defined size to accommodate the response time of the controllable subsystems 316. In another example, control zones may be sized to reduce wear from excessive actuator movement resulting from continuous adjustment. In some examples, there may be a different set of control zones for each controllable subsystem 316 or for groups of controllable subsystems 316. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265.

It will also be appreciated that control zone generator 313 can cluster values to generate control zones and the control zones can be added to predictive control zone map 265, or a separate map, showing only the control zones that are generated. In some examples, the control zones may be used for controlling or calibrating mobile machine 100 or both. In other examples, the control zones may be presented to the operator 360 and used to control or calibrate mobile machine 100, and, in other examples, the control zones may be presented to the operator 360 or another user, such as a remote user 366, or stored for later use.

Predictive map 264 or predictive control zone map 265 or both are provided to control system 314, which generates control signals based upon the predictive map 264 or predictive control zone map 265 or both. In some examples, communication system controller 329 controls communication system 306 to communicate the predictive map 264 or predictive control zone map 265 or control signals based on the predictive map 264 or predictive control zone map 265 to other mobile machines that are operating at the same worksite or in the same operation. In some examples, communication system controller 329 controls the communication system 306 to send the predictive map 264, predictive control zone map 265, or both to other remote systems, such as remote computing systems 368.

Control system 314 can include communication system controller 329, interface controller 330, propulsion controller 331, one or more downforce controllers 332, one or more tool position controller 333, path planning controller 334, zone controller 336, one or more application controllers 337, and control system 314 can include other items 339. Controllable subsystems 316 can include downforce subsystem 341, tool position subsystem 343, seed delivery subsystem 345, material application subsystem 347, seed metering subsystem 349, propulsion subsystem 350, steering subsystem 352, and subsystem 316 can include a wide variety of other controllable subsystems 356.

It should be noted that some forms of mobile agricultural ground engaging machines 100 may not apply material to the field, for example, tillage machines (e.g., tillage machine 100-2) may not apply material to the field. In such examples, mobile agricultural ground engaging machine 100 (e.g., tillage machine 100-2) may not include application controllers 337, seed delivery subsystem 345, material application subsystem 347, and seed metering subsystem 349.

Interface controller 330 is operable to generate control signals to control interface mechanisms, such as operator interface mechanisms 318 or user interfaces 364, or both. The interface controller 330 is also operable to present the predictive map 264 or predictive control zone map 265 or other information derived from or based on the predictive map 264, predictive control zone map 265, or both, to operator 360 or a remote user 366, or both. Operator 360 may be a local operator or a remote operator. As an example, interface controller 330 generates control signals to control a display mechanism to display one or both of predictive map 264 and predictive control zone map 265 for the operator 360 or a remote user 366, or both. Interface controller 330 may generate operator or user actuatable mechanisms that are displayed and can be actuated by the operator or user to interact with the displayed map. The operator or user can edit the map by, for example, correcting a value displayed on the map, based on the operator's or the user's observation.

Path planning controller 334 illustratively generates control signals to control steering subsystem 352 to steer mobile machine 100 according to a desired path or according to desired parameters, such as desired steering angles based on one or more of the predictive map 264 and the predictive control zone map 265. Path planning controller 334 can control a path planning system to generate a route for mobile machine 100 and can control propulsion subsystem 350 and steering subsystem 352 to steer mobile machine 100 along that route. Steering subsystem 352 may include one or more controllable actuators to change orientation (e.g., angular position relative to a frame of towing vehicle 10) of ground engaging elements such as wheels or tracks.

Propulsion controller 331 illustratively generates control signals to control propulsion subsystem 350 to control a speed characteristic of mobile machine 100, such as one or more of travel speed, acceleration, and deceleration, based on one or more of the predictive map 264 and the predictive control zone map 265. Propulsion subsystem 350 may include various powertrain components of mobile machine 100, such as, but not limited to, an engine or motor, and a transmission (or gear box), as well as various other powertrain components.

Downforce controllers 332 illustratively generate control signals to control downforce applied to one or more components of mobile agricultural ground engaging machine 100, such as a downforce applied to a ground engaging tool (e.g., row cleaners, gauge wheels, furrow closers, disks, shanks, tines, roller baskets, etc.). In some examples, the downforce is applied to the tool directly. In some examples, the downforce is applied to an assembly, such as row unit or a tool gang (e.g., disk gang). Downforce controllers 332 generate control signals to control one or more actuators of downforce subsystems 341 (e.g., actuators 126, 153, 183, 270, 272, 274, 276, 278, etc.) to control a downforce applied to a ground engaging tool. Downforce controllers 332 can generate control signals based on the predictive map 264 or the predictive control zone map 265, or both.

Tool position controllers 333 illustratively generate control signals to control a position (e.g., depth, angle, etc.) of one or more ground engaging tools of mobile agricultural ground engaging machine 100. Tool position controllers 333 can generate control signals to control one or more actuators of tool position subsystems 343 (e.g., actuators 154. 183, 270, 272, 274, 276, 278, etc.) to control a position of a ground engaging tool. Tool position controllers 333 can generate control signals based on based on the predictive map 264 or the predictive control zone map 265, or both.

As described above, in some examples, mobile agricultural ground engaging machine 100 may apply material, such as seed or other material (e.g., fertilizer), or both, to the field, and thus includes material application controllers 337. Material application controllers 337 illustratively generates control signals to control the application of material(s) to the field. In some examples, mobile agricultural ground engaging machine 100 may include an assistive seed delivery system (e.g., 166). In such an example, material application controllers 337 can generate control signals to control actuators of seed delivery subsystems 345 (e.g., hydraulic motor, electric motor, pneumatic motors, etc.) to control the actuation (e.g., speed of rotation) of the assistive seed delivery system(s) (e.g., 166) to control the rate at which seeds are delivered to the furrow. Material application controllers 337 can generate control signals to control actuators of material application subsystems 347 (e.g., actuators 109 or 115) to control the application (e.g., rate, amount, timing, whether the material is applied or not, etc.) of material (e.g., fertilizer) to the field. Material application controllers 347 can generate control signals to control actuators of seed metering subsystems 347 (e.g., hydraulic motors, electric motors, pneumatic motors, etc.) to control the actuation (e.g., speed of rotation) of seed metering system(s) (e.g., 179) to control a rate at which seeds are delivered to the seed delivery system (e.g., 120 or 166).

Zone controller 336 illustratively generates control signals to control one or more controllable subsystems 316 to control operation of the one or more controllable subsystems 316 based on the predictive control zone map 265.

Other controllers 339 included on the mobile machine 100, or at other locations in agricultural system 300, can control other subsystems 316 based on the predictive map 264 or predictive control zone map 265 or both as well.

While the illustrated example of FIG. 10 shows that various components of agricultural ground engaging system architecture 300 are located on mobile machine 100, it will be understood that in other examples one or more of the components illustrated on mobile machine 100 in FIG. 10 can be located at other locations, such as one or more remote computing systems 368. For instance, one or more of data stores 302, map selector 309, predictive model generator 310, predictive model 311, predictive map generator 312, functional predictive maps 263 (e.g., and 265), control zone generator 313, and control system 314 can be located remotely from mobile machine 100 but can communicate with (or be communicated to) mobile machine 100 via communication system 306 and network 359. Thus, the predictive models 311 and functional predictive maps 263 may be generated at remote locations away from mobile machine 100 and communicated to mobile machine 100 over network 302, for instance, communication system 306 can download the predictive models 311 and functional predictive maps 263 from the remote locations and store them in data store 302. In other examples, mobile machine 100 may access the predictive models 311 and functional predictive maps 263 at the remote locations without downloading the predictive models 311 and functional predictive maps 263. The information used in the generation of the predictive models 311 and functional predictive maps 263 may be provided to the predictive model generator 310 and the predictive map generator 312 at those remote locations over network 359, for example in-situ sensor data generator by in-situ sensors 308 can be provided over network 359 to the remote locations. Similarly, information maps 358 can be provided to the remote locations.

Similarly, where various components are located remotely from mobile machine 100, those components can receive data from components of mobile machine 100 over network 359. For example, where predictive model generator 310 and predictive map generator 312 are located remotely from mobile machine 100, such as at remote computing systems 368, data generated by in-situ sensors 308 and geographic position sensors 304, for instance, can be communicated to the remote computing systems 368 over network 359. Additionally, information maps 358 can be obtained by remote computing systems 368 over network 359 or over another network.

Figure 11A:
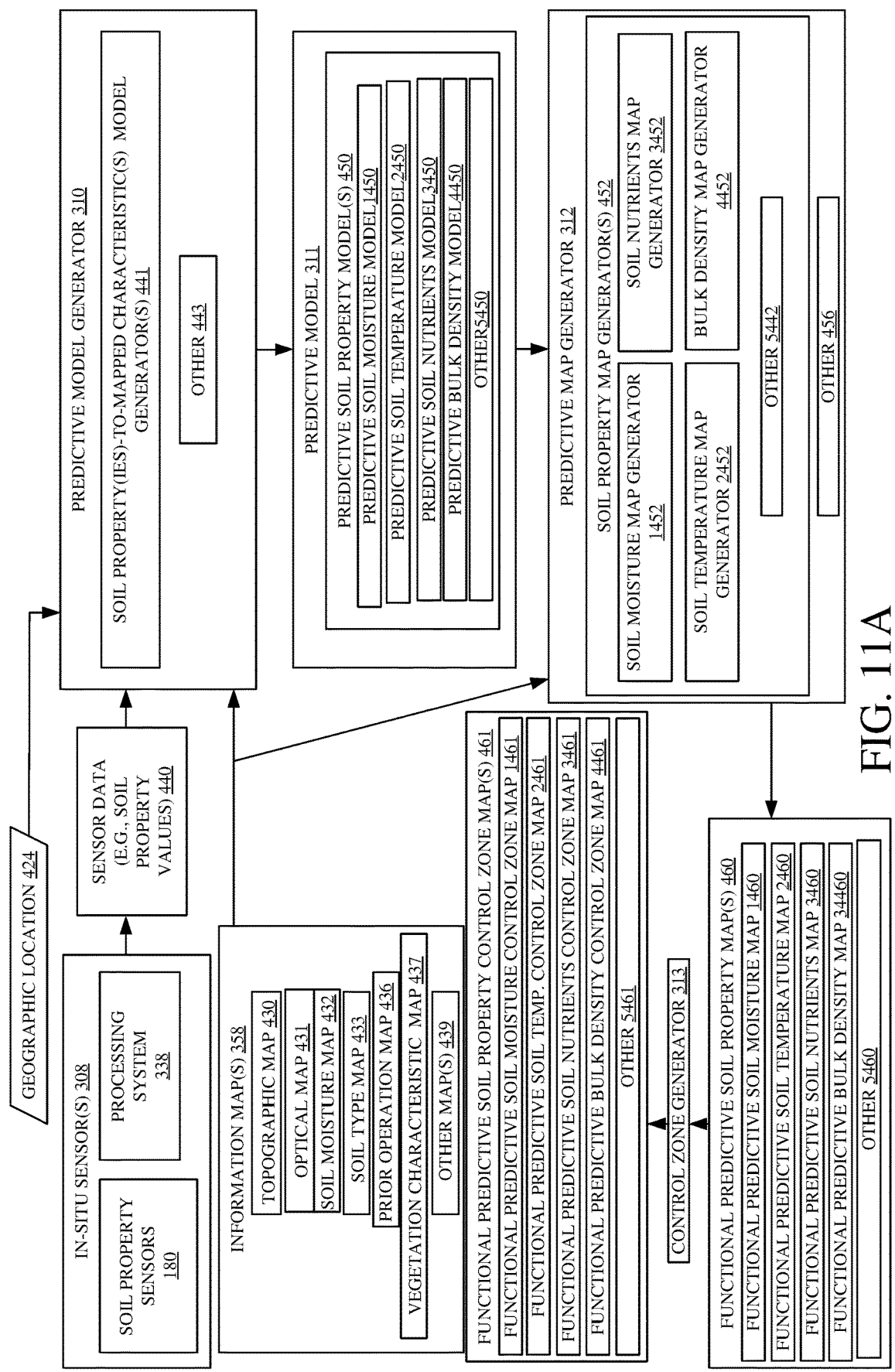
FIG. 11A-11B (collectively referred to herein as FIG. 11) is a block diagram showing one example of a predictive model generator and predictive map generator.
Figure 11B:
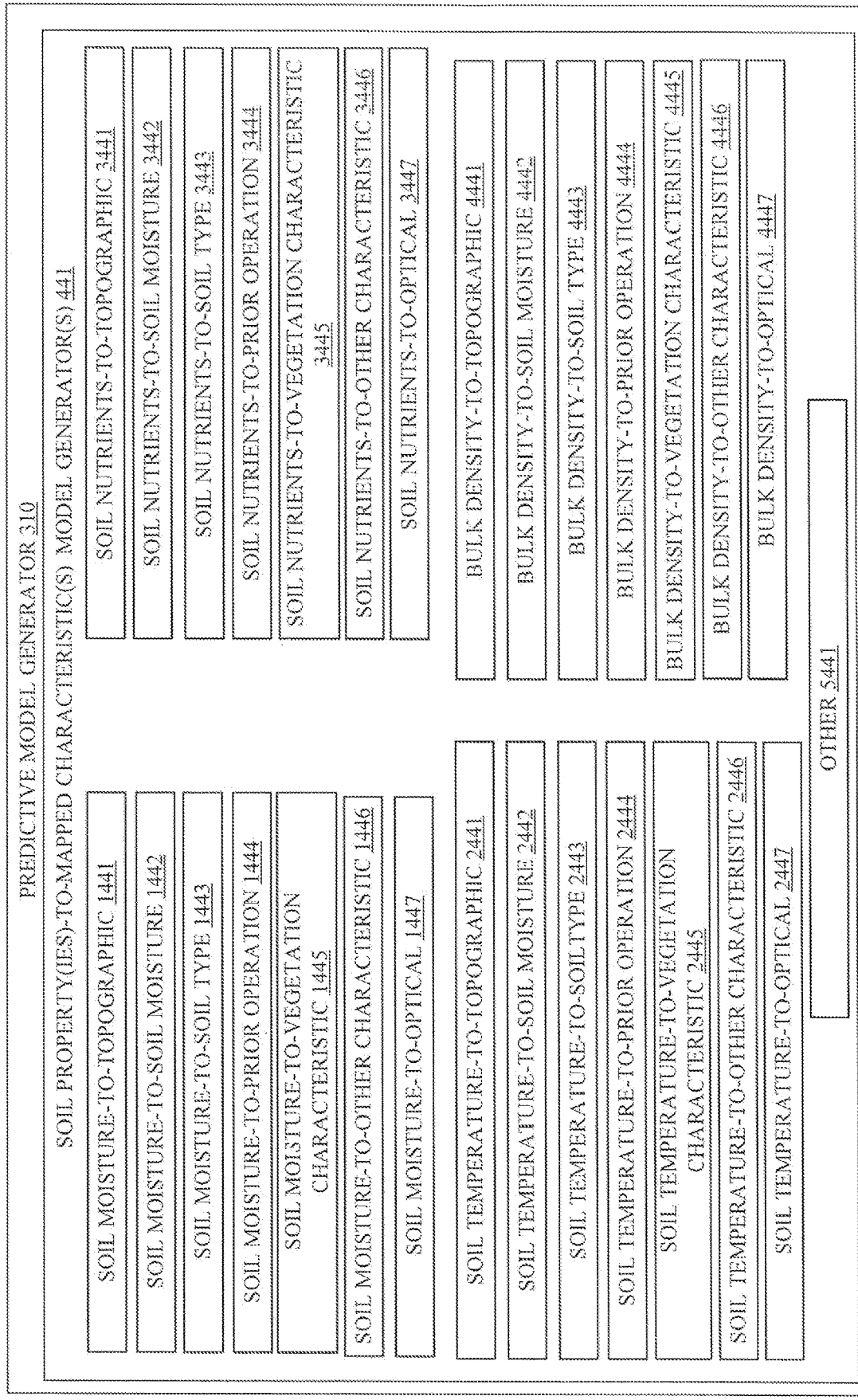

FIG. 11A-11B (collectively referred to herein as FIG. 11) is a block diagram of a portion of the agricultural system architecture 300 shown in FIG. 10. Particularly, FIG. 11 shows, among other things, examples of the predictive model generator 310 and the predictive map generator 312 in more detail. FIG. 11 also illustrates information flow among the various components shown. The predictive model generator 310 receives one or more of a topographic map 430, an optical map 431, a speed map 431, a soil moisture map 432, a soil type map 433, a tillage map 436, a vegetation characteristic map 437, and another type of map 439. Predictive model generator 310 also receives a geographic location 424, or an indication of a geographic location, such as from geographic positions sensor 304. Geographic location 424 illustratively represents the geographic location of a value detected by in-situ sensors 308. In some examples, the geographic position of the mobile machine 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, sensor position (e.g., relative to geographic position sensor), sensor parameters (e.g., field of view, orientation, etc.), and timing circuitry can be used to derive a geographic location at the field to which a value a detected by an in-situ sensor 308 corresponds.

In-situ sensors 308 illustratively include soil property sensors 180, as well as processing system 338. In some examples, processing system 338 is separate from in-situ sensors (such as the example shown in FIG. 10). In some instances, soil property sensors 180 may be located on-board mobile machine 100. As shown in FIG. 10, soil property sensors 180 include soil moisture sensors 380, soil temperature sensors 382, soil nutrients sensors 384, bulk density sensors 386, and can include various other sensors 389 to detect various other soil properties. The processing system 338 processes sensor data generated from soil property sensors 180 to generate processed sensor data 440 indicative of soil property values, such as one or more of soil moisture values, soil temperature values, soil nutrient values, and bulk density values.

As shown in FIG. 11, the example predictive model generator 310 includes a soil property(ies)-to-mapped characteristic(s) model generator 441. In other examples, the predictive model generator 310 may include additional, fewer, or different components than those shown in the example of FIG. 11. Consequently, in some examples, the predictive model generator 310 may include other items 443 as well, which may include other types of predictive model generators to generate other types of models.

Soil property(ies)-to-mapped characteristic(s) model generator 441 identifies a relationship between value(s) of one or more soil properties detected in in-situ sensor data 440, at geographic location(s) to which the value(s) of the one or more soil properties correspond, and value(s) of one or more mapped characteristics from the one or more maps (430-439) corresponding to the same location(s) to which the detected value(s) of the one or more soil properties correspond. Based on this relationship established by soil property(ies)-to-mapped characteristic(s) model generator 441, soil property(ies)-to-mapped characteristic(s) model generator 441 generates a predictive soil property model. The predictive soil property model is used by one or more predictive soil property map generators 452 to predict one or more soil properties at different locations in the worksite based upon one or more of the georeferenced characteristics values contained in the one or more maps (430-439) at the same locations in the worksite. Thus, for a given location in the worksite, value(s) of one or more soil properties can be predicted at the given location based on the predictive soil property model and the value(s) of the one or more mapped characteristics, from the obtained maps, at that given location.

As illustrated in FIG. 10, soil property(ies)-to-mapped characteristic(s) model generator 441 includes soil moisture-to-topographic characteristic model generator 1441, soil moisture-to-soil moisture model generator 1442, soil moisture-to-soil type model generator 1443, soil moisture-to-prior operation characteristic model generator 1444, soil moisture-to-vegetation characteristic model generator 1445, soil moisture-to-other characteristic model generator 1446, soil moisture-to-optical characteristic model generator 1447, soil temperature-to-topographic characteristic model generator 2441, soil temperature-to-soil moisture model generator 2442, soil temperature-to-soil type model generator 2443, soil temperature-to-prior operation characteristic model generator 2444, soil temperature-to-vegetation characteristic model generator 2445, soil temperature-to-other characteristic model generator 2446, soil temperature-to-optical characteristic model generator 2447, soil nutrients-to-topographic characteristic model generator 3441, soil nutrients-to-soil moisture model generator 3442, soil nutrients-to-soil type model generator 3443, soil nutrients-to-prior operation characteristic model generator 3444, soil nutrients-to-vegetation characteristic model generator 3445, soil nutrients-to-other characteristic model generator 3446, soil nutrients-to-optical characteristic model generator 3447, bulk density-to-topographic characteristic model generator 4441, bulk density-to-soil moisture model generator 4442, bulk density-to-soil type model generator 4443, bulk density-to-prior operation characteristic model generator 4444, bulk density-to-vegetation characteristic model generator 4445, bulk density-to-other characteristic model generator 4446, and bulk density-to-optical characteristic model generator 4447.

In other examples, soil property(ies)-to-mapped characteristic(s) model generator 441 may include additional, fewer, or different components than those shown in the example of FIG. 11. Consequently, in some examples, the predictive model generator 441 may include other items 5441 as well, which may include other types of predictive model generators to generate other types of soil property models.

Soil moisture-to-topographic characteristic model generator 1441 identifies a relationship between soil moisture value(s) detected in in-situ sensor data 440, at geographic location(s) to which the soil moisture value(s), detected in the in-situ sensor data 440, correspond, and value(s) of one or more topographic characteristics from the topographic map 430 corresponding to the same geographic location(s) to which the detected soil moisture value(s) correspond. Based on this relationship established by soil moisture-to-topographic characteristic model generator 1441, soil moisture-to-topographic characteristic model generator 1441 generates a predictive soil moisture model, as a soil property model. The predictive soil moisture model is used by soil moisture map generator 1452 to predict soil moisture at different locations in the field based upon the georeferenced values of one or more topographic characteristics contained in the topographic map 430 at the same locations in the field. Thus, for a given location in the field, a soil moisture value can be predicted at the given location based on the predictive soil moisture model and the value(s) of the one or more topographic characteristics, from the topographic map 430, at that given location.

Soil moisture-to-soil moisture model generator 1442 identifies a relationship between soil moisture value(s) detected in in-situ sensor data 440, at geographic location(s) to which the soil moisture value(s), detected in the in-situ sensor data 440, correspond, and soil moisture value(s) from the soil moisture map 432 corresponding to the same geographic location(s) to which the detected soil moisture value(s) correspond. Based on this relationship established by soil moisture-to-soil moisture model generator 1442, soil moisture-to-soil moisture model generator 1442 generates a predictive soil moisture model, as a soil property model. The predictive soil moisture model is used by soil moisture map generator 1452 to predict soil moisture at different locations in the field based upon the georeferenced soil moisture values contained in the soil moisture map 432 at the same locations in the field. Thus, for a given location in the field, a soil moisture value can be predicted at the given location based on the predictive soil moisture model and the soil moisture value, from the soil moisture map 432, at that given location.

Soil moisture-to-soil type model generator 1443 identifies a relationship between soil moisture value(s) detected in in-situ sensor data 440, at geographic location(s) to which the soil moisture value(s), detected in the in-situ sensor data 440, correspond, and soil type value(s) from the soil type map 433 corresponding to the same geographic location(s) to which the detected soil moisture value(s) correspond. Based on this relationship established by soil moisture-to-soil type model generator 1443, soil moisture-to-soil type model generator 1443 generates a predictive soil moisture model, as a soil property model. The predictive soil moisture model is used by soil moisture map generator 1452 to predict soil moisture at different locations in the field based upon the georeferenced soil type values contained in the soil type map 433 at the same locations in the field. Thus, for a given location in the field, a soil moisture value can be predicted at the given location based on the predictive soil moisture model and the soil type value, from the soil type map 433, at that given location.

Soil moisture-to-prior operation characteristic model generator 1444 identifies a relationship between soil moisture value(s) detected in in-situ sensor data 440, at geographic location(s) to which the soil moisture value(s), detected in the in-situ sensor data 440, correspond, and value(s) of one or more prior operation characteristics from the prior operation map 436 corresponding to the same geographic location(s) to which the detected soil moisture value(s) correspond. Based on this relationship established by soil moisture-to-prior operation characteristic model generator 1444, soil moisture-to-prior operation characteristic model generator 1444 generates a predictive soil moisture model, as a soil property model. The predictive soil moisture model is used by soil moisture map generator 1452 to predict soil moisture at different locations in the field based upon the georeferenced values of one or more prior operation characteristics contained in the tillage map 436 at the same locations in the field. Thus, for a given location in the field, a soil moisture value can be predicted at the given location based on the predictive soil moisture model and the value(s) of the one or more prior operation characteristics, from the prior operation map 436, at that given location.

Soil moisture-to-vegetation characteristic model generator 1445 identifies a relationship between soil moisture value(s) detected in in-situ sensor data 440, at geographic location(s) to which the soil moisture value(s), detected in the in-situ sensor data 440, correspond, and vegetation characteristic value(s) from the vegetation characteristic map 437 corresponding to the same geographic location(s) to which the detected soil moisture value(s) correspond. Based on this relationship established by soil moisture-to-vegetation characteristic model generator 1445, soil moisture-to-vegetation characteristic model generator 1445 generates a predictive soil moisture model, as a soil property model. The predictive soil moisture model is used by soil moisture map generator 1452 to predict soil moisture at different locations in the field based upon the georeferenced vegetation characteristic values contained in the vegetation characteristic map 437 at the same locations in the field. Thus, for a given location in the field, a soil moisture value can be predicted at the given location based on the predictive soil moisture model and the vegetation characteristic value, from the vegetation characteristic map 437, at that given location.

Soil moisture-to-other characteristic model generator 1446 identifies a relationship between soil moisture value(s) detected in in-situ sensor data 440, at geographic location(s) to which the soil moisture value(s), detected in the in-situ sensor data 440, correspond, and value(s) of one or more other characteristics from one or more other maps 439 corresponding to the same geographic location(s) to which the detected soil moisture value(s) correspond. Based on this relationship established by soil moisture-to-other characteristic model generator 1446, soil moisture-to-other characteristic model generator 1446 generates a predictive soil moisture model, as a soil property model. The predictive soil moisture model is used by soil moisture map generator 1452 to predict soil moisture at different locations in the field based upon the georeferenced values of one or more other characteristics contained in the one or more other maps 439 at the same locations in the field. Thus, for a given location in the field, a soil moisture value can be predicted at the given location based on the predictive soil moisture model and the value(s) of one or more other characteristics, from the one or more other maps 439, at that given location.

Soil moisture-to-optical characteristic model generator 1447 identifies a relationship between soil moisture value(s) detected in in-situ sensor data 440, at geographic location(s) to which the soil moisture value(s), detected in the in-situ sensor data 440, correspond, and value(s) of one or more optical characteristics from optical map 431 corresponding to the same geographic location(s) to which the detected soil moisture value(s) correspond. Based on this relationship established by soil moisture-to-optical characteristic model generator 1447, soil moisture-to-optical characteristic model generator 1447 generates a predictive soil moisture model, as a soil property model. The predictive soil moisture model is used by soil moisture map generator 1452 to predict soil moisture at different locations in the field based upon the georeferenced values of one or more optical characteristics contained in the optical map 331 at the same locations in the field. Thus, for a given location in the field, a soil moisture value can be predicted at the given location based on the predictive soil moisture model and the value(s) of one or more optical characteristic, from the optical map 431, at that given location.

In light of the above, the predictive model generator 310 is operable to produce a plurality of predictive soil moisture models, such as one or more of the predictive soil moisture models generated by model generators 1441, 1442, 1443, 1444, 1445, 1446, 1447, and 5441. In another example, two or more of the predictive models described above may be combined into a single predictive soil moisture model, such as a predictive soil moisture model that predicts soil moisture based upon two or more of values of one or more topographic characteristics, soil moisture values, soil type values, values of one or more prior operation characteristics, vegetation characteristic values, values of one or more other characteristics, and values of one or more optical characteristics at different locations in the field. Any of these soil moisture models, or combinations thereof, are represented collectively by predictive soil moisture model 1450 in FIG. 11. Soil moisture model 1450 is a predictive soil property model 450.

The predictive soil moisture model 1450 is provided to predictive map generator 312. In the example of FIG. 11, predictive map generator 312 includes soil property map generator 452. Soil property map generator 452 includes soil moisture map generator 1452. In other examples, predictive soil property map generator 452 may include additional or different map generators. Thus, in some examples, predictive soil property map generator 452 may include other items 5442 which may include other types of map generators to generate other types of soil property maps. In other examples, predictive map generator 312 may include additional or different map generators. Thus, in some examples, predictive map generator 312 may include other items 456 which may include other types of map generators to generate other types of maps.

Soil moisture map generator 1452 receives one or more of the topographic map 430, optical map 431, the soil moisture map 432, the soil type map 433, the prior operation map 436, the vegetation characteristic map 437, and other map(s) 439, along with the predictive soil moisture model 1450 which predicts soil moisture based upon one or more of a topographic characteristic value, a soil moisture value, a soil type value, a prior operation characteristic value, a vegetation characteristic value, a value of an other characteristic, an optical characteristic value and generates a predictive map that predicts soil moisture at different locations in the field, such as functional predictive soil moisture map 1460.

Predictive map generator 312 thus outputs a functional predictive soil moisture map 1460, as a functional predictive soil property map 460, that is predictive of soil moisture. Functional predictive soil moisture map 1460 is a predictive map 264. The functional predictive soil moisture map 1460, in one example, predicts soil moisture at different locations in a field. The functional predictive soil moisture map 1460 may be provided to control zone generator 313, control system 314, or both. Control zone generator 313 generates control zones and incorporates those control zones into the functional predictive soil moisture map 1460 to produce a predictive control zone map 265, that is a functional predictive soil moisture control zone map 1461, as a functional predictive soil property control zone map 461.

One or both of functional predictive soil moisture map 1460 and functional predictive soil moisture control zone map 1461 may be provided to control system 314, which generates control signals to control one or more of the controllable subsystems 316 based upon the functional predictive soil moisture map 1460, the functional predictive soil moisture control zone map 1461, or both.

Soil temperature-to-topographic characteristic model generator 2441 identifies a relationship between soil temperature value(s) detected in in-situ sensor data 440, at geographic location(s) to which the soil temperature value(s), detected in the in-situ sensor data 440, correspond, and value(s) of one or more topographic characteristics from the topographic map 430 corresponding to the same geographic location(s) to which the detected soil temperature value(s) correspond. Based on this relationship established by soil temperature-to-topographic characteristic model generator 2441, soil temperature-to-topographic characteristic model generator 2441 generates a predictive soil temperature model, as a soil property model. The predictive soil temperature model is used by soil temperature map generator 2452 to predict soil temperature at different locations in the field based upon the georeferenced values of one or more topographic characteristics contained in the topographic map 430 at the same locations in the field. Thus, for a given location in the field, a soil temperature value can be predicted at the given location based on the predictive soil temperature model and the value(s) of the one or more topographic characteristics, from the topographic map 430, at that given location.

Soil temperature-to-soil moisture model generator 2442 identifies a relationship between soil temperature value(s) detected in in-situ sensor data 440, at geographic location(s) to which the soil temperature value(s), detected in the in-situ sensor data 440, correspond, and soil moisture value(s) from the soil moisture map 432 corresponding to the same geographic location(s) to which the detected soil temperature value(s) correspond. Based on this relationship established by soil temperature-to-soil moisture model generator 2442, soil temperature-to-soil moisture model generator 2442 generates a predictive soil temperature model, as a soil property model. The predictive soil temperature model is used by soil temperature map generator 2452 to predict soil temperature at different locations in the field based upon the georeferenced soil moisture values contained in the soil moisture map 432 at the same locations in the field. Thus, for a given location in the field, a soil temperature value can be predicted at the given location based on the predictive soil temperature model and the soil moisture value, from the soil moisture map 432, at that given location.

Soil temperature-to-soil type model generator 2443 identifies a relationship between soil temperature value(s) detected in in-situ sensor data 440, at geographic location(s) to which the soil temperature value(s), detected in the in-situ sensor data 440, correspond, and soil type value(s) from the soil type map 433 corresponding to the same geographic location(s) to which the detected soil temperature value(s) correspond. Based on this relationship established by soil temperature-to-soil type model generator 2443, soil temperature-to-soil type model generator 2443 generates a predictive soil temperature model, as a soil property model. The predictive soil temperature model is used by soil temperature map generator 2452 to predict soil temperature at different locations in the field based upon the georeferenced soil type values contained in the soil type map 433 at the same locations in the field. Thus, for a given location in the field, a soil temperature value can be predicted at the given location based on the predictive soil temperature model and the soil type value, from the soil type map 433, at that given location.

Soil temperature-to-prior operation characteristic model generator 2444 identifies a relationship between soil temperature value(s) detected in in-situ sensor data 440, at geographic location(s) to which the soil temperature value(s), detected in the in-situ sensor data 440, correspond, and value(s) of one or more prior operation characteristics from the prior operation map 436 corresponding to the same geographic location(s) to which the detected soil temperature value(s) correspond. Based on this relationship established by soil temperature-to-prior operation characteristic model generator 2444, soil temperature-to-prior operation characteristic model generator 2444 generates a predictive soil temperature model, as a soil property model. The predictive soil temperature model is used by soil temperature map generator 2452 to predict soil temperature at different locations in the field based upon the georeferenced values of one or more prior operation characteristics contained in the prior operation map 436 at the same locations in the field. Thus, for a given location in the field, a soil temperature value can be predicted at the given location based on the predictive soil temperature model and the value(s) of the one or more prior operation characteristics, from the prior operation map 436, at that given location.

Soil temperature-to-vegetation characteristic model generator 2445 identifies a relationship between soil temperature value(s) detected in in-situ sensor data 440, at geographic location(s) to which the soil temperature value(s), detected in the in-situ sensor data 440, correspond, and vegetation characteristic value(s) from the vegetation characteristic map 437 corresponding to the same geographic location(s) to which the detected soil temperature value(s) correspond. Based on this relationship established by soil temperature-to-vegetation characteristic model generator 2445, soil temperature-to-vegetation characteristic model generator 2445 generates a predictive soil temperature model, as a soil property model. The predictive soil temperature model is used by soil temperature map generator 2452 to predict soil temperature at different locations in the field based upon the georeferenced vegetation characteristic values contained in the vegetation characteristic map 437 at the same locations in the field. Thus, for a given location in the field, a soil temperature value can be predicted at the given location based on the predictive soil temperature model and the vegetation characteristic value, from the vegetation characteristic map 437, at that given location.

Soil temperature-to-other characteristic model generator 2446 identifies a relationship between soil temperature value(s) detected in in-situ sensor data 440, at geographic location(s) to which the soil temperature value(s), detected in the in-situ sensor data 440, correspond, and value(s) of one or more other characteristics from one or more other maps 439 corresponding to the same geographic location(s) to which the detected soil temperature value(s) correspond. Based on this relationship established by soil temperature-to-other characteristic model generator 2446, soil temperature-to-other characteristic model generator 2446 generates a predictive soil temperature model, as a soil property model. The predictive soil temperature model is used by soil temperature map generator 2452 to predict soil temperature at different locations in the field based upon the georeferenced values of one or more other characteristics contained in the one or more other maps 439 at the same locations in the field. Thus, for a given location in the field, a soil temperature value can be predicted at the given location based on the predictive soil temperature model and the value(s) of one or more other characteristics, from the one or more other maps 439, at that given location.

Soil temperature-to-optical characteristic model generator 2447 identifies a relationship between soil temperature value(s) detected in in-situ sensor data 440, at geographic location(s) to which the soil temperature value(s), detected in the in-situ sensor data 440, correspond, and value(s) of one or more optical characteristics from optical map 431 corresponding to the same geographic location(s) to which the detected soil temperature value(s) correspond. Based on this relationship established by soil temperature-to-optical characteristic model generator 2447, soil temperature-to-optical characteristic model generator 2447 generates a predictive soil temperature model, as a soil property model. The predictive soil temperature model is used by soil temperature map generator 2452 to predict soil temperature at different locations in the field based upon the georeferenced values of one or more optical characteristics contained in the optical map 431 at the same locations in the field. Thus, for a given location in the field, a soil temperature value can be predicted at the given location based on the predictive soil temperature model and the value(s) of one or more optical characteristics, from the optical map 431, at that given location.

In light of the above, the predictive model generator 310 is operable to produce a plurality of predictive soil temperature models, such as one or more of the predictive soil temperature models generated by model generators 2441, 2442, 2443, 2444, 2445, 2446, 2447, and 5441. In another example, two or more of the predictive models described above may be combined into a single predictive soil temperature model, such as a predictive soil temperature model that predicts soil temperature based upon two or more of values of one or more topographic characteristics, soil moisture values, soil type values, values of one or more prior operation characteristics, vegetation characteristic values, values of one or more other characteristics, and values of one or more optical characteristics at different locations in the field. Any of these soil temperature models, or combinations thereof, are represented collectively by predictive soil temperature model 2450 in FIG. 11. Soil temperature model 2450 is a predictive soil property model 450.

The predictive soil temperature model 2450 is provided to predictive map generator 312. In the example of FIG. 11, predictive map generator 312 includes soil property map generator 452. Soil property map generator 452 includes soil temperature map generator 2452. In other examples, predictive soil property map generator 452 may include additional or different map generators. Thus, in some examples, predictive soil property map generator 452 may include other items 5442 which may include other types of map generators to generate other types of soil property maps. In other examples, predictive map generator 312 may include additional or different map generators. Thus, in some examples, predictive map generator 312 may include other items 456 which may include other types of map generators to generate other types of maps.

Soil temperature map generator 2452 receives one or more of the topographic map 430, the optical map 431, the soil moisture map 432, the soil type map 433, the prior operation map 436, the vegetation characteristic map 437, and other map(s) 439, along with the predictive soil temperature model 2450 which predicts soil temperature based upon one or more of a topographic characteristic value, a soil moisture value, a soil type value, a prior operation characteristic value, a vegetation characteristic value, a value of an other characteristic, and an optical characteristic value, and generates a predictive map that predicts soil temperature at different locations in the field, such as functional predictive soil temperature map 2460.

Predictive map generator 312 thus outputs a functional predictive soil temperature map 2460, as a functional predictive soil property map 460, that is predictive of soil temperature. Functional predictive soil temperature map 2460 is a predictive map 264. The functional predictive soil temperature map 2460, in one example, predicts soil temperature at different locations in a field. The functional predictive soil temperature map 2460 may be provided to control zone generator 313, control system 314, or both. Control zone generator 313 generates control zones and incorporates those control zones into the functional predictive soil temperature map 2460 to produce a predictive control zone map 265, that is a functional predictive soil temperature control zone map 2461, as a functional predictive soil property control zone map 461.

One or both of functional predictive soil temperature map 2460 and functional predictive soil temperature control zone map 2461 may be provided to control system 314, which generates control signals to control one or more of the controllable subsystems 316 based upon the functional predictive soil temperature map 2460, the functional predictive soil temperature control zone map 2461, or both.

Soil nutrients-to-topographic characteristic model generator 3441 identifies a relationship between soil nutrients value(s) detected in in-situ sensor data 440, at geographic location(s) to which the soil nutrients value(s), detected in the in-situ sensor data 440, correspond, and value(s) of one or more topographic characteristics from the topographic map 430 corresponding to the same geographic location(s)

to which the detected soil nutrients value(s) correspond. Based on this relationship established by soil nutrients-to-topographic characteristic model generator 3441, soil nutrients-to-topographic characteristic model generator 3441 generates a predictive soil nutrients model, as a soil property model. The predictive soil nutrients model is used by soil nutrients map generator 3452 to predict soil nutrients at different locations in the field based upon the georeferenced values of one or more topographic characteristics contained in the topographic map 430 at the same locations in the field. Thus, for a given location in the field, a soil nutrient value can be predicted at the given location based on the predictive soil nutrients model and the value(s) of the one or more topographic characteristics, from the topographic map 430, at that given location.

Soil nutrients-to-soil moisture model generator 3442 identifies a relationship between soil nutrients value(s) detected in in-situ sensor data 440, at geographic location(s) to which the soil nutrients value(s), detected in the in-situ sensor data 440, correspond, and soil moisture value(s) from the soil moisture map 432 corresponding to the same geographic location(s) to which the detected soil nutrients value(s) correspond. Based on this relationship established by soil nutrients-to-soil moisture model generator 3442, soil nutrients-to-soil moisture model generator 3442 generates a predictive soil nutrients model, as a soil property model. The predictive soil nutrients model is used by soil nutrients map generator 3452 to predict soil nutrients at different locations in the field based upon the georeferenced soil moisture values contained in the soil moisture map 432 at the same locations in the field. Thus, for a given location in the field, a soil nutrient value can be predicted at the given location based on the predictive soil nutrients model and the soil moisture value, from the soil moisture map 432, at that given location.

Soil nutrients-to-soil type model generator 3443 identifies a relationship between soil nutrients value(s) detected in in-situ sensor data 440, at geographic location(s) to which the soil nutrients value(s), detected in the in-situ sensor data 440, correspond, and soil type value(s) from the soil type map 433 corresponding to the same geographic location(s) to which the detected soil nutrients value(s) correspond. Based on this relationship established by soil nutrients-to-soil type model generator 3443, soil nutrients-to-soil type model generator 3443 generates a predictive soil nutrients model, as a soil property model. The predictive soil nutrients model is used by soil nutrients map generator 3452 to predict soil nutrients at different locations in the field based upon the georeferenced soil type values contained in the soil type map 433 at the same locations in the field. Thus, for a given location in the field, a soil nutrient value can be predicted at the given location based on the predictive soil nutrients model and the soil type value, from the soil type map 433, at that given location.

Soil nutrients-to-prior operation characteristic model generator 3444 identifies a relationship between soil nutrients value(s) detected in in-situ sensor data 440, at geographic location(s) to which the soil nutrients value(s), detected in the in-situ sensor data 440, correspond, and value(s) of one or more prior operation characteristics from the prior operation map 436 corresponding to the same geographic location(s) to which the detected soil nutrients value(s) correspond. Based on this relationship established by soil nutrients-to-prior operation characteristic model generator 3444, soil nutrients-to-prior operation characteristic model generator 3444 generates a predictive soil nutrients model, as a soil property model. The predictive soil t nutrients model is used by soil nutrients map generator 3452 to predict soil nutrients at different locations in the field based upon the georeferenced values of one or more prior operation characteristics contained in the prior operation map 436 at the same locations in the field. Thus, for a given location in the field, a soil nutrient value can be predicted at the given location based on the predictive soil nutrients model and the value(s) of the one or more prior operation characteristics, from the prior operation map 436, at that given location.

Soil nutrients-to-vegetation characteristic model generator 3445 identifies a relationship between soil nutrients value(s) detected in in-situ sensor data 440, at geographic location(s) to which the soil nutrients value(s), detected in the in-situ sensor data 440, correspond, and vegetation characteristic value(s) from the vegetation characteristic map 437 corresponding to the same geographic location(s) to which the detected soil nutrients value(s) correspond. Based on this relationship established by soil nutrients-to-vegetation characteristic model generator 3445, soil nutrients-to-vegetation characteristic model generator 3445 generates a predictive soil nutrients model, as a soil property model. The predictive soil nutrients model is used by soil nutrients map generator 3452 to predict soil nutrients at different locations in the field based upon the georeferenced vegetation characteristic values contained in the vegetation characteristic map 437 at the same locations in the field. Thus, for a given location in the field, a soil nutrient value can be predicted at the given location based on the predictive soil temperature model and the vegetation characteristic value, from the vegetation characteristic map 437, at that given location.

Soil nutrients-to-other characteristic model generator 3446 identifies a relationship between soil nutrients value(s) detected in in-situ sensor data 440, at geographic location(s) to which the soil nutrients value(s), detected in the in-situ sensor data 440, correspond, and value(s) of one or more other characteristics from one or more other maps 439 corresponding to the same geographic location(s) to which the detected soil nutrients value(s) correspond. Based on this relationship established by soil nutrients-to-other characteristic model generator 3446, soil nutrients-to-other characteristic model generator 3446 generates a predictive soil nutrients model, as a soil property model. The predictive soil nutrients model is used by soil nutrients map generator 3452 to predict soil nutrients at different locations in the field based upon the georeferenced values of one or more other characteristics contained in the one or more other maps 439 at the same locations in the field. Thus, for a given location in the field, a soil nutrients value can be predicted at the given location based on the predictive soil nutrients model and the value(s) of one or more other characteristics, from the one or more other maps 439, at that given location.

Soil nutrients-to-optical characteristic model generator 3447 identifies a relationship between soil nutrients value(s) detected in in-situ sensor data 440, at geographic location(s) to which the soil nutrients value(s), detected in the in-situ sensor data 440, correspond, and value(s) of one or more optical characteristics from the optical map 431 corresponding to the same geographic location(s) to which the detected soil nutrients value(s) correspond. Based on this relationship established by soil nutrients-to-optical characteristic model generator 3447, soil nutrients-to-optical characteristic model generator 3447 generates a predictive soil nutrients model, as a soil property model. The predictive soil nutrients model is used by soil nutrients map generator 3452 to predict soil nutrients at different locations in the field based upon the georeferenced values of one or more optical characteristics contained in the optical map 431 at the same locations in the field. Thus, for a given location in the field, a soil nutrients value can be predicted at the given location based on the predictive soil nutrients model and the value(s) of one or more optical characteristics, from the optical map 431, at that given location.

In light of the above, the predictive model generator 310 is operable to produce a plurality of predictive soil nutrients models, such as one or more of the predictive soil nutrients models generated by model generators 3441, 3442, 3443, 3444, 3445, 3446, 3447, and 5441. In another example, two or more of the predictive models described above may be combined into a single predictive soil nutrients model, such as a predictive soil nutrients model that predicts soil nutrients based upon two or more of values of one or more topographic characteristics, soil moisture values, soil type values, values of one or more prior operation characteristics, vegetation characteristic values, values of one or more other characteristics, and values of one or more optical characteristics at different locations in the field. Any of these soil nutrients models, or combinations thereof, are represented collectively by predictive soil nutrients model 3450 in FIG. 11. Soil nutrients model 3450 is a predictive soil property model 450.

The predictive soil nutrients model 3450 is provided to predictive map generator 312. In the example of FIG. 11, predictive map generator 312 includes soil property map generator 452. Soil property map generator 452 includes soil nutrients map generator 3452. In other examples, predictive soil property map generator 452 may include additional or different map generators. Thus, in some examples, predictive soil property map generator 452 may include other items 5442 which may include other types of map generators to generate other types of soil property maps. In other examples, predictive map generator 312 may include additional or different map generators. Thus, in some examples, predictive map generator 312 may include other items 456 which may include other types of map generators to generate other types of maps.

Soil nutrients map generator 3452 receives one or more of the topographic map 430, the optical map 431, the soil moisture map 432, the soil type map 433, the prior operation map 436, the vegetation characteristic map 437, and other map(s) 439, along with the predictive soil nutrients model 3450 which predicts soil nutrients based upon one or more of a topographic characteristic value, a soil moisture value, a soil type value, a prior operation characteristic value, a vegetation characteristic value, a value of an other characteristic, and an optical characteristic value and generates a predictive map that predicts soil nutrients at different locations in the field, such as functional predictive soil nutrients map 3460.

Predictive map generator 312 thus outputs a functional predictive soil nutrients map 3460, as a functional predictive soil property map 460, that is predictive of soil nutrients. Functional predictive soil nutrients map 3460 is a predictive map 264. The functional predictive soil nutrients map 3460, in one example, predicts soil nutrients at different locations in a field. The functional predictive soil nutrients map 3460 may be provided to control zone generator 313, control system 314, or both. Control zone generator 313 generates control zones and incorporates those control zones into the functional predictive soil nutrients map 3460 to produce a predictive control zone map 265, that is a functional predictive soil nutrients control zone map 3461, as a functional predictive soil property control zone map 461.

One or both of functional predictive soil nutrients map 3460 and functional predictive soil nutrients control zone map 3461 may be provided to control system 314, which generates control signals to control one or more of the controllable subsystems 316 based upon the functional predictive soil nutrients map 3460, the functional predictive soil nutrients control zone map 3461, or both.

Bulk density-to-topographic characteristic model generator 4441 identifies a relationship between bulk density value(s) detected in in-situ sensor data 440, at geographic location(s) to which the bulk density value(s), detected in the in-situ sensor data 440, correspond, and value(s) of one or more topographic characteristics from the topographic map 430 corresponding to the same geographic location(s) to which the detected bulk density value(s) correspond. Based on this relationship established by bulk density-to-topographic characteristic model generator 4441, bulk density-to-topographic characteristic model generator 4441 generates a predictive bulk density model, as a soil property model. The predictive bulk density model is used by bulk density map generator 4452 to predict bulk density at different locations in the field based upon the georeferenced values of one or more topographic characteristics contained in the topographic map 430 at the same locations in the field. Thus, for a given location in the field, a s bulk density value can be predicted at the given location based on the predictive bulk density model and the value(s) of the one or more topographic characteristics, from the topographic map 430, at that given location.

Bulk density-to-soil moisture model generator 4442 identifies a relationship between bulk density value(s) detected in in-situ sensor data 440, at geographic location(s) to which the bulk density value(s), detected in the in-situ sensor data 440, correspond, and soil moisture value(s) from the soil moisture map 432 corresponding to the same geographic location(s) to which the detected bulk density value(s) correspond. Based on this relationship established by bulk density-to-soil moisture model generator 4442, bulk density-to-soil moisture model generator 4442 generates a predictive bulk density model, as a soil property model. The predictive bulk density model is used by bulk density map generator 4452 to predict bulk density at different locations in the field based upon the georeferenced soil moisture values contained in the soil moisture map 432 at the same locations in the field. Thus, for a given location in the field, a bulk density value can be predicted at the given location based on the predictive bulk density model and the soil moisture value, from the soil moisture map 432, at that given location.

Bulk density-to-soil type model generator 4443 identifies a relationship between bulk density value(s) detected in in-situ sensor data 440, at geographic location(s) to which the bulk density value(s), detected in the in-situ sensor data 440, correspond, and soil type value(s) from the soil type map 433 corresponding to the same geographic location(s) to which the detected bulk density value(s) correspond. Based on this relationship established by bulk density-to-soil type model generator 4443, bulk density-to-soil type model generator 4443 generates a predictive bulk density model, as a soil property model. The predictive bulk density model is used by bulk density map generator 4452 to predict bulk density at different locations in the field based upon the georeferenced soil type values contained in the soil type map 433 at the same locations in the field. Thus, for a given location in the field, a bulk density value can be predicted at the given location based on the predictive bulk density model and the soil type value, from the soil type map 433, at that given location.

Bulk density-to-prior operation characteristic model generator 4444 identifies a relationship between bulk density value(s) detected in in-situ sensor data 440, at geographic location(s) to which the bulk density value(s), detected in the in-situ sensor data 440, correspond, and value(s) of one or more prior operation characteristics from the prior operation map 436 corresponding to the same geographic location(s) to which the detected bulk density value(s) correspond. Based on this relationship established by bulk density-to-prior operation characteristic model generator 4444, bulk density-to-prior operation characteristic model generator 4444 generates a predictive bulk density model, as a soil property model. The predictive bulk density model is used by bulk density map generator 4452 to predict bulk density at different locations in the field based upon the georeferenced values of one or more prior operation characteristics contained in the prior operation map 436 at the same locations in the field. Thus, for a given location in the field, a bulk density value can be predicted at the given location based on the predictive bulk density model and the value(s) of the one or more prior operation characteristics, from the prior operation map 436, at that given location.

Bulk density-to-vegetation characteristic model generator 4445 identifies a relationship between bulk density value(s) detected in in-situ sensor data 440, at geographic location(s) to which the bulk density value(s), detected in the in-situ sensor data 440, correspond, and vegetation characteristic value(s) from the vegetation characteristic map 437 corresponding to the same geographic location(s) to which the detected bulk density value(s) correspond. Based on this relationship established by bulk density-to-vegetation characteristic model generator 4445, bulk density-to-vegetation characteristic model generator 4445 generates a predictive bulk density model, as a soil property model. The predictive bulk density model is used by bulk density map generator 4452 to predict bulk density at different locations in the field based upon the georeferenced vegetation characteristic values contained in the vegetation characteristic map 437 at the same locations in the field. Thus, for a given location in the field, a bulk density value can be predicted at the given location based on the predictive soil temperature model and the vegetation characteristic value, from the vegetation characteristic map 437, at that given location.

Bulk density-to-other characteristic model generator 4446 identifies a relationship between bulk density value(s) detected in in-situ sensor data 440, at geographic location(s) to which the bulk density value(s), detected in the in-situ sensor data 440, correspond, and value(s) of one or more other characteristics from one or more other maps 439 corresponding to the same geographic location(s) to which the detected bulk density value(s) correspond. Based on this relationship established by bulk density-to-other characteristic model generator 4446, bulk density-to-other characteristic model generator 4446 generates a predictive bulk density model, as a soil property model. The predictive bulk density model is used by bulk density map generator 4452 to predict bulk density at different locations in the field based upon the georeferenced values of one or more other characteristics contained in the one or more other maps 439 at the same locations in the field. Thus, for a given location in the field, a bulk density value can be predicted at the given location based on the predictive bulk density model and the value(s) of one or more other characteristics, from the one or more other maps 439, at that given location.

Bulk density-to-optical characteristic model generator 4447 identifies a relationship between bulk density value(s) detected in in-situ sensor data 440, at geographic location(s) to which the bulk density value(s), detected in the in-situ sensor data 440, correspond, and value(s) of one or more optical characteristics from the optical map 431 corresponding to the same geographic location(s) to which the detected bulk density value(s) correspond. Based on this relationship established by bulk density-to-optical characteristic model generator 4447, bulk density-to-optical characteristic model generator 4447 generates a predictive bulk density model, as a soil property model. The predictive bulk density model is used by bulk density map generator 4452 to predict bulk density at different locations in the field based upon the georeferenced values of one or more optical characteristics contained in the optical map 431 at the same locations in the field. Thus, for a given location in the field, a bulk density value can be predicted at the given location based on the predictive bulk density model and the value(s) of one or more optical characteristics, from the optical map 431, at that given location.

In light of the above, the predictive model generator 310 is operable to produce a plurality of predictive bulk density models, such as one or more of the predictive bulk density models generated by model generators 4441, 4442, 4443, 4444, 4445, 4446, 4447, and 5441. In another example, two or more of the predictive models described above may be combined into a single predictive bulk density model, such as a predictive s bulk density model that predicts bulk density based upon two or more of values of one or more topographic characteristics, soil moisture values, soil type values, values of one or more prior operation characteristics, vegetation characteristic values, values of one or more other characteristics, and values of one or more optical characteristics at different locations in the field. Any of these bulk density models, or combinations thereof, are represented collectively by predictive bulk density model 4450 in FIG. 11. Bulk density model 4450 is a predictive soil property model 450.

The predictive bulk density model 4450 is provided to predictive map generator 312. In the example of FIG. 11, predictive map generator 312 includes soil property map generator 452. Soil property map generator 452 includes bulk density map generator 4452. In other examples, predictive soil property map generator 452 may include additional or different map generators. Thus, in some examples, predictive soil property map generator 452 may include other items 5442 which may include other types of map generators to generate other types of soil property maps. In other examples, predictive map generator 312 may include additional or different map generators. Thus, in some examples, predictive map generator 312 may include other items 456 which may include other types of map generators to generate other types of maps.

Bulk density map generator 4452 receives one or more of the topographic map 430, the optical map 431, the soil moisture map 432, the soil type map 433, the tillage map 436, the vegetation characteristic map 437, and other map(s) 439, along with the predictive bulk density model 4450 which predicts bulk density based upon one or more of a topographic characteristic value, a soil moisture value, a soil type value, a prior operation characteristic value, a vegetation characteristic value, a value of an other characteristic, and an optical characteristic value and generates a predictive map that predicts bulk density at different locations in the field, such as functional predictive bulk density map 4460.

Predictive map generator 312 thus outputs a functional predictive bulk density map 3460, as a functional predictive soil property map 460, that is predictive of bulk density. Functional predictive bulk density map 4460 is a predictive map 264. The functional predictive bulk density map 4460, in one example, predicts bulk density at different locations in a field. The functional predictive bulk density map 4460 may be provided to control zone generator 313, control system 314, or both. Control zone generator 313 generates control zones and incorporates those control zones into the functional predictive bulk density map 4460 to produce a predictive control zone map 265, that is a functional predictive bulk density control zone map 4461, as a functional predictive soil property control zone map 461.

One or both of functional predictive bulk density map 4460 and functional predictive bulk density control zone map 4461 may be provided to control system 314, which generates control signals to control one or more of the controllable subsystems 316 based upon the functional predictive bulk density map 4460, the functional predictive bulk density control zone map 4461, or both.

In light of the above, the predictive model generator is operable to produce a plurality of predictive soil property models, such as one or more of the predictive soil property models generated by model generators 1441, 1442, 1443, 1444, 1445, 1446, 1447, 2441, 2442, 2443, 2444, 2445, 2446, 2447, 3441, 3442, 3443, 3444, 3445, 3446, 3447, 4441, 4442, 4443, 4444, 4445, 4446, 4447, and 5441. In another example, two or more of the predictive models described above may be combined into a single predictive soil property model, such as predictive soil property model that predicts two or more soil properties (e.g., two or more of soil moisture, soil temperature, soil nutrients, and bulk density) based upon one or more the topographic values, the soil moisture values, the soil type values, the prior operation characteristic values, the vegetation characteristic values, the other characteristic values, and the optical characteristic values at different locations in the field. Any of these soil property models, or combinations thereof, are represented collectively by predictive soil property model 450 in FIG. 11.

The predictive soil property model 450 is provided to predictive map generator 312. Predictive map generator 312 receives one or more of the topographic map 430, the optical map 431, the soil moisture map 432, the soil type map 433, the tillage map 436, and other map(s) 439, along with the predictive soil property model 450 which predicts two or more soil properties (e.g., two or more of soil moisture, soil temperature, soil nutrients, and bulk density) based upon one or more of a topographic value, a soil moisture value, a soil type value, a prior operation characteristic value, a vegetation characteristic value, an other characteristic value, and an optical characteristic value and generates a predictive map that predicts two or more soil properties (e.g., two or more of soil moisture, soil temperature, soil nutrients, and bulk density) at different locations in the worksite, such as functional predictive soil property map 460.

Predictive map generator 312 thus outputs a functional predictive soil property map that is predictive of one or more soil properties. Functional predictive soil property map 460 is a predictive map 264. The functional predictive soil property map 460, in one example, predicts one or more soil properties at different locations in a field. The functional predictive soil property map 460 may be provided to control zone generator 313, control system 314, or both. Control zone generator 313 generates control zones and incorporates those control zones into the functional predictive soil property map 460 to produce a predictive control zone map 265, that is a functional predictive soil property control zone map 461.

One or both of functional predictive soil property map 460 and functional predictive soil property control zone map 461 may be provided to control system 314, which generates control signals to control one or more of the controllable subsystems 316 based upon the functional predictive soil property map 460, the functional predictive soil property control zone map 461, or both.

Figure 12A:
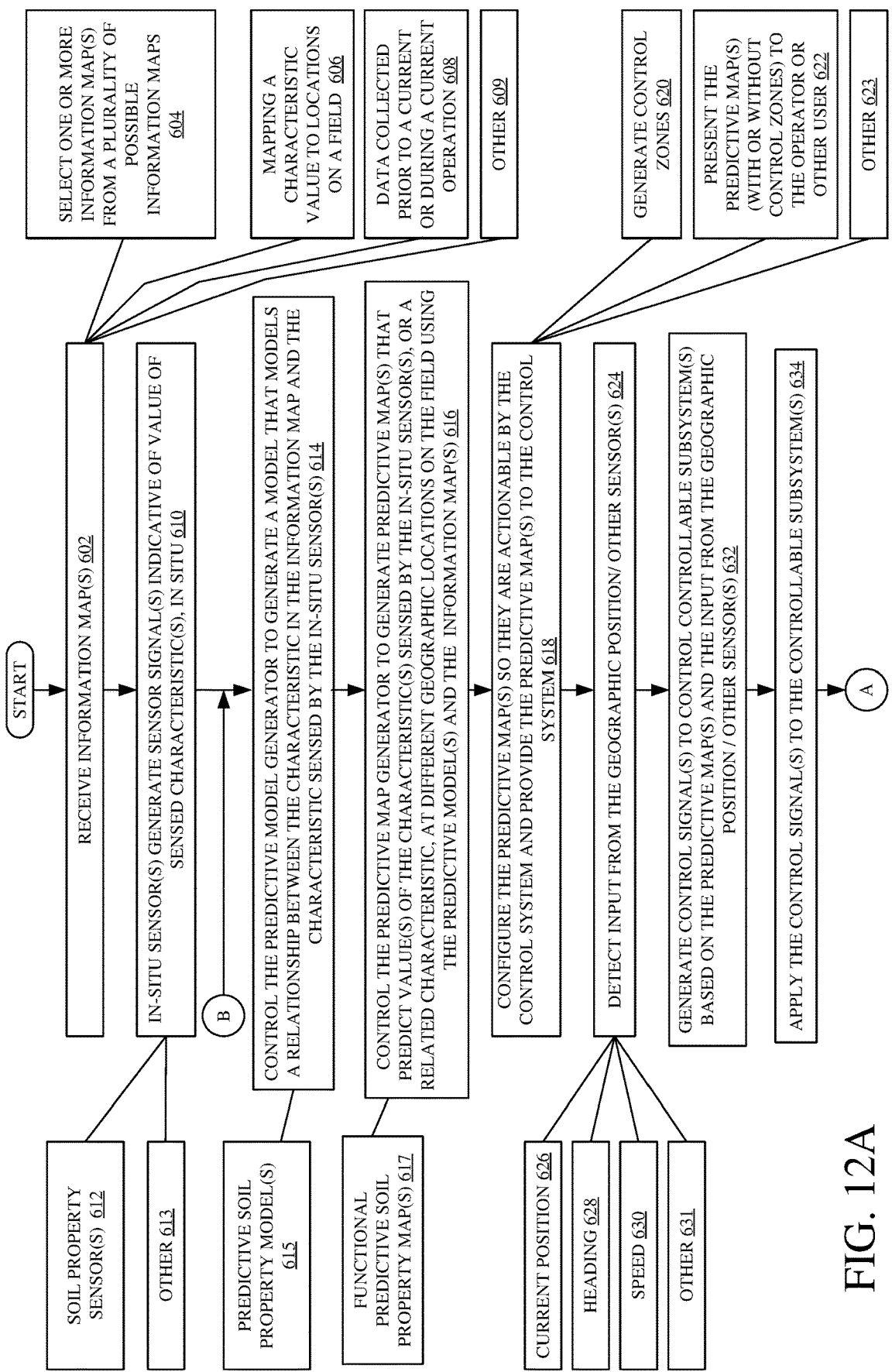
FIGS. 12A-12B (collectively referred to herein as FIG. 12) show a flow diagram illustrating one example of operation of an agricultural ground engaging system in generating a map.
Figure 12B:
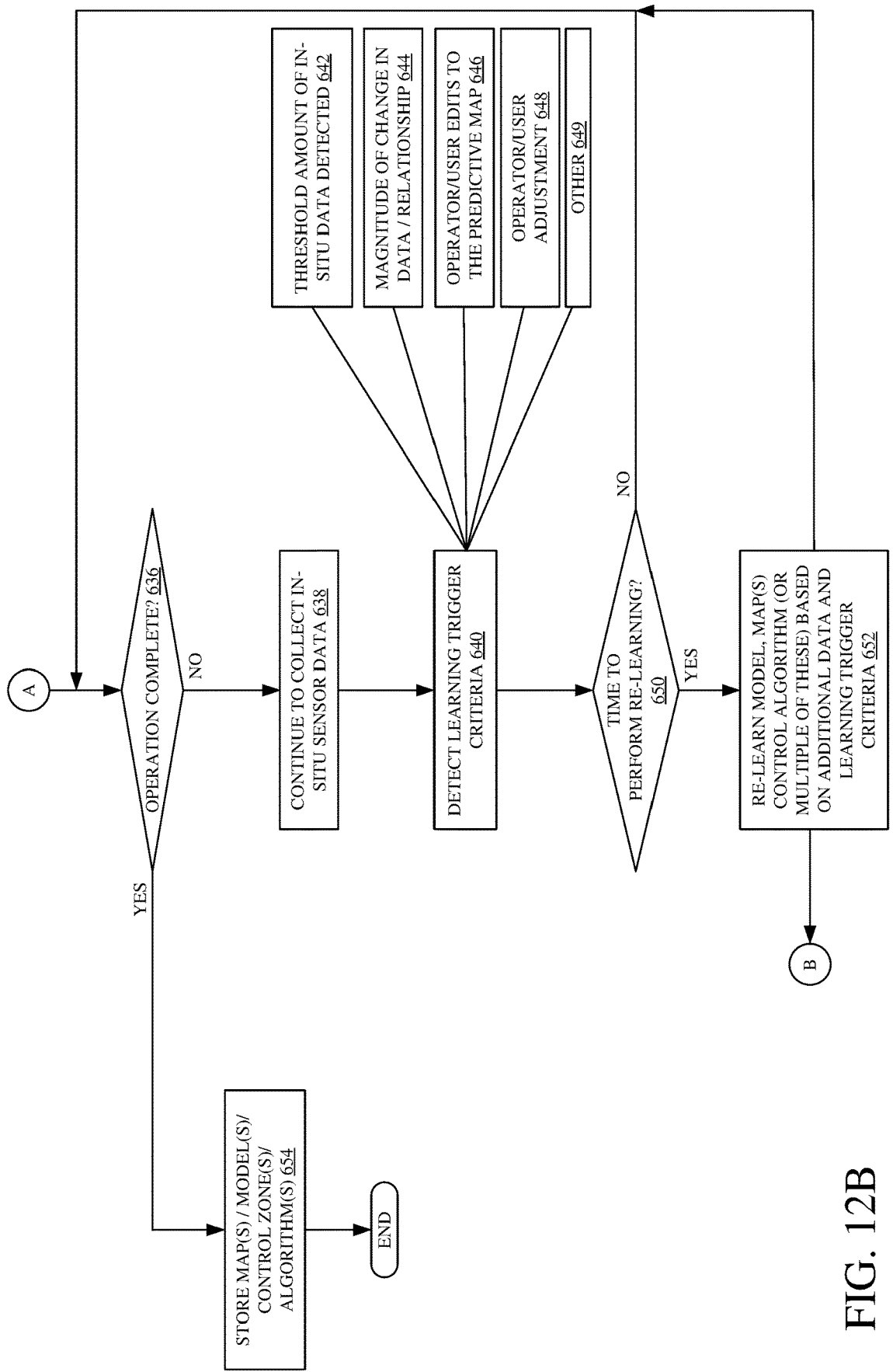

FIGS. 12A-12B (collectively referred to herein as FIG. 12) show a flow diagram illustrating one example of the operation of agricultural ground engaging system architecture 300 in generating a predictive model and a predictive map At block 602, agricultural system 300 receives one or more information maps 358. Examples of information maps 358 or receiving information maps 358 are discussed with respect to blocks 604, 606, 608, and 609. As discussed above, information maps 358 map values of a variable, corresponding to a characteristic, to different locations in the field, as indicated at block 606. As indicated at block 604, receiving the information maps 358 may involve selecting one or more of a plurality of possible information maps 358 that are available. For instance, one information map 358 may be a topographic map, such as topographic map 430. Another information map 358 may be an optical map, such as optical map 431. Another information map 358 may be a soil moisture map, such as soil moisture map 432. Another information map 358 may be a soil type map, such as soil type map 433. Another information map 358 may be a prior operation map, such as prior operation map 436. As discussed above, a prior operation map may be a prior harvesting operation map, a prior tillage operation map, or a prior tiling operation map, as well as various other types of prior operation maps. Another information map 358 may be a vegetation characteristic map, such as vegetation characteristic 437. Information maps 358 may include various other types of maps that map various other characteristics, such as other maps 439. The process by which one or more information maps 358 are selected can be manual, semi-automated, or automated. The information maps 358 can be based on data collected prior to a current operation. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the sensed operating parameters of a tilling machine earlier in the year may be used as data to generate the information maps 358. In other examples, and as described above, the information maps 358 may be predictive maps having predictive values, such as a predictive soil moisture map having predictive soil moisture values, or another type of predictive map having predictive values of another characteristic. The predictive information map 358 can be generated by predictive map generator 312 based on a model generated by predictive model generator 310. The data for the information maps 358 can be obtained by agricultural system 300 using communication system 306 and stored in data store 302. The data for the information maps 358 can be obtained by agricultural system 300 using communication system 306 in other ways as well, and this is indicated by block 609 in the flow diagram of FIG. 12.

As mobile machine 100 is operating, in-situ sensors 308 generate sensor signals indicative of one or more in-situ data values indicative of a characteristic, for example, soil property sensors 180 generate sensor signals indicative of one or more in-situ data values indicative of one or more soil properties, as indicated by block 512. For example, soil property sensors 180 can include one or more of soil moisture sensors 380 that sense one or more in-situ data values of soil moisture as a soil property, soil temperature sensors 382 that sense one or more in-situ data values of soil temperature as a soil property, soil nutrient sensors 384 that sense one or more in-situ data values of soil nutrients as a soil property, and bulk density sensors 386 that sense one or more in-situ data values of bulk density as a soil property. In some examples, data from in-situ sensors 308 is georeferenced using position, heading, or speed data, as well as machine dimension information, sensor position/orientation information, timing circuitry, etc.

In one example, at block 614, predictive model generator 310 controls one or more of the model generators 1441, 1442, 1443, 1444, 1445, 1446, 1447, and 5441 to generate a model that models the relationship between the mapped values, such as the topographic values, the soil moisture values, the soil type values, the prior operation characteristic values, the vegetation characteristic values, the other characteristic values, and the optical characteristic values contained in the respective information map and the in-situ soil moisture values sensed by the in-situ sensors 308. Predictive model generator 310 generates a predictive soil property model 450, such as a predictive soil moisture model 1450, that predicts soil moisture values based on one or more of topographic values, soil moisture values, soil type values, prior operation characteristic values, vegetation characteristic values, other characteristic values, and optical characteristic values as indicated by block 615.

In one example, at block 614, predictive model generator 310 controls one or more of the model generators 2441, 2442, 2443, 2444, 2445, 2446, 2447, and 5441 to generate a model that models the relationship between the mapped values, such as the topographic values, the soil moisture values, the soil type values, the prior operation characteristic values, the vegetation characteristic values, the other characteristic values, and the optical characteristic values contained in the respective information map and the in-situ soil temperature values sensed by the in-situ sensors 308. Predictive model generator 310 generates a predictive soil property model 450, such as a predictive soil temperature model 2450, that predicts soil temperature values based on one or more of topographic values, soil moisture values, soil type values, prior operation characteristic values, vegetation characteristic values, other characteristic values, and optical characteristic values as indicated by block 615.

In one example, at block 614, predictive model generator 310 controls one or more of the model generators 3441, 3442, 3443, 3444, 3445, 3446, 3447 and 5441 to generate a model that models the relationship between the mapped values, such as the topographic values, the soil moisture values, the soil type values, the prior operation characteristic values, the vegetation characteristic values, the other characteristic values, and the optical characteristic values contained in the respective information map and the in-situ soil nutrient values sensed by the in-situ sensors 308. Predictive model generator 310 generates a predictive soil property model 450, such as a predictive soil nutrient model 3450, that predicts soil nutrient values based on one or more of topographic values, soil moisture values, soil type values, prior operation characteristic values, vegetation characteristic values, other characteristic values, and optical characteristic values as indicated by block 615.

In one example, at block 614, predictive model generator 310 controls one or more of the model generators 4441, 4442, 4443, 4444, 4445, 4446, 4447, and 5441 to generate a model that models the relationship between the mapped values, such as the topographic values, the soil moisture values, the soil type values, the prior operation characteristic values, the vegetation characteristic values, the other characteristic values, and the optical characteristic values contained in the respective information map and the in-situ bulk density values sensed by the in-situ sensors 308. Predictive model generator 310 generates a predictive soil property model 450, such as a predictive bulk density model 4450, that predicts bulk density values based on one or more of topographic values, soil moisture values, soil type values, prior operation characteristic values, vegetation characteristic values, other characteristic values, and optical characteristic values as indicated by block 615.

In one example, at block 614, predictive model generator 310 controls one or more of the model generators 1441, 1442, 1443, 1444, 1445, 1446, 1447, 2441, 2442, 2443, 2444, 2445, 2446, 2447, 3441, 3442, 3443, 3444, 3445, 3446, 3447, 4441, 4442, 4443, 4444, 4445, 4446, 4447, and 5441 to generate a model that models the relationship between the mapped values, such as the topographic values, the soil moisture values, the soil type values, the tillage values, the vegetation characteristic values, the other characteristic values, and the optical characteristic values contained in the respective information map and the in-situ values of one or more soil properties (e.g., one or more of soil moisture values, soil temperature values, soil nutrient values, and bulk density values) sensed by the in-situ sensors 308. Predictive model generator 310 generates a predictive soil property model 450 that predicts values of one or more soil properties (e.g., predicts one or more of soil moisture values, soil temperature values, soil nutrient values, and bulk density values) based on one or more of topographic values, soil moisture values, soil type values, prior operation characteristic values, vegetation characteristic values, other characteristic values, and optical characteristic values as indicated by block 615.

At block 616, the relationship(s) or model(s) generated by predictive model generator 310 are provided to predictive map generator 312. Predictive map generator 312 generates a functional predictive soil property map 460 that predicts values of one or soil properties (or sensor values indicative of the one or more soil properties) at different geographic locations in a field at which mobile machine 100 is operating using the predictive soil property model 450 and one or more of the information maps 358, such as topographic map 430, optical map 431, soil moisture map 432, soil type map 433, prior operation map 436, vegetation characteristic map 437, and an other map 439.

In one example, at block 616, predictive map generator 312 controls predictive soil moisture map generator 1452 to generate a functional predictive soil moisture map 1460, as a functional predictive soil property map 460, that predicts soil moisture (or sensor values indicative of soil moisture) at different geographic locations in a field at which mobile machine 100 is operating using the predictive soil property model 450 (e.g., predictive soil moisture model 1450) and one or more of the information maps 358, such as topographic map 430, optical map 431, soil moisture map 432, soil type map 433, prior operation map 436, vegetation characteristic map 437, and an other map 439.

It should be noted that, in some examples, the functional predictive soil moisture map 1460 may include two or more different map layers. Each map layer may represent a different data type, for instance, a functional predictive soil moisture map 1460 that provides two or more of a map layer that provides predictive soil moisture based on topographic values from topographic map 430, a map layer that provides predictive soil moisture based on optical characteristic values form optical map 431, a map layer that provides predictive soil moisture based on soil moisture values from soil moisture map 432, a map layer that provides predictive soil moisture based on soil type values from soil type map 433, a map layer that provides predictive soil moisture based on prior operation characteristic values from prior operation map 436, a map layer that provides predictive soil moisture based on vegetation characteristic values from vegetation characteristic map 437, and a map layer that provides predictive soil moisture based on other characteristic values from an other map 439. Additionally, functional predictive soil moisture map 1460 can include a map layer that provides predictive soil moisture based on two or more of topographic values from topographic map 430, optical characteristic values from optical map 431, soil moisture values from soil moisture map 432, soil type values from soil type map 433, prior operation characteristic values from prior operation map 436, vegetation characteristic values from vegetation characteristic map 437, and other characteristic values from an other map 339.

In one example, at block 616, predictive map generator 312 controls predictive soil temperature map generator 2452 to generate a functional predictive soil temperature map 2460, as a functional predictive soil property map 460, that predicts soil temperature (or sensor values indicative of soil temperature) at different geographic locations in a field at which mobile machine 100 is operating using the predictive soil property model 450 (e.g., predictive soil temperature model 2450) and one or more of the information maps 358, such as topographic map 430, optical map 431, soil moisture map 432, soil type map 433, prior operation map 436, vegetation characteristic map 437, and an other map 439.

It should be noted that, in some examples, the functional predictive soil temperature map 2460 may include two or more different map layers. Each map layer may represent a different data type, for instance, a functional predictive soil temperature map 2460 that provides two or more of a map layer that provides predictive soil temperature based on topographic values from topographic map 430, a map layer that provides predictive soil temperature based on optical characteristic values from optical map 431, a map layer that provides predictive soil temperature based on soil moisture values from soil moisture map 432, a map layer that provides predictive soil temperature based on soil type values from soil type map 433, a map layer that provides predictive soil temperature based on prior operation characteristic values from prior operation map 436, a map layer that provides predictive soil temperature based on vegetation characteristic values from vegetation characteristic map 437, and a map layer that provides predictive soil temperature based on other characteristic values from an other map 439. Additionally, functional predictive soil temperature map 2460 can include a map layer that provides predictive soil temperature based on two or more of topographic values from topographic map 430, optical characteristic values from optical map 431, soil moisture values from soil moisture map 432, soil type values from soil type map 433, prior operation characteristic values from prior operation map 436, vegetation characteristic values from vegetation characteristic map 437, and other characteristic values from an other map 339.

In one example, at block 616, predictive map generator 312 controls predictive soil nutrients map generator 3452 to generate a functional predictive soil nutrients map 3460, as a functional predictive soil property map 460, that predicts soil nutrients (or sensor values indicative of soil nutrients) at different geographic locations in a field at which mobile machine 100 is operating using the predictive soil property model 450 (e.g., predictive soil nutrients model 3450) and one or more of the information maps 358, such as topographic map 430, optical map 431, soil moisture map 432, soil type map 433, prior operation map 436, vegetation characteristic map 437, and an other map 439.

It should be noted that, in some examples, the functional predictive soil nutrients map 3460 may include two or more different map layers. Each map layer may represent a different data type, for instance, a functional predictive soil nutrients map 3460 that provides two or more of a map layer that provides predictive soil nutrients based on topographic values from topographic map 430, a map layer that provides predictive soil nutrients based on optical characteristic values from optical map 431, a map layer that provides predictive soil nutrients based on soil moisture values from soil moisture map 432, a map layer that provides predictive soil nutrients based on soil type values from soil type map 433, a map layer that provides predictive soil nutrients based on prior operation characteristic values from prior operation map 436, a map layer that provides predictive soil nutrients based on vegetation characteristic values from vegetation characteristic map 437, and a map layer that provides predictive soil nutrients based on other characteristic values from an other map 439. Additionally, functional predictive soil nutrients map 3460 can include a map layer that provides predictive soil nutrients based on two or more of topographic values from topographic map 430, optical characteristic values from optical map 431, soil moisture values from soil moisture map 432, soil type values from soil type map 433, prior operation characteristic values from prior operation map 436, vegetation characteristic values from vegetation characteristic map 437, and other characteristic values from an other map 339.

In one example, at block 616, predictive map generator 312 controls predictive bulk density map generator 4452 to generate a functional predictive bulk density map 4460, as a functional predictive soil property map 460, that predicts bulk density (or sensor values indicative of bulk density) at different geographic locations in a field at which mobile machine 100 is operating using the predictive soil property model 450 (e.g., predictive bulk density model 4450) and one or more of the information maps 358, such as topographic map 430, optical map 431, soil moisture map 432, soil type map 433, prior operation map 436, vegetation characteristic map 437, and an other map 439.

It should be noted that, in some examples, the functional predictive bulk density map 4460 may include two or more different map layers. Each map layer may represent a different data type, for instance, a functional predictive bulk density map 4460 that provides two or more of a map layer that provides predictive bulk density based on topographic values from topographic map 430, a map layer that provides predictive bulk density based on optical characteristic values from optical map 431, a map layer that provides predictive bulk density based on soil moisture values from soil moisture map 432, a map layer that provides predictive bulk density based on soil type values from soil type map 433, a map layer that provides predictive bulk density based on prior operation characteristic values from prior operation map 436, a map layer that provides predictive bulk density based on vegetation characteristic values from vegetation characteristic map 437, and a map layer that provides predictive bulk density based on other characteristic values from an other map 439. Additionally, functional predictive bulk density map 4460 can include a map layer that provides predictive bulk density based on two or more of topographic values from topographic map 430, optical characteristic values from optical map 431, soil moisture values from soil moisture map 432, soil type values from soil type map 433, prior operation values from prior operation map 436, vegetation characteristic values from vegetation characteristic map 437, and other characteristic values from an other map 339.

It should be noted that, at block 616, predictive map generator 312 can generate a functional predictive soil property map 460 may include two or more different map layers. Each map layer may represent a different data type, for instance, a functional predictive soil property map 460 that provides two or more of a map layer that provides predictive soil moisture based on values from one or more information maps 358, a map layer that provides predictive soil temperature based on values from one or more information maps 358, a map layer that provides predictive soil nutrients based on values from one or more information maps 358, and a map layer that provides predictive bulk density based on values from one or more information maps 358. Additionally, functional predictive soil property map 460 can include a map layer that provides two or more of predictive soil moisture, predictive soil temperature, predictive soil nutrients, and predictive bulk density based on values from one or more information maps 358.

In other examples, the functional predictive soil property map 460 may provide one or more of predictive soil moisture, predictive soil temperature, predictive soil nutrients, and predictive bulk density based on values from one or more information maps 358.

Providing the one or more functional predictive soil property map(s) 460 is indicated by block 617.

At block 618, predictive map generator 312 configures the one or more functional predictive soil property map(s) 460 so that the one or more functional predictive soil property map(s) 460 are actionable (or consumable) by control system 314. Predictive map generator 312 can provide the one or more functional predictive soil property map(s) 460 to the control system 314 or to control zone generator 313, or both. Some examples of the different ways in which the one or more functional predictive soil property map(s) 460 can be configured or output are described with respect to blocks 618, 620, 622, and 623. For instance, predictive map generator 312 configures the one or more functional predictive soil property map(s) 460 so that the one or more functional predictive soil property map(s) 460 include values that can be read by control system 314 and used as the basis for generating control signals for one or more of the different controllable subsystems 316 of mobile machine 100, as indicated by block 618.

At block 620, control zone generator 313 can divide each of the one or more functional predictive soil property map(s) 460 into control zones based on the values on each of the one or more functional predictive soil property map(s) 460 to generate one or more respective functional predictive soil property control zone map(s) 461, such as one or more of functional predictive soil moisture control zone map 1461, functional predictive soil temperature control zone map 2461, functional predictive soil nutrients control zone map 3461, and functional predictive bulk density control zone map 4461. Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system 314, the controllable subsystems 316, based on wear considerations, or on other criteria.

At block 622, predictive map generator 312 configures the one or more functional predictive soil property map(s) 460 for presentation to an operator or other user, or both. At block 622, control zone generator 313 can configure the one or more functional predictive soil property control zone map(s) 461 for presentation to an operator or other user, or both. When presented to an operator or other user, the presentation of the one or more functional predictive soil property map(s) 460 or of the one or more functional predictive soil property control zone map(s) 461, or both, may contain one or more of the predictive values on the one or more functional predictive soil property map(s) 460 correlated to geographic location, the control zones of the one or more functional predictive soil property control zone map(s) 461 correlated to geographic location, and settings values or control parameters that are used based on the predicted values on the one or more functional predictive soil property map(s) 460 or control zones on the one or more functional predictive soil property control zone map(s) 461. The presentation can, in another example, include more abstracted information or more detailed information. The presentation can also include a confidence level that indicates an accuracy with which the predictive values on the one or more functional predictive soil property map(s) 460 or the control zones on the one or more functional predictive soil property control zone map(s) 461 conform to measured values that may be measured by sensors on mobile machine 100 as mobile machine 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of mobile machine 100 may be unable to see the information corresponding to the one or more functional predictive soil property map(s) 460 or make any changes to machine operation. A supervisor, such as a supervisor at a remote location, however, may be able to see the one or more functional predictive soil property map(s) 460 on the display but be prevented from making any changes. A manager, who may be at a separate remote location, may be able to see all of the elements on the one or more functional predictive soil property map(s) 460 and also be able to the one or more functional predictive soil property map(s) 460. In some instances, the one or more functional predictive soil property map(s) 460 accessible and changeable by a manager located remotely may be used in machine control. This is one example of an authorization hierarchy that may be implemented. The one or more functional predictive soil property map(s) 460 or the one or more functional predictive soil property control zone map(s) 461 or both can be configured in other ways as well, as indicated by block 623.

At block 624, input from geographic position sensor 304 and other in-situ sensors 308 are received by the control system 314. Particularly, at block 626, control system 314 detects an input from the geographic position sensor 304 identifying a geographic location of mobile machine 100. Block 628 represents receipt by the control system 314 of sensor inputs indicative of trajectory or heading of mobile machine 100, and block 630 represents receipt by the control system 314 of a speed of mobile machine 100. Block 631 represents receipt by the control system 314 of other information from various in-situ sensors 308.

At block 632, control system 314 generates control signals to control the controllable subsystems 316 based on the one or more functional predictive soil property map(s) 460 (e.g., based on one or more of 1460, 2460, 3460, and 4460 or predictive soil property map 460 that provides one or more of predictive soil moisture, predictive soil temperature, predictive soil nutrients, and predictive bulk density) or the one or more functional predictive soil property control zone map(s) 461 (e.g., one or more of 1461, 2461, 3461, and 4461 or predictive soil property control zone map 461 that provides control zones based on one or more of predictive soil moisture, predictive soil temperature, predictive soil nutrients, and predictive bulk density), or both, and the input from the geographic position sensor 304 and any other in-situ sensors 308 (e.g., heading and speed). At block 634, control system 314 applies the control signals to the controllable subsystems 316. It will be appreciated that the particular control signals that are generated, and the particular controllable subsystems 316 that are controlled, may vary based upon one or more different things. For example, the control signals that are generated and the controllable subsystems 316 that are controlled may be based on the type of functional predictive soil property map 460 or functional predictive soil property control zone map 461, or both, that is being used. Similarly, the control signals that are generated and the controllable subsystems 316 that are controlled and the timing of the control signals can be based on various latencies of mobile machine 100 and the responsiveness of the controllable subsystems 316.

By way of example, propulsion controller 331 of control system 314 can generate control signals to control propulsion subsystem 350 to control one or more propulsion parameters of mobile machine 100, such as one or more of the speed at which the mobile machine travels, the deceleration of mobile machine 100, and the acceleration of mobile machine 100, based on the one or more functional predictive soil property map(s) 460 or the one or more functional predictive soil property control zone map(s) 461, or both.

In another example, path planning controller 334 of control system 314 can generate control signals to control steering subsystem 352 to control a route parameter of mobile machine 100, such as one or more of a commanded path at the worksite over which mobile machine 100 travels, and the steering of mobile machine 100, based on the one or more functional predictive soil property map(s) 460 or the one or more functional predictive soil property control zone map(s) 461, or both.

In another example, downforce controllers 332 of control system 314 can generate control signals to control downforce subsystems 341 to control one or more actuators to control a downforce applied to one or more components (e.g., ground engaging tools, row units, tool gangs, wheels, etc.) of mobile machine 100 based on the one or more functional predictive soil property map(s) 460 or the one or more functional predictive soil property control zone map(s) 461, or both.

In another example, tool position controllers 333 of control system 314 can generate control signals to control tool position subsystems 343 to control one or more actuators to control a position (e.g., depth, angle, etc.) of one or more ground engaging tools of mobile machine 100 based on the one or more functional predictive soil property map(s) 460 or the one or more functional predictive soil property control zone map(s) 461, or both.

As described above, in some examples, mobile ground engaging machine 100 may apply material(s) to the field, such as seed or other material (e.g., fertilizer), or both. In such examples, application controllers 337 of control system 314 can generate control signals to control seed delivery subsystems 345 to control one or more actuators to control actuation (e.g., speed of rotation) of one or more assistive seed delivery systems (e.g., 166) based on the one or more functional predictive soil property map(s) 460 or the one or more functional predictive soil property control zone map(s) 461, or both. Application controllers 337 of control system 314 can generate control signals to control material application subsystems 347 to control one or more actuators to control the application of material, such as fertilizer, to the field based on the one or more functional predictive soil property map(s) 460 or the one or more functional predictive soil property control zone map(s) 461, or both. Application controllers 337 of control system 314 can generate control signals to control seed metering subsystems 347 to control one or more actuators to control one or more actuators to control actuation (e.g., speed of rotation) of one or more seed meters (e.g., 179).

In another example, interface controller 330 of control system 314 can generate control signals to control an interface mechanism (e.g., 218 or 364) to generate a display, alert, notification, or other indication based on or indicative of the one or more functional predictive soil property map(s) 460 or the one or more functional predictive soil property control zone map(s) 461, or both.

In another example, communication system controller 329 of control system 314 can generate control signals to control communication system 306 to communicate based on the one or more functional predictive soil property map(s) 460 or the one or more functional predictive soil property control zone map(s) 461, or both, to another item of agricultural ground engaging system 300 (e.g., remote computing systems 368 or user interfaces 364).

These are merely examples. Control system 314 can generate various other control signals to control various other items of mobile machine 100 (or agricultural system 300) based on based on the one or more functional predictive soil property map(s) 460 or the one or more functional predictive soil property control zone map(s) 461, or both.

At block 636, a determination is made as to whether the operation has been completed. If the operation is not completed, the processing advances to block 638 where in-situ sensor data from geographic position sensor 304 and in-situ sensors 308 (and perhaps other sensors) continue to be read.

In some examples, at block 640, agricultural system 300 can also detect learning trigger criteria to perform machine learning on one or more of based on the one or more functional predictive soil property map(s) 460, the one or more functional predictive soil property control zone map(s)

461, the one or more predictive soil property model 450 (e.g., one or more of 1450, 2450, 3450, and 4450), the zones generated by control zone generator 313, one or more control algorithms implemented by the controllers in the control system 314, and other triggered learning.

The learning trigger criteria can include any of a wide variety of different criteria. Some examples of detecting trigger criteria are discussed with respect to blocks 642, 644, 646, 648, and 649. For instance, in some examples, triggered learning can involve recreation of a relationship used to generate a predictive model when a threshold amount of in-situ sensor data are obtained from in-situ sensors 308. In such examples, receipt of an amount of in-situ sensor data from the in-situ sensors 308 that exceeds a threshold triggers or causes the predictive model generator 310 to generate a new predictive model that is used by predictive map generator 312. Thus, as mobile machine 100 continues an operation, receipt of the threshold amount of in-situ sensor data from the in-situ sensors 308 triggers the creation of a new relationship represented by a new predictive soil property model 450 generated by predictive model generator 310. Further, a new functional predictive soil property map 460, a new functional predictive soil property control zone map 461, or both, can be generated using the new predictive soil property model 450. Block 642 represents detecting a threshold amount of in-situ sensor data used to trigger creation of a new predictive model.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data and the information in the one or more information maps 358) are within a selected range or is less than a defined amount, or below a threshold value, then a new predictive model is not generated by the predictive model generator 310. As a result, the predictive map generator 312 does not generate a new functional predictive map, a new functional predictive control zone map, or both. However, if variations within the in-situ sensor data are outside of the selected range, are greater than the defined amount, or are above the threshold value, for example, then the predictive model generator 310 generates a new predictive soil property model 450 using all or a portion of the newly received in-situ sensor data that the predictive map generator 312 uses to generate a new functional predictive soil property map 460 which can be provided to control zone generator 313 for the creation of a new functional predictive soil property control zone map 461. At block 644, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of a new predictive soil property 450, a new functional predictive soil property map 460, and a new functional predictive soil property control zone map 461. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 314, or other items. In another example, transitioning of mobile machine 100 to a different topography or to a different control zone may be used as learning trigger criteria as well.

In some instances, operator 360 or user 366 can also edit the one or more functional predictive soil property map(s) 460 or the one or more functional predictive soil property control zone map(s) 461, or both. The edits can change value(s) on the one or more functional predictive soil property maps 460, change a size, shape, position, or existence of control zone(s) on the one or more functional predictive soil property control zone map 461, or both. Block 646 shows that edited information can be used as learning trigger criteria.

In some instances, it may also be that operator 360 or user 366 observes that automated control of a controllable subsystem 316, is not what the operator or user desires. In such instances, the operator 360 or user 366 may provide a manual adjustment to the controllable subsystem 316 reflecting that the operator 360 or user 366 desires the controllable subsystem 316 to operate in a different way than is being commanded by control system 314. Thus, manual alteration of a setting by the operator 360 or user 366 can cause one or more of predictive model generator 310 to generate a new model, predictive map generator 312 to generate a new functional predictive soil property map 460, control zone generator 313 to generate one or more new control zones on a functional predictive soil property control zone map 461, and control system 314 to relearn a control algorithm or to perform machine learning on one or more of the controller components 329 through 339 in control system 314 based upon the adjustment by the operator 360 or user 366, as shown in block 648. Block 649 represents the use of other triggered learning criteria.

In other examples, relearning may be performed periodically or intermittently based, for example, upon a selected time interval such as a discrete time interval or a variable time interval, as indicated by block 650.

If relearning is triggered, whether based upon learning trigger criteria or based upon passage of a time interval, as indicated by block 650, then one or more of the predictive model generator 310, predictive map generator 312, control zone generator 313, and control system 314 performs machine learning to generate one or more new predictive models, one or more new predictive maps, one or more new control zones, and one or more new control algorithms, respectively, based upon the learning trigger criteria. The new predictive model(s), the new predictive map(s), the new control zone(s), and the new control algorithm(s) are generated using any additional data that has been collected since the last learning operation was performed. Performing relearning is indicated by block 652.

If the operation has been completed, operation moves from block 652 to block 654 where one or more of the one or more functional predictive soil property maps 460, the one or more functional predictive soil property control zone maps 461, the one or more predictive soil property models 450, the control zone(s), and the control algorithm(s), are stored. The functional predictive map(s) 460, the functional predictive control zone map(s) 461, the predictive model(s) 450, the control zone(s), and the control algorithm(s), may be stored locally on data store 302 or sent to a remote system using communication system 306 for later use.

If the operation has not been completed, operation moves from block 652 to block 618 such that one or more of the one or more new predictive models, the one or more new functional predictive maps, the one or more new functional predictive control zone maps, the new control zone(s), and the new control algorithm(s) can be used in the control of mobile machine 100.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or the same worksite at a future time.

The revision of the model in response to new data may employ machine learning methods. Without limitation, machine learning methods may include memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value (e.g., detected soil property value) varies from a predictive value of the characteristic (e.g., predictive soil property value), such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in areas of the worksite (which have not yet been operated on in the current operation, such as unplanted/unseeded areas) in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of a topographic map, an optical map, a soil moisture map, a soil type map, a prior operation map, a vegetation characteristic map, and another type of map.

In-situ sensors generate sensor data indicative of in-situ characteristic values, such as in-situ values of one or more soil properties (e.g., one or more of soil moisture, soil temperature, soil nutrients, and bulk density).

A predictive model generator generates one or more predictive models based on the one or more obtained maps and the in-situ sensor data, such as one or more predictive soil property models.

A predictive map generator generates one or more functional predictive maps based on a model generated by the predictive model generator and the one or more obtained maps. For example, the predictive map generator may generate one or more functional predictive soil property maps that map predictive values of one or more soil properties to one or more locations on the worksite based on the one or more predictive soil property models and the one or more obtained maps.

Control zones, which include machine settings values, can be incorporated into the one or more functional predictive soil property maps to generate one or more functional predictive soil property maps with control zones.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted that the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic and interactions. It will be appreciated that any or all of such systems, components, logic and interactions may be implemented by hardware items, such as processors, memory, or other processing components, some of which are described below, that perform the functions associated with those systems, components, or logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 13:
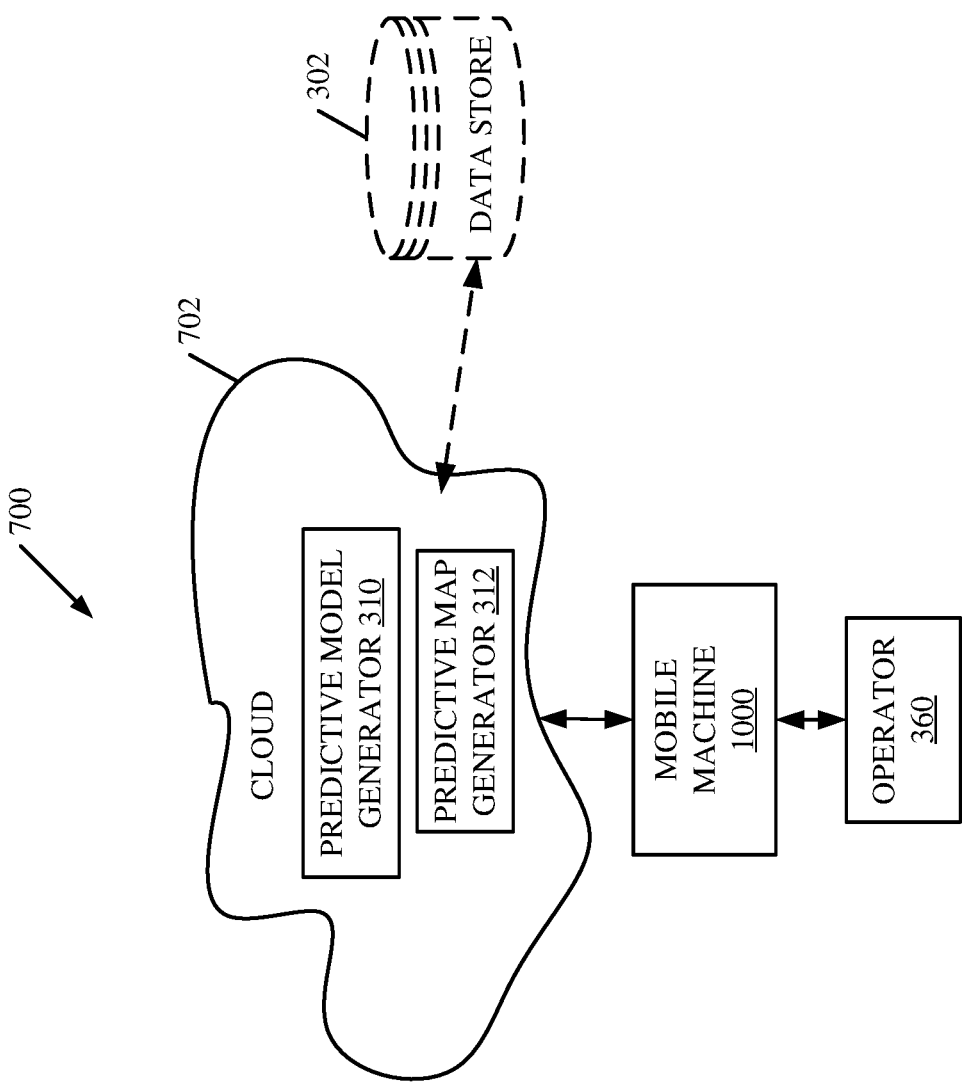
FIG. 13 is a block diagram showing one example of a mobile machine in communication with a remote server environment.

FIG. 13 is a block diagram of mobile machine 1000, which may be similar to mobile machine 100 shown in FIG. 10. The mobile machine 1000 communicates with elements in a remote server architecture 700. In some examples, remote server architecture 700 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 10 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 13, some items are similar to those shown in FIG. 10 and those items are similarly numbered. FIG. 13 specifically shows that predictive model generator 310 or predictive map generator 312, or both, may be located at a server location 702 that is remote from the mobile machine 1000. Therefore, in the example shown in FIG. 13, mobile machine 1000 accesses systems through remote server location 702. In other examples, various other items may also be located at server location 702, such as data store 302, map selector 309, predictive model 311, functional predictive maps 263 (including predictive maps 264 and predictive control zone maps 265), control zone generator 313, and processing system 338.

FIG. 13 also depicts another example of a remote server architecture. FIG. 13 shows that some elements of FIG. 10 may be disposed at a remote server location 702 while others may be located elsewhere. By way of example, data store 302 may be disposed at a location separate from location 702 and accessed via the remote server at location 702. Regardless of where the elements are located, the elements can be accessed directly by mobile machine 1000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the mobile machine 1000 comes close to the machine containing the information collection system, such as a fuel truck prior to fueling, the information collection system collects the information from the mobile machine 1000 using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on the mobile machine 1000 until the mobile machine 1000 enters an area having wireless communication coverage. The mobile machine 1000, itself, may send the information to another network.

It will also be noted that the elements of FIG. 10, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 700 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 14:
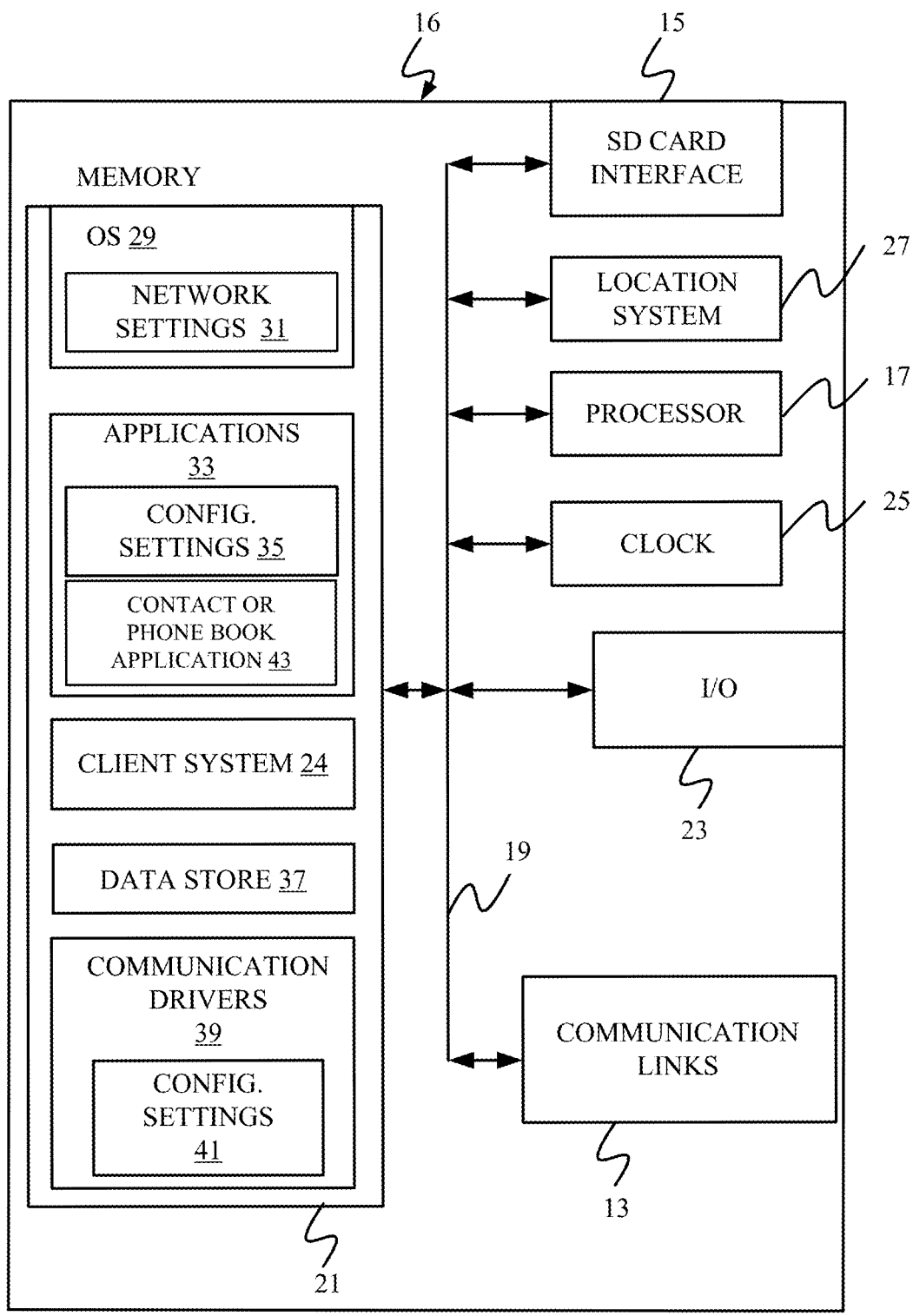
FIGS. 14-16 show examples of mobile devices that can be used in an agricultural ground engaging system.
Figure 15:
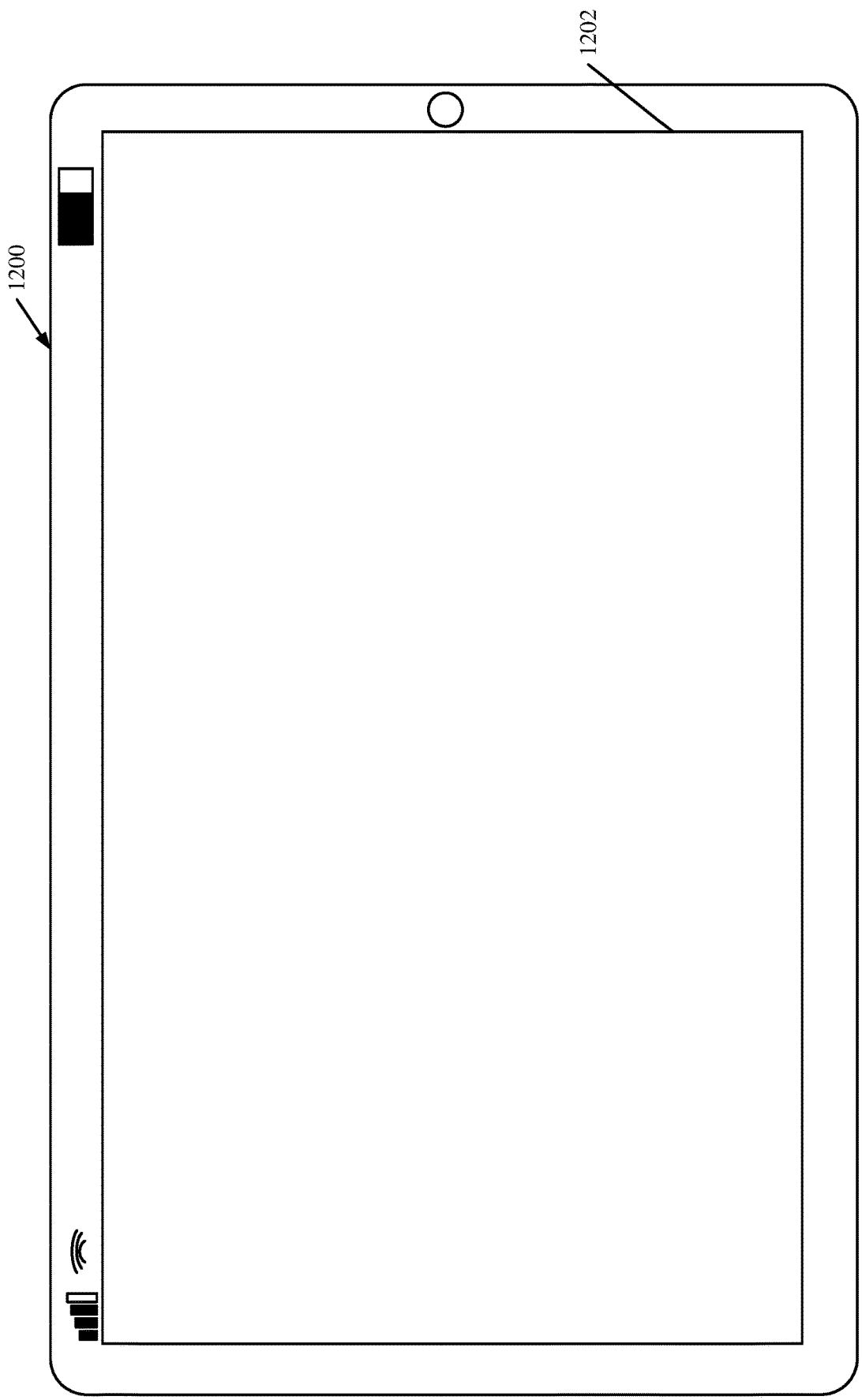
Figure 16:
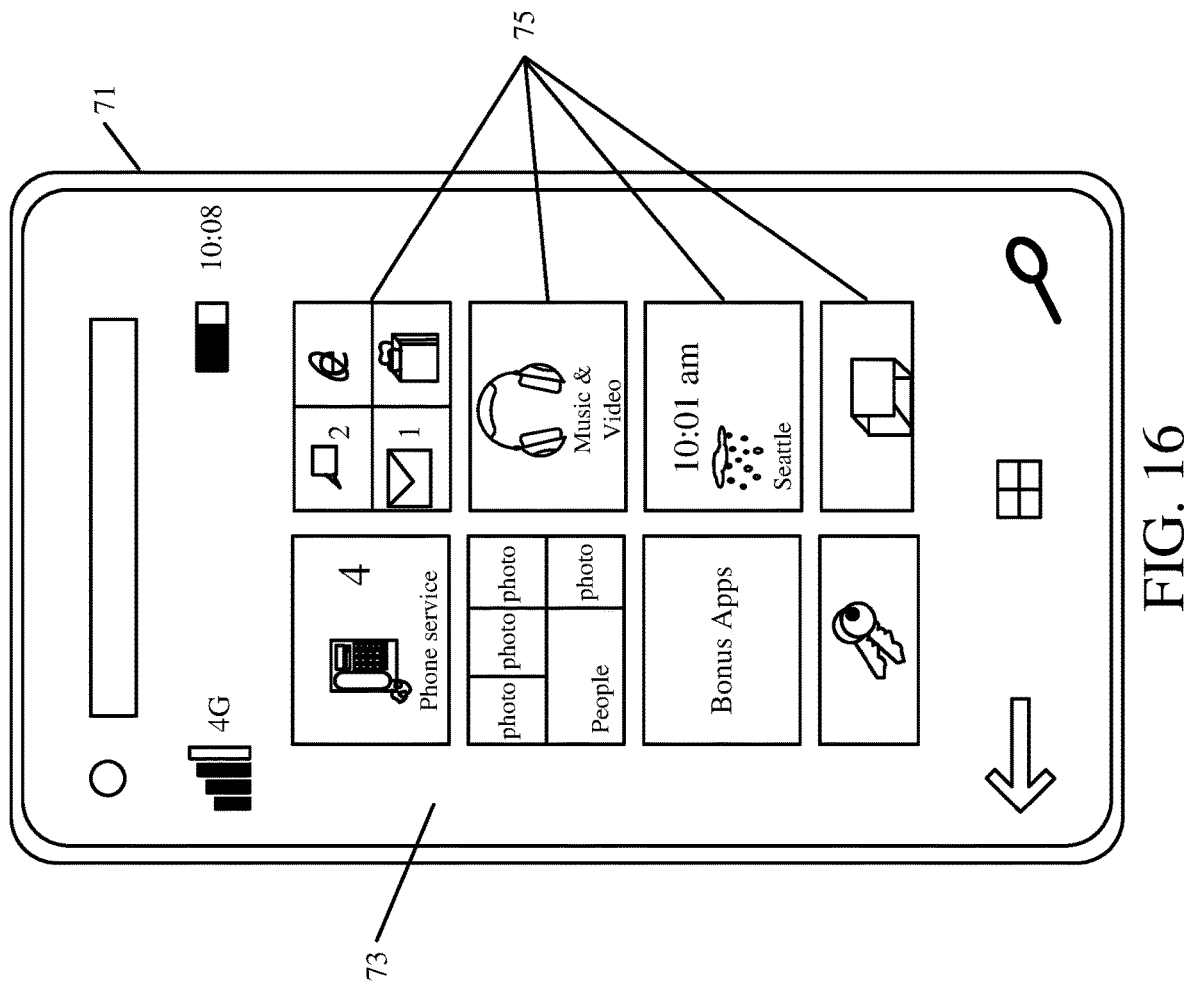

FIG. 14 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile machine 100 for use in generating, processing, or displaying the maps discussed above. FIGS. 15-16 are examples of handheld or mobile devices.

FIG. 14 provides a general block diagram of the components of a client device 16 that can run some components shown in FIG. 10, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 15 shows one example in which device 16 is a tablet computer 1200. In FIG. 15, computer 1200 is shown with user interface display screen 1202. Screen 1202 can be a touch screen or a pen-enabled interface that receives inputs from a pen or stylus. Tablet computer 1200 may also use an on-screen virtual keyboard. Of course, computer 1200 might also be attached to a keyboard or other user input device through a suitable attachment mechanism, such as a wireless link or USB port, for instance. Computer 1200 may also illustratively receive voice inputs as well.

FIG. 16 is similar to FIG. 15 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 17:
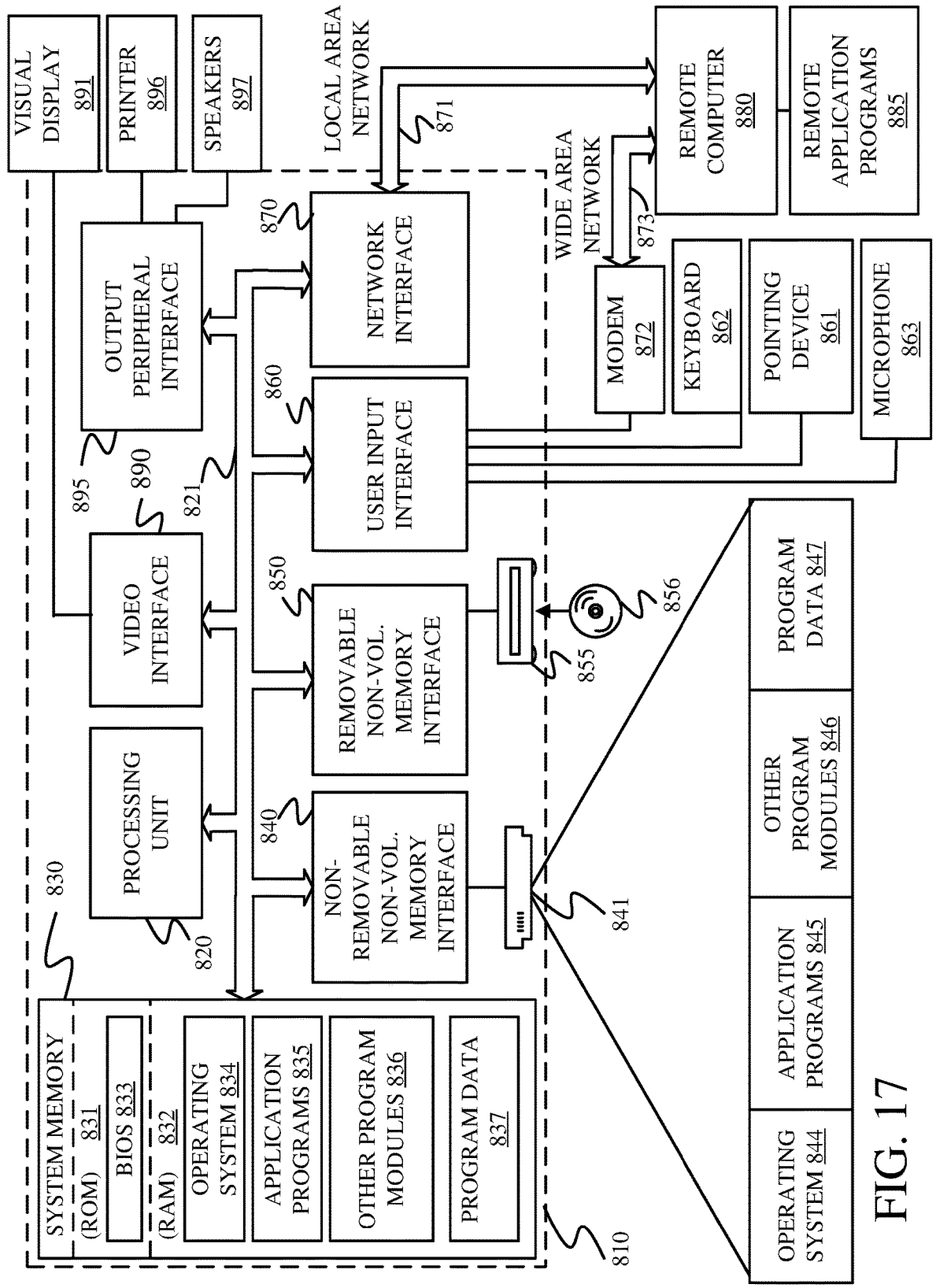
FIG. 17 is a block diagram showing one example of a computing environment that can be used in an agricultural ground engaging system.

FIG. 17 is one example of a computing environment in which elements of FIG. 10 can be deployed. With reference to FIG. 17, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 10 can be deployed in corresponding portions of FIG. 17.

Computer 810 typically includes a variety of computer readable media. Computer readable media may be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory or both such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data or program modules or both that are immediately accessible to and/or presently being operated on by processing unit 820. By way of example, and not limitation, FIG. 17 illustrates operating system 834, application programs 835, other program modules 836, and program data 837.

The computer 810 may also include other removable/non-removable volatile/nonvolatile computer storage media. By way of example only, FIG. 17 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 810. In FIG. 17, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 17 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for generating functional predictive maps and controlling a machine based on functional predictive maps have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for generating functional predictive maps and controlling a machine based on functional predictive maps. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication. For example, actions such as "positioning an electrode" include "instructing positioning of an electrode."

The ranges disclosed herein also encompass any and all overlap, subranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure.

In summary, various embodiments and examples of systems and methods for generating functional predictive maps and controlling a machine based on functional predictive maps, have been disclosed. Although the systems and methods for generating functional predictive maps and controlling a machine based on functional predictive maps have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

What is claimed is:

1. An agricultural ground engaging system comprising:
    a communication system configured to receive an information map that includes values of a characteristic corresponding to a plurality of different geographic locations in a field;
    an in-situ sensor configured to, during the course of a ground engaging operation performed by a ground engaging machine at the field, detect a value of a soil property corresponding to a first geographic location of the plurality of different geographic locations in the field, the soil property different than the characteristic;
    one or more processors; and
    a data store configured to store computer executable instructions that, when executed by the one or more processors, configure the one or more processors to:
        generate, during the course of the ground engaging operation performed by the ground engaging machine at the field, a predictive model that models a relationship between characteristic values and values of the soil property based, at least, on the value of the soil property detected by the in-situ sensor corresponding to the first geographic location and a value of the characteristic in the information map corresponding to the first geographic location;
        generate, during the course of the ground engaging operation performed by the ground engaging machine at the field, a functional predictive soil property map of the worksite, that maps predictive values of the soil property to a second geographic location of the plurality of different geographic locations in the field, based on a value of the characteristic in the information map corresponding to the second geographic location and based on the predictive soil property model; and
        control, during the course of the ground engaging operation performed by the ground engaging machine at the field, a controllable subsystem of a ground engaging machine based on the functional predictive soil property map.

2. The agricultural ground engaging system of claim 1, wherein the ground engaging machine comprises a planting machine or a tillage machine.

3. The agricultural ground engaging system of claim 1, wherein the in-situ sensor detects, as the value of the soil property, a soil moisture value corresponding to the first geographic location;

wherein the predictive soil property model comprises a predictive soil moisture model that models a relationship between characteristic values and soil moisture values based on the soil moisture value detected by the in-situ sensor corresponding to the first geographic location and the value of the characteristic in the information map corresponding to the first geographic location; and wherein the functional predictive soil property map comprises a functional predictive soil moisture map that maps a predictive soil moisture value to the second geographic location of the plurality of different geographic locations in the field based on the value of the characteristic in the information map corresponding to the second geographic location and based on the predictive soil moisture model.

4. The agricultural ground engaging system of claim 1, wherein the in-situ sensor detects, as the value of the soil property, a soil temperature value corresponding to the first geographic location;

wherein the predictive soil property model comprises a predictive soil temperature model that models a relationship between characteristic values and soil temperature values based on the soil temperature value detected by the in-situ sensor corresponding to the first geographic location and the value of the characteristic in the information map corresponding to the first geographic location; and wherein the functional predictive soil property map comprises a functional predictive soil temperature map that maps a predictive soil temperature value to the second geographic location of the plurality of different geographic locations in the field based on the value of the characteristic in the information map corresponding to the second geographic location and based on the predictive soil temperature model.

5. The agricultural ground engaging system of claim 1, wherein the in-situ sensor detects, as the value of the soil property, a soil nutrient value corresponding to the first geographic location;

wherein the predictive soil property model comprises a predictive soil nutrient model that models a relationship between characteristic values and soil nutrient values based on the soil nutrient value detected by the in-situ sensor corresponding to the first geographic location and the value of the characteristic in the information map corresponding to the first geographic location; and wherein the functional predictive soil property map comprises a functional predictive soil nutrient map that maps a predictive soil nutrient value to the second geographic location of the plurality of different geographic locations in the field based on the value of the characteristic in the information map corresponding to the second geographic location and based on the predictive soil nutrient model.

6. The agricultural ground engaging system of claim 1, wherein the in-situ sensor detects, as the value of the soil property, a bulk density value corresponding to the first geographic location;

wherein the predictive soil property model comprises a predictive bulk density model that models a relationship between characteristic values and bulk density values based on the bulk density value detected by the in-situ sensor corresponding to the first geographic location and the value of the characteristic in the information map corresponding to the first geographic location; and wherein the functional predictive soil property map comprises a functional predictive bulk density map that maps a predictive bulk density value to the second geographic location of the plurality of different geographic locations in the field based on the value of the characteristic in the information map corresponding to the second geographic location and based on the predictive bulk density model.

7. The agricultural ground engaging system of claim 1, wherein the computer executable instructions, when executed by the one or more processors, configure the one or more processors to:

control, as the controllable subsystem, a downforce subsystem of the ground engaging machine to control a downforce applied to a component of the ground engaging machine based on the functional predictive soil property map.

8. The agricultural ground engaging system of claim 1, wherein the computer executable instructions, when executed by the one or more processors, configure the one or more processors to:

control, as the controllable subsystem, a tool position subsystem of a planting machine to adjust a position of a ground engaging tool of the ground engaging machine based on the functional predictive soil property map.

9. The agricultural ground engaging system of claim 1, wherein the computer executable instructions, when executed by the one or more processors, are further configured to configure the one or more processors to:

control, as the controllable subsystem, a seed delivery subsystem of a ground engaging machine to adjust a speed of a seed delivery system of the ground engaging machine based on the functional predictive soil property map.

10. The agricultural ground engaging system of claim 1, wherein the computer executable instructions, when executed by the one or more processors, are further configured to configure the one or more processors to:

control, as the controllable subsystem, a material application subsystem of a ground engaging machine to control application of a material to the field based on the functional predictive soil property map.

11. The agricultural ground engaging system of claim 1, wherein the computer executable instructions, when executed by the one or more processors, are further configured to configure the one or more processors to:

control, as the controllable subsystem, a seed metering subsystem of the ground engaging machine to adjust a speed of a seed meter of the ground engaging machine based on the functional predictive soil property map.

12. A method of controlling an agricultural ground engaging machine, the method comprising:

receiving an information map that indicates values of a characteristic corresponding to a plurality of different geographic locations in a field;

detecting, with an in-situ sensor, during the course of a ground engaging operation performed by the agricultural ground engaging machine at the field, a value of a soil property corresponding to a first geographic location of the plurality of different geographic locations in the field, the soil property different than the characteristic;

generating during the course of the ground engaging operation performed by the agricultural ground engaging machine at the field, a predictive soil property model that models a relationship between the characteristic and the soil property based, at least, on the value of the soil property corresponding to the first geographic location and a value of the characteristic in the information map corresponding to the first geographic location;

generating, during the course of the ground engaging operation performed by the agricultural ground engaging machine at the field, a functional predictive soil property map of the field that maps a predictive value of the soil property to a second geographic location of the plurality of different geographic locations in the field based on a value of the characteristic in the information map corresponding to the second geographic location and the predictive soil property model; and controlling, during the course of the ground engaging operation performed by the agricultural ground engaging machine at the field, a controllable subsystem of the agricultural ground engaging machine based on the functional predictive soil property map.

13. The method of claim 12, wherein detecting, with an in-situ sensor, a value of the soil property comprises detecting, with one or more in-situ sensors, one or more of a soil moisture value, a soil temperature value, a soil nutrient value, and a bulk density value.

14. The method of claim 13, wherein generating the predictive soil property model comprises:

generating the predictive soil property model that models a relationship between the characteristic and one or more of soil moisture, soil temperature, soil nutrient, and bulk density based on one or more of the soil moisture value, the soil temperature value, the soil nutrient value, and the bulk density value detected by the one or more in-situ sensors corresponding to the first geographic location and the value of the characteristic, in the information map, corresponding to the first geographic location; and wherein the predictive soil property model is configured to receive a value of the characteristic as a model input and to generate one or more of a predictive soil moisture value, a predictive soil temperature value, a predictive soil nutrient value, and a predictive bulk density value as a model output based on the identified relationship.

15. The method of claim 14, wherein generating the functional predictive soil property map comprises:

generating the functional predictive soil property map of the field that maps one or more of predictive soil moisture values, predictive soil temperature values, predictive soil nutrient values, and predictive bulk density values to the second geographic location of the plurality of different geographic locations in the field based on the value of the characteristic in the information map corresponding to the second geographic location and the predictive soil property model.

16. The method of claim 14, wherein receiving the information map comprises receiving one of:

a topographic map that maps, as the values of the characteristic, values of one or more topographic characteristics to the different geographic locations in the field;

an optical map that maps, as the values of the characteristic, values of one or more optical characteristics to the different geographic locations in the field;

a soil moisture map that maps, as the values of the characteristic, values of soil moisture to the different geographic locations in the field;

a soil type map that maps, as the values of the characteristic, soil type values to the different geographic locations in the field;

a prior operation map that maps, as the values of the characteristic, values of one or more prior operation characteristics to the different geographic locations in the field; or a vegetation characteristic map that maps, as the values of the characteristic, vegetation characteristic values to the different geographic locations in the field.

17. The method of claim 12, wherein controlling the controllable subsystem comprises one of:

controlling a seed delivery subsystem to control a speed of a seed delivery system of the agricultural ground engaging machine;

controlling a material application subsystem of the agricultural ground engaging machine to control application of a material to the field; and controlling a seed metering subsystem to control a speed of a seed meter of the agricultural ground engaging machine.

18. The method of claim 12, wherein controlling the controllable subsystem comprises one of:

controlling a downforce subsystem to control a downforce applied to a component of the agricultural ground engaging machine; or controlling a tool position subsystem to control a position of a ground engaging tool of the agricultural ground engaging machine.

19. A ground engaging machine configured to perform a ground engaging operation at a field, the ground engaging machine comprising:

a communication system that receives an information map that maps values of a characteristic corresponding to a plurality of different geographic locations in the field;

an in-situ sensor configured to detect, as the ground engaging machine performs the ground engaging operation at the field, a value of a soil property corresponding to a first geographic location of the plurality of different geographic locations in the field, the soil property different than the characteristic;

one or more processors; and a data store configured to store computer executable instructions that, when executed by the one or more processors, configure the one or more processors to:

generate, as the ground engaging machine performs the ground engaging operation at the field, a predictive soil property model that models a relationship between the characteristic and the soil property based, at least, on the value of the soil property, detected by the in-situ sensor, corresponding to the first geographic location and a value of the characteristic in the information map corresponding to the first geographic location;

generate, as the ground engaging machine performs the ground engaging operation at the field, a functional predictive soil property map of the field that maps a predictive value of the soil property to each geographic location of a set of geographic locations of the plurality different geographic locations in the field, based on the value of the characteristic in the information map corresponding to each geographic location of the set of geographic locations and based on the predictive soil property model, the set of geographic locations different than the first geographic location; and control a controllable subsystem of the ground engaging machine based on the functional predictive soil property map.

20. The ground engaging machine of claim 19, wherein the ground engaging machine comprises a planting machine or a tillage machine.

* * * * *